(12) United States Patent
Johnson et al.

(10) Patent No.: US 11,182,749 B2
(45) Date of Patent: Nov. 23, 2021

(54) SYSTEM AND METHOD FOR VEHICLE SERVICE SCHEDULER

(71) Applicant: Mitchell Repair Information Company, LLC, Poway, CA (US)

(72) Inventors: Lester B. Johnson, Escondido, CA (US); John H. Dwulet, Lakeside, CA (US)

(73) Assignee: MITCHELL REPAIR INFORMATION COMPANY, LLC, Poway, CA (US)

( * ) Notice: Subject to any disclaimer, the term of this patent is extended or adjusted under 35 U.S.C. 154(b) by 787 days.

(21) Appl. No.: 15/338,794

(22) Filed: Oct. 31, 2016

(65) Prior Publication Data

US 2017/0124525 A1 May 4, 2017

Related U.S. Application Data

(60) Provisional application No. 62/249,712, filed on Nov. 2, 2015.

(51) Int. Cl.
*G06Q 10/06* (2012.01)
*G06Q 10/10* (2012.01)

(52) U.S. Cl.
CPC . *G06Q 10/1095* (2013.01); *G06Q 10/063116* (2013.01)

(58) Field of Classification Search
None
See application file for complete search history.

(56) References Cited

U.S. PATENT DOCUMENTS 7,502,747 B1 * 3/2009 Pardo ............... G06Q 10/06
705/7.13
2002/0111844 A1 8/2002 Vanstory et al.
(Continued)

FOREIGN PATENT DOCUMENTS

WO WO-2011127535 A1 * 10/2011 ............. G06Q 10/06

OTHER PUBLICATIONS

Sharma, R. et al. Performance analysis and improvement of job shop systems: A simulation study. IEEE—International Conference on Advances in Engineering, Science and Management (ICAESM—2012) (pp. 393-398). (Year: 2012).*
(Continued)

*Primary Examiner* — Patricia H Munson
*Assistant Examiner* — Nancy N Prasad
(74) *Attorney, Agent, or Firm* — McDonnell Boehnen Hulbert & Berghoff LLP

(57) ABSTRACT

Methods and systems pertaining to generating a set of appointments for a vehicle shop schedule are described. A method can comprise outputting a first vehicle shop schedule for displaying on a display. The first vehicle shop schedule comprises a first set of appointments. The method further comprises receiving a first new appointment that comprises first temporal data and first customer data. Furthermore, the method comprises generating a second set of appointments by aggregating the first new appointment with the first set of appointments and outputting a second vehicle shop schedule for displaying on the display instead of displaying the first vehicle shop schedule. The second vehicle shop schedule comprises the second set of appointments. One or more appointments can include technician data and shop resource data, such as a vehicle bay or scan tool identifier, for providing schedule views based on technicians or shop resources.

16 Claims, 36 Drawing Sheets

(56) References Cited

U.S. PATENT DOCUMENTS

| | | | |
|---|---|---|---|
| 2004/0059613 A1 | 3/2004 | Ford et al. | |
| 2004/0102983 A1* | 5/2004 | Carlson | G06Q 10/04 705/7.19 |
| 2004/0249530 A1* | 12/2004 | Kelly | G01M 17/007 701/31.5 |
| 2006/0020477 A1 | 1/2006 | Retzbach et al. | |
| 2007/0050225 A1* | 3/2007 | Leslie | G06Q 10/063 705/7.21 |
| 2008/0313005 A1 | 12/2008 | Nessland et al. | |
| 2009/0062978 A1* | 3/2009 | Picard | G07C 5/008 701/31.4 |
| 2015/0286979 A1* | 10/2015 | Ming | G06Q 10/06311 705/7.14 |

OTHER PUBLICATIONS

European Patent Office (International Searching Authority); Patent Cooperation Treaty International Search Report for International PCT application No. PCT/US2016/059830; dated Dec. 19, 2016, 4 pages.
European Patent Office (International Searching Authority); Patent Cooperation Treaty Written Opinion of the International Searching Authority for International PCT application No. PCT/US2016/059830; dated Dec. 19, 2016, 8 pages.
Canadian Intellectual Property Office; Examiner's Report for Canadian Patent Application No. 3,001,530 dated Feb. 18, 2020.
Canadian Intellectual Property Office; Examiner's report for Canadian patent application No. 3,001,530; dated Feb. 4, 2019.

* cited by examiner

80

TECHNICIANS SETUP                                    [✕]

| NAME | TECHNICIAN TYPE |
|---|---|
| GRAY. ANN | SERVICE WRITER |
| IBANEZ. IRVING | TECHNICIAN |
| PLEASE, SELECT | TECHNICIAN |
| REDEKER, RICH | TECHNICIAN |
| RIDDELL, RICARDO | TECHNICIAN |
| SMITH, TONY | SERVICE WRITER |

81

[ ADD ] [ EDIT ] [ DELETE ] [ OK ]

EMPLOYEES

SELECT AN EMPLOYEE                                    92
[ IBANEZ. IRVING (TECHNICIAN)          ▼ ]        INACTIVE

| EMPLOYEE CODE | LAST NAME | FIRST NAME |
|---|---|---|
| SI | IBANEZ | IRVING |

91 SCHEDULE COLOR    DATE HIRED         DATE DISCHARGED
[ CLICK TO CHANGE ]  94 [ 9/1/2013  ▼ ✕ ]   [           ▼ ]

WAGES & COMMISSION    HOURS    ADDRESS
  WAGES INFORMATION              103
  ○ HOURLY          SALARY           LAST PAY RAISE
                                     [ 1/4/2015  ▼ ✕ ]

WAGE              HOURS PER WEEK   EMPLOYEE TYPE       86
82 ➤ $18.00         40               [ TECHNICIAN    ▼ ]

PARTS COMMISSION  LABOR COMMISSION  SUBLET COMMISSION
  TYPE [ NONE ▼ ]   TYPE [ NONE ▼ ]   TYPE [ NONE ▼ ]
  88                89                90              93

⚠ COMMISSION CHANGES APPLY TO ALL OPEN ORDERS.     [ CANCEL ] [ OK ]

HOLIDAY SETUP

| HOLIDAY NAME | OCCURANCE |
|---|---|
| CHRISTMAS HOLIDAY | 12/25/* |
| THANKSGIVING HOLIDAY | 11/26/* |
| COMPANY PICNIC | LAST THURSDAY OF OCTOBER, 2015 |

NAME [COMPANY PICNIC]   ☐ REOCCURING

HOLIDAY OCCURANCE TYPE
○ DATE
● PATTERN

DATE [10/29/2015 ▾]

OCCURANCE PATTERN

OCCURS [LAST ▾]  ON DAY [THURSDAY ▾]  ON MONTH [OCTOBER ▾]  YEAR [2015 ▾]

[CANCEL] [DELETE] [IMPORT] [ADD] [SAVE]

TECHNICIANS SETUP

| NAME | TECHNICIAN TYPE |
|---|---|
| GUNDERSON, GEORGETTE | SERVICE WRITER |
| IBANEZ, IRVING | TECHNICIAN |
| JOHNSON, BEN | SERVICE WRITER |
| KJOS, KELLEY | SERVICE WRITER |
| REDEKER, RICH | TECHNICIAN |
| RIDDELL, RICARDO | TECHNICIAN |

ADD  EDIT  DELETE  OK

FIG. 14

SCHEDULER RESOURCE EDITOR

SELECT A RESOURCE TO EDIT
ALIGNMENT BAY 1 ( , ALIGNMENT BAY 1)  ▽

REQUIRED INFORMATION
NAME [ALIGNMENT BAY 1]

SCHEDULE COLOR [CLICK TO CHANGE COLOR]

☑ ACTIVE IN SCHEDULER

OPTIONAL INFORMATION
BRAND NAME
[HUNTER]

SIZE
[ ]

NICKNAME
[C111]

SERIAL NUMBER
[ ]

LOCATION
[ALIGNMENT BAY 1]

DESCRIPTION
[4 WHEEL ALIGNMENT - STRING MACHINE]

WARRANTY INFORMATION
[ ]

NOTES
[ ]

[CANCEL]  [OK]  [SAVE]

Screen 260 (appointment editor):

- 10/29/2015: JOHNSON, BEN
- SAVE & CLOSE | DELETE | CREATE... ▼ | ✖ CANCEL
- SUBJECT: JOHNSON, BEN
- STARTS: 10/29/2015  9:00 AM  ☐ ALL DAY EVENT
- ENDS: 10/29/2015  11:30 AM  TOTAL HOURS: 2.50  ☐ REMINDER
- COMMENTS (158 CHARS REMAINING)  ☑ PRINT ON ORDER AS NOTE
  - A/C DOES NOT BLOW COLD WHEN FIRST STARTED. BEGINS COOLING ABOUT 15 MINUTES AFTER DRIVING.
- CUSTOMER - JOHNSON, BEN
  - CONTACT: (HOME) 555.1000321
  - EMAIL: JOHNSON_BEN@REPAIR.COM
  - COMPANY: --
  - ADDRESS:
- VIN: --
- LICENSE PLATE:
- ENGINE:
- HAT:
- ODOMETER IN: NONE
- YEARLY MILEAGE: --
- COLOR: PLATINUM
- APPOINTMENT STATE: OPEN (OPEN)
- 0 MINUTES
- TECHNICIAN: REDEKER, RICH
- RESOURCE: <NONE>
- TECHNICIAN IS NOT AVAILABLE DURING APPOINTMENT TIME. ← 261
- PROMISED TIME: 10/29/2015  5:30 PM
- SOURCE: <NONE>
- JOB HOURS: 0.50
- JOBS: ADD | DELETE
- DESCRIPTION
- A/C SYSTEM PERFORMANCE TEST

```
┌─────────────────────────────────┐
│ 510, 520, 530, 540 and/or 550   │
└─────────────────────────────────┘
                │
                ▼
```

CONFIRMING, BY THE AT LEAST ONE PROCESSOR, THE FIRST NEW APPOINTMENT DOES NOT CONFLICT WITH ANY OTHER APPOINTMENT IN THE FIRST SET OF APPOINTMENTS — 561

```
┌─────────────────────────────────────┐
│ 510, 520, 530, 540, 550 and/or 560  │
└─────────────────────────────────────┘
                │
                ▼
```

ADDING, BY THE AT LEAST ONE PROCESSOR, AT LEAST ONE SHOP EVENT INTO THE FIRST VEHICLE SHOP SCHEDULE — 571

CONFIRMING, BY THE AT LEAST ONE PROCESSOR, THE FIRST NEW APPOINTMENT DOES NOT CONFLICT WITH THE AT LEAST ONE SHOP EVENT — 572

SYSTEM AND METHOD FOR VEHICLE SERVICE SCHEDULER

CROSS-REFERENCE TO RELATED APPLICATION

This application claims the benefit of U.S. Patent Application No. 62/249,712, filed Nov. 2, 2015. U.S. Patent Application No. 62/249,712 is hereby incorporated by reference in its entirety.

BACKGROUND

Most vehicles are serviced at least once during their useful life. In many instances, a vehicle is serviced at a service shop with professional mechanics (e.g., technicians). The service shop may be referred to by various names such as a repair shop, a vehicle shop, or more simply a shop.

The technicians at a service shop may use any of a variety of hand tools to service (e.g., repair) any of the wide variety of mechanical components on a vehicle. The technicians may also use electronic diagnostic equipment to service (e.g., diagnose) any of the wide variety of electrical components on a vehicle. The technicians may use other resources and equipment at the service shop to service a vehicle. In some instances, the technician demand for tools, equipment or shop resources may be greater than the available supply of the tools, equipment or shop resources at the shop where the technicians needing the tools, equipment or shop resources are located.

When the tools, equipment or shop resources needed to service a vehicle are unavailable to a technician, the technician may turn to working on another vehicle. In some instances, the vehicle not being worked on may need to be moved out of the technician's service bay so that a different vehicle may worked on within the service bay. Movement of vehicles for such purposes may be considered a waste of time. Furthermore, an owner of the vehicle moved out of the service bay may need to wait longer at the service shop before servicing of the vehicle is complete or otherwise may not receive the vehicle at a promised completion time.

Managers of shop resources, technicians, and vehicle service appointments could benefit from a scheduler device and actions performable by a scheduler device or components of a scheduler device to schedule appointment for servicing vehicles, and even more so, if the scheduler device schedules appointments with respect to technicians working at a repair shop and/or the resources available to the technicians at the repair shop for servicing vehicles.

Overview

Several example embodiments that relate to generating, modifying, and/or reconfiguring a vehicle shop schedule or an appointment within the vehicle shop schedule are described. A vehicle shop schedule can comprise one or more appointments. A processor can output a vehicle shop schedule for displaying in one or more different schedule views.

Viewed from one aspect, an example embodiment takes the form of a method comprising (i) outputting, by at least one processor, a first vehicle shop schedule for displaying on a display, wherein the first vehicle shop schedule comprises a first set of appointments, (ii) receiving, by the at least one processor, a first new appointment, wherein the first new appointment comprises first temporal data and first customer data, (iii) generating, by the at least one processor, a second set of appointments by aggregating the first new appointment with the first set of appointments, and (iv) outputting, by the at least one processor, a second vehicle shop schedule for displaying on the display instead of displaying the first vehicle shop schedule, wherein the second vehicle shop schedule comprises the second set of appointments.

Viewed from another aspect, an example embodiment takes the form of a computing system comprising: a computer-readable medium having stored thereon a first vehicle shop schedule, and at least one processor coupled to the computer-readable medium and programmed to: (i) output a first vehicle shop schedule for displaying on a display, wherein the first vehicle shop schedule comprises a first set of appointments, (ii) receive a first new appointment, wherein the first new appointment comprises first temporal data and first customer data, (iii) generate a second set of appointments by aggregating the first new appointment with the first set of appointments, and (iv) output a second vehicle shop schedule for displaying on the display instead of displaying the first vehicle shop schedule, wherein the second vehicle shop schedule comprises the second set of appointments.

Viewed from yet another aspect, an example embodiment takes the form of a computer readable medium having stored thereon instructions executable by at least one processor to cause a computing system to perform functions comprising: outputting, by at least one processor, a first vehicle shop schedule for displaying on a display, wherein the first vehicle shop schedule comprises a first set of appointments, receiving, by the at least one processor, a first new appointment, wherein the first new appointment comprises first temporal data and first customer data, generating, by the at least one processor, a second set of appointments by aggregating the first new appointment with the first set of appointments, and outputting, by the at least one processor, a second vehicle shop schedule for displaying on the display instead of displaying the first vehicle shop schedule, wherein the second vehicle shop schedule comprises the second set of appointments.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 1 to FIG. 26 show examples graphical user interfaces for setting up or displaying a schedule in accordance with the example embodiments.

FIG. 35 shows an example graphical user interface displaying a schedule in accordance with the example embodiments.

FIG. 36, FIG. 37, FIG. 38, FIG. 39, FIG. 40, FIG. 41, FIG. 42, FIG. 43, and FIG. 44 are flowcharts depicting sets of functions that can be carried out in accordance with the example embodiments.

DETAILED DESCRIPTION

I. Introduction

Figure 1:
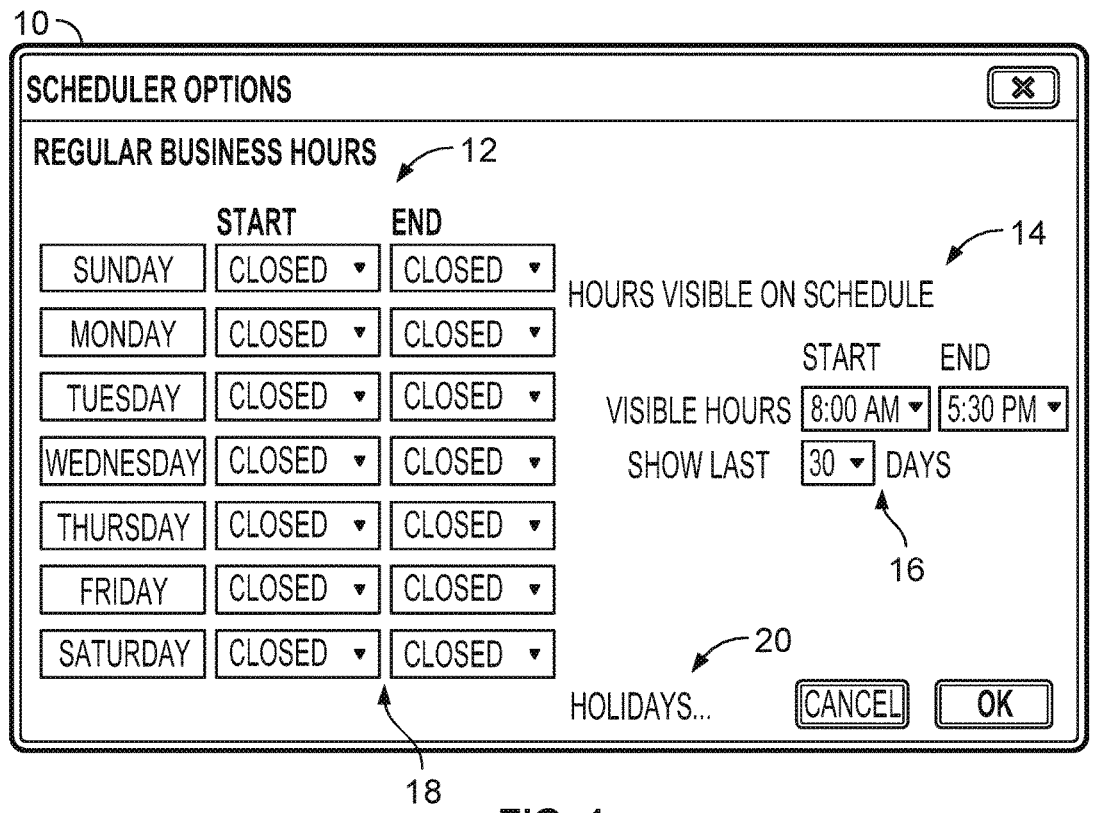

This description describes several example embodiments including example embodiments pertaining to a vehicle shop scheduler (or more simply "shop scheduler" or "scheduler.") The scheduler of the example embodiments may enable a shop to improve its management of workflow within the shop including scheduling technician time, service appointments, and shop resources.

The scheduler may include scheduling for shop events that keep the shop open for a reason other than servicing a vehicle. As an example, a shop event may include a shop event in which a contractor or vendor changes oil in the shop's air compressor, replaces filters in the shop's air conditioning unit, cleans or paints the shop's floor, or performs inventory in the shop's parts department.

The scheduler may enable a user to schedule for events in which the shop is closed such as holidays or a shop party. The scheduler may include program logic to perform conflict management for scheduling work to be performed by humans (e.g., employees at a shop) or using shop resources.

The scheduler may provide for displaying notifications of possible schedule conflicts. The scheduler may provide for displaying multiple aspects of a shop's day, week or month and may allow for easily changing of services appointments from one time to another time, or from one day to another day. As an example, the scheduler may display service appointments on a calendar and allow a service appointment scheduled for a first date, a first time, and a first technician to be dragged and dropped to a different location within the calendar to change at least one of the first date, the first time, and the first technician to a second date, a second time, and a second technician, respectively, for the service appointment. The calendar described herein may be referred to as a schedule calendar and the scheduler may include a calendar view in which the schedule calendar is displayed in a GUI.

The diagrams and other data shown in the figures are provided merely as examples and are not intended to be limiting. Many of the elements illustrated in the figures or described herein are functional elements that may be implemented as discrete or distributed components or in conjunction with other components, and in any suitable combination and location. Those skilled in the art will appreciate that other arrangements and elements (e.g., machines, interfaces, functions, orders, or groupings of functions) may be used instead. Furthermore, various functions described as being performed by one or more elements may be carried out by a processor executing computer-readable program instructions (CRPI) or by a combination of hardware, firmware, or software. Furthermore still, identical reference numbers used in the same or different figures, if any, denote elements that are identical to other elements referred to by the same reference number, but those denoted elements and the other elements are no so limited.

II. Example Scheduler GUI

One or more processors of an example system can be programmed to provide a vehicle shop schedule in accordance with the example embodiments. In particular, the one or more processors can be programmed to provide a vehicle shop schedule that includes any of the features shown in FIG. 1 to FIG. 44. The one or more processors may be programmed to provide the vehicle shop schedule by operating a schedule application. The schedule application may be selected via a menu of selectable applications.

Figure 11:
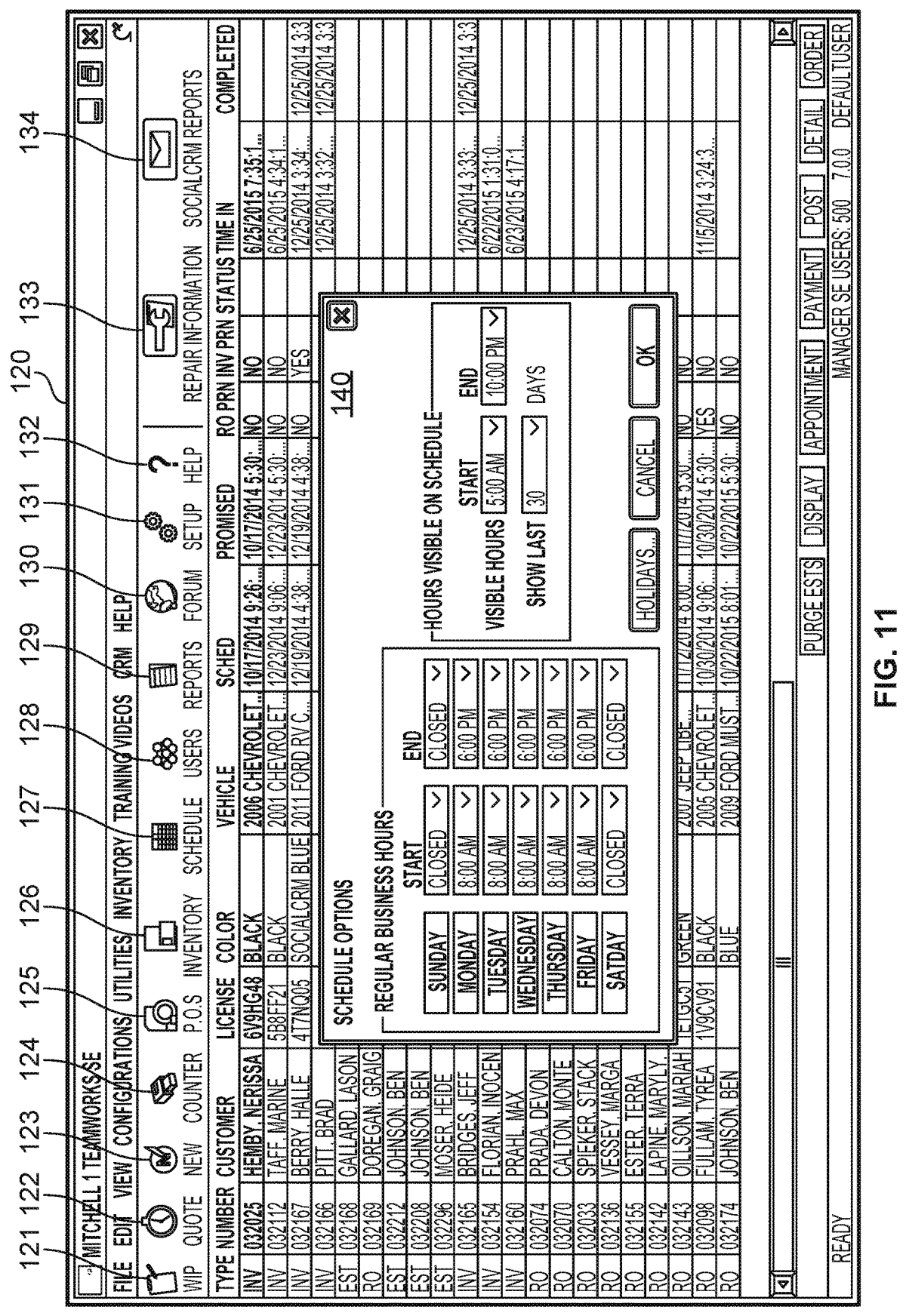

FIG. 11 shows a graphical user interface (GUI) 120 provided by the one or more processors of a system that provides a menu including a schedule application 127 selection. The menu may provide for selecting other applications. As an example, those other applications may include one or more of a work-in-process application 121, a quoting application 122, a new appointment application 123, a counter application 124, a purchase order application 125, an inventory application 126, a users application 128, a reports application 129, a forum application 130, a setup application 131, a help application 132, a repair information application 133, and a social CRM report application 134.

Providing a schedule may include one or more of the following functions: providing for entry of shop resource data, providing for entry of service personnel data (e.g., technician data), providing for entry of vehicle identification data, providing for entry of customer data (e.g., vehicle owner identification data), providing for entry of service appointment data, and providing for entry of default shop data. Providing for entry of any of that data may include outputting a GUI into which the data may be entered; receiving the entered data at one or more processors, and storing the entered data within a computer readable medium. As an example, storing the entered data may include storing the entered data into a schedule database 414 (shown in FIG. 31). Storing the data can comprise aggregating the entered data into an appointment and/or a schedule. The appointment or schedule may have been generated previously or may be generated in response to receiving the data. The computer-readable medium and the schedule database may be used by a single service shop. Alternatively, the computer-readable medium may include multiple schedule databases, one for each service shop of a group of multiple service shops. Outputting a GUI may include transmitting the GUI or the data to display in the GUI to a schedule display device. Outputting a GUI may include displaying a GUI on a display of a schedule display device.

Providing the schedule may include providing for entry of schedule options via a graphical user interface. FIG. 1 shows an example GUI 10 for entering an example set of schedule options. GUI 10 includes a regular business hours definition segment 12 for defining regular business hours for a service shop, a schedule length definition segment 14, and a holiday definition selection 20. The schedule length definition segment 14 provides data entry boxes 16 to enter start time data, end time data, and days-data to define what times and a quantity of days are displayable on a schedule. The days-data may indicate a number of prior days or a number of future days. The regular business hours definition segment 12 may include data entry boxes 18 to enter start time data indicating when a service shop opens for business on each day of the week and end time data indicating when a service shop closes for business on each day of the week.

In accordance with an example embodiment, each day of the week may be set up as closed or with start and end times. To set a start or end time for a day of the week (e.g., Monday), a day of week box for the start time to be set may be selected from within GUI 10. In response to selecting the day of week box (e.g., the Monday box), initial start and end times may be displayed in the start and end boxes associated with the selected day of week. As an example, the initial start time may be 8:00 AM for a time zone at which the service shop is located and the initial end time may be 5:00 PM for the time zone at which the service shop is located. The day of week box currently selected may be highlighted (e.g., by changing color of the box outline). The start and end boxes for each day of the week (as well as any other data shown or described as being displayed on a display and/or within a GUI) may be selected with a computer pointing device (e.g., a computing mouse). Selection of the start and end boxes for each day of the week can result in revealing a menu of times selectable to change the start or end time for the day of week to a time other than the initial time. The start or end times for a day of week may be entered by selecting a time from the menu of time for a start or end box without having to select the day of week box.

The visible hours for a calendar view of a schedule may be set from within the schedule length definition segment 14. As an example, the start visible hour might be set to a time one hour earlier than the earliest start time set within the regular business hours definition segment 12, and the end visible hour might be set to a time one hour later than the latest end time set within the regular business hours definition segment 12. For a service shop open 24 hours a day, the start and stop times within the regular business hours definition segment 12 could be set to the same time or otherwise set to times indicating 24 hours per day are to be displayed in the calendar view of the displayed schedule.

The days-data may be set from within the schedule length definition segment 14. The days-data may indicate a number of days to display in the schedule calendar from the current date. As an example, the days-data may be set to a value of 15 or 30 days or a number of days less than 15 days, a number of days greater than 15 days but less than 30 days, or a number of days greater than 30 days. The days-data may indicate a number of past days, future days, past and future days. One day of the days-data may represent the current day. If the service shop has a relatively large number of appointments per day, it may be advantageous to the set the days-data to a relatively low number of days such as 15 days.

Figure 2:
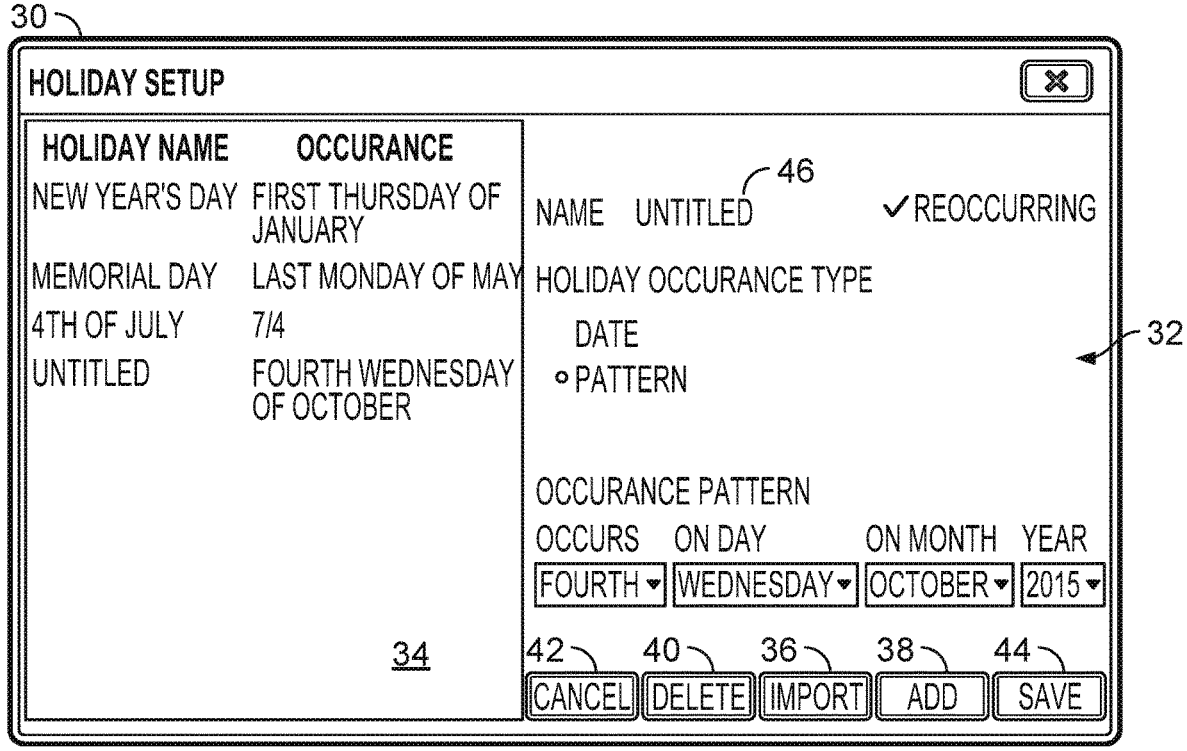

Selection of the holiday definition selection 20 may result in the one or more processors of a scheduler displaying a holiday setup GUI 30 as shown in FIG. 2. Holiday setup GUI 30 includes a holiday definition segment 32 at which data indicating a holiday name, occurrence type, and date(s) may be entered. The holiday setup GUI 30 also includes a defined holiday segment 34 to indicate the holidays or events defined thus far for a schedule calendar.

The holiday setup GUI 30 includes a reoccurring selection option if a defined holiday reoccurs. The holiday setup GUI 30 includes an import button 36 to present a list of standard holidays for a particular country to be automatically entered into the schedule calendar. The holiday setup GUI 30 includes an add button 38 to add a holiday or event not yet shown in the defined holiday segment 34.

To add a holiday or event, a holiday name or event may be entered into the name field 46, and an occurrence type may be set to a specific date or a pattern, such as the fourth Wednesday of October. Examples of occurrence options include first, second, third, fourth, and last, and days of the week (i.e., Sunday, Monday, Tuesday, Wednesday, Thursday, Friday, and Saturday), and months of the year. Other examples of occurrence options are also possible.

To cancel any holiday or event being added, a cancel button 42 may be selected. To delete any holiday or event or already added to the defined holiday segment 34, the holiday or event desired to be deleted may be selected and then a delete button 40 may be selected. A save button 44 may be selected to save or holidays or events entered into the defined holiday segment 34. An indication of the holiday or events listed in the defined holiday segment 34 can appear on the schedule calendar while displaying a date range in which the holiday or event occurs. FIG. 12 shows a holiday setup GUI 31 with a different set of holidays entered for the schedule calendar.

Figure 3:
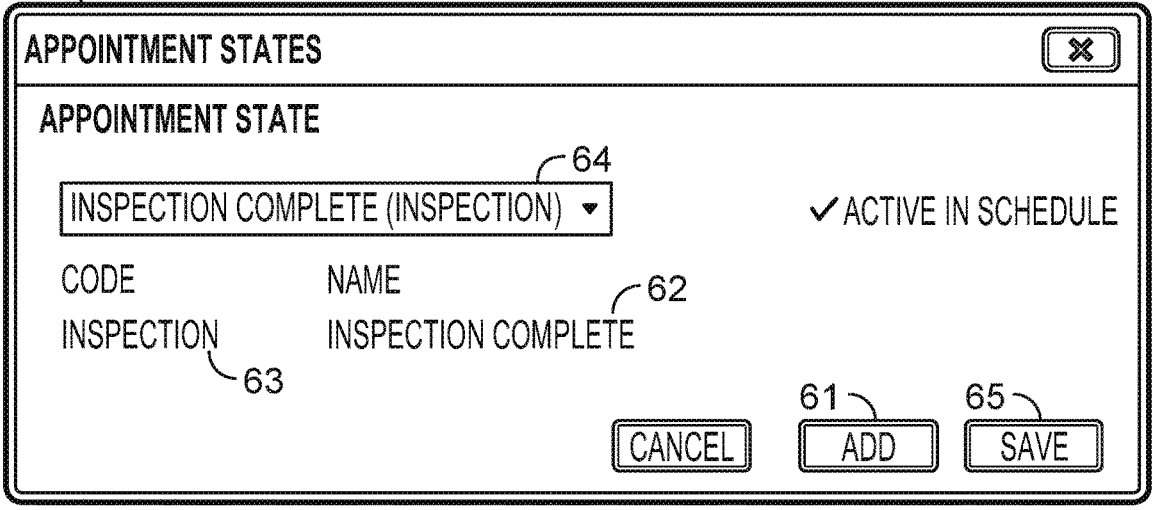

Next, FIG. 3 shows an example appointment states GUI 60 that the one or more processors of a scheduler may provide for defining appointment statuses (or more simply "appointment states"). The defined appointment statuses may be selected for service appointments entered into the schedule. Appointment statuses represent a state of a service appointment. One or more appointment statuses may be predefined for a schedule. In one respect, the predefined appointment statuses are unalterable. In another respect, one or more of the predefined appointment statuses may be altered. As an example, the predefined appointment statuses may include one or more of the following appointment statuses: Waiting, Arrived, Awaiting Parts, Call and Remind, Call Customer, Cancelled, Closed, Finished, No Show, Open, and Waiting. Other examples of a predefined appointment status are also possible. Custom statuses may be added by clicking on the add button 61, entering a status name in the status name field 62, a code in a status code field 63, and clicking a save button 65. The status defined in the status name field 62 and the status code field 63 may be displayed in the field box 64. FIG. 3 shows an "Inspection Complete" appointment status is being added. Any custom statuses created for the schedule will be active by default; they may be marked inactive to eliminate selection in the schedule editor.

Figure 4:
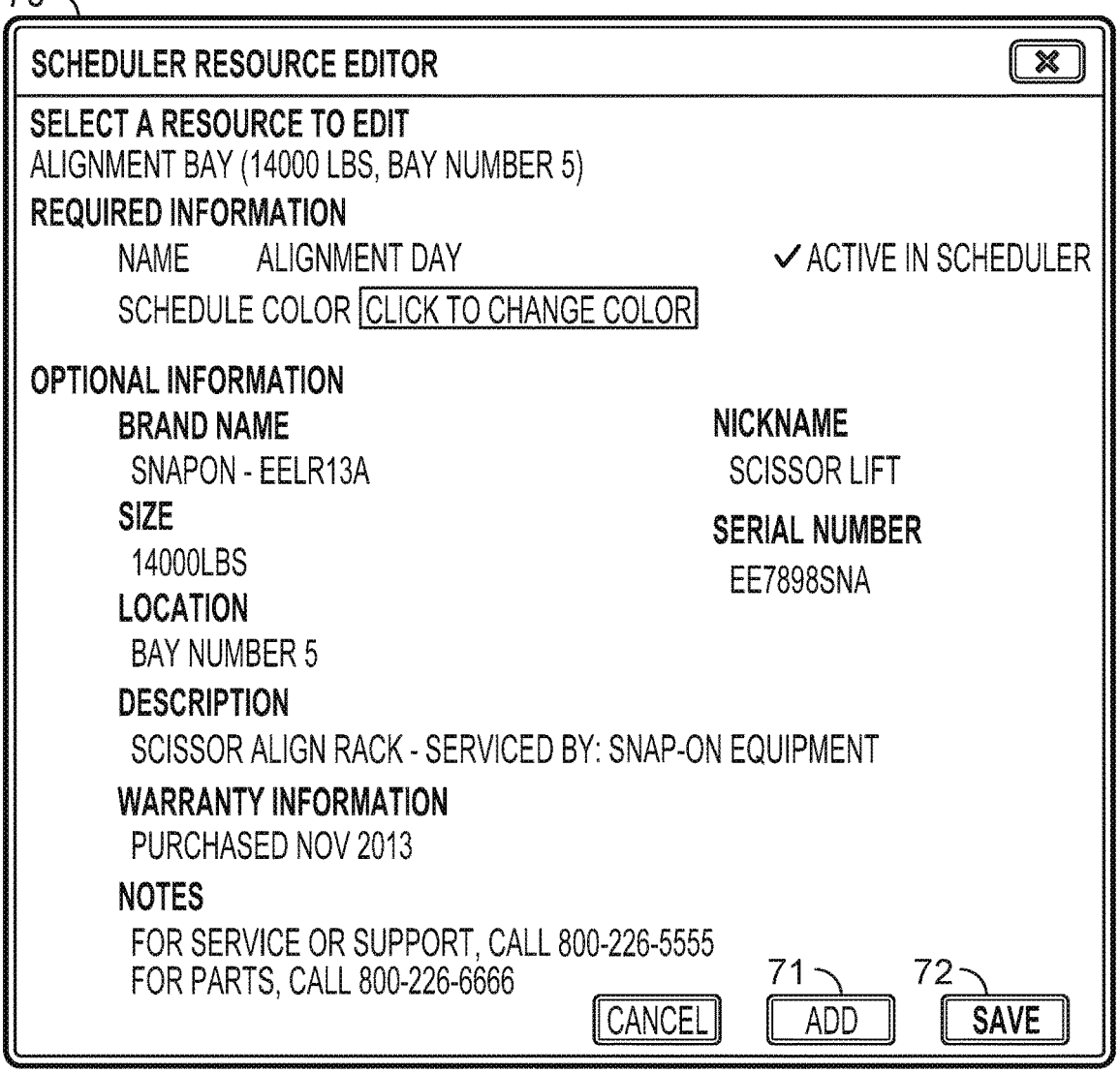

Next, FIG. 4 shows an example scheduler resource editor GUI 70 that the one or more processors of a scheduler may provide for cataloging resources (e.g., equipment) within the service shop using the schedule. As an example, the resources within a shop may include one or more of each of the following example resources: service shop bay, scan tool, vehicle lift, tire machine, alignment machine, a location, or other item specifically needed for certain types of service appointments.

The scheduler resource editor GUI 70 may be used to define resources in a service shop that are required for specific jobs. For example, a service appointment to perform a wheel alignment of a vehicle may need an alignment machine and a service shop bay. As another example, a specific service shop bay may include special equipment used for vehicle emission testing.

Each resource may be defined with one or more of the following resource descriptors: a name, a color, a brand name, a nickname, a size, a serial number, a location, a description, warranty information, and notes. The color defined for a resource may define how the resource or an appointment requiring the resource is displayed for easier identification of the resource on the schedule. Cataloging and color-coding resources allow for a user to better visualize what resources are available or not available for a particular time slot on the schedule calendar. The scheduler resource editor GUI 70 allows for entering data regarding a particular resource, such as service or warranty information regarding the resource. Cataloging new or additional resources may occur in response to selecting an add button 71, entering the appropriate data within one or more of the fields of the scheduler resource editor GUI 70 and then selecting a save button 72.

The data entered via the scheduler resource editor GUI 70 may be stored within a computer-readable medium (CRM) storing the schedule information. In one respect, one resource may be associated with a service appointment. In another respect, more than one resource may be associated with a service appointment. FIG. 17 shows a scheduler resource editor GUI 178 with a different set of data entered for cataloging another shop resource.

Next, FIG. 5 shows an example technician setup GUI 80 that the one or more processors of a scheduler may provide to show which employees have been entered for showing on the schedule. The technician setup GUI 80 provides for entering and editing background details pertaining to an employee at the service shop, such as a technician or a service advisor. As an example, a technician by the name of Irving Ibanez whose details have already been entered for the scheduler may be selected and then an edit button 81 may be selected to cause the one or more processors to provide an employee data editor GUI. The background details may be stored as, or as part of, an employee record stored in the CRM. FIG. 14 shows an example technician setup GUI 175 with a different set of employee records established in the scheduler.

Next, FIG. 6 shows an example employee data editor GUI 85 that the one or more processors of a scheduler may provide to edit or enter the background details for an employee selected from the technician setup GUI 80. A type of employee (e.g., advisor or technician) may be entered at an employee type field 86. An hourly or salary wage and number of hours in a pay period (e.g., 80 hours for two weeks) may be entered into a wage information field 87. A type and rate of a technician's commission on parts, if any, or a percentage of profit or sales of parts, if any, may be entered into a parts commission field 88. A type and rate of a technician's commission on labor, if any, or a percentage of profit or sale of labor, if any, may be entered into a labor commission field 89. A type and rate of a technician's commission on sublet operations, if any, or a percentage of profit or sale of sublet operations, if any, may be entered into a sublet commission field 90.

In some instance, an employee may work as both a service advisor and a technician. The employee may be entered twice from technician setup GUI 80, once as a service advisor and once as a technician. The scheduler will allow the employee's name to be listed in and selected from a service advisor list and a technician list in order to place the employee's name on assignments in which the employee will work as a service advisor and assignments in which the employee will work as a technician.

When creating or editing an employee record, a color may be associated with an employee by selecting the color from a color field 91. The color associated with a technician may provide visual clues when viewing a calendar of the scheduler.

The technician setup GUI 80 provides a way to enter other background details regarding an employee such as a date of hire, a discharge date, and a pay increase date. The technician setup GUI 80 includes a field 92 to mark the employee record as active or inactive. A scheduler may be configured to prevent employees associated with inactive records to be associated with appointments being added to a schedule.

Figure 15:

After entering or editing background details via the technician setup GUI 80 for an employee, an OK button 93 may be selected to save the employee record based on the entered or edited background details. FIG. 15 shows an example employee data editor GUI 176 with a different set of employee background details for the employee named Irving Ibanez.

Figure 7:
Figure 16:

The technician setup GUI 80 includes an hours tab 94 that may be selected to cause the one or more processors to display additional hours details 101 for the employee as shown in FIG. 7. The hours details 101 are shown in a technician setup GUI 100. Within the hours details 101, a start time and end time for the employee may be entered. The scheduler may include default times (e.g., an 8:00 AM start time and a 4:00 PM end time). Selection of the day of week selector 102 for Wednesday may result in the one or more processors displaying the default start and end times for the employee. A user may modify one or both of the start and end times for each day of the week. The employee hours entered into the employee record may be used to alert a user of the scheduler if the employee (e.g., a technician) is overbooked (e.g., scheduled to do more work during the employee's scheduled hours based on a labor time guide). FIG. 16 shows a technician setup GUI 177 with a different set of hours details for the employee named Irving Ibanez.

Figure 8:

The technician setup GUI 80 and GUI 100 include an address tab 103 that may be selected to cause the one or more processors to display address details 106 for the employee as shown in FIG. 8. The address details 106 are shown in a technician setup GUI 105. Within the address details 105, details regarding the employee's address, an e-mail address, birthday may be entered.

Figure 9:
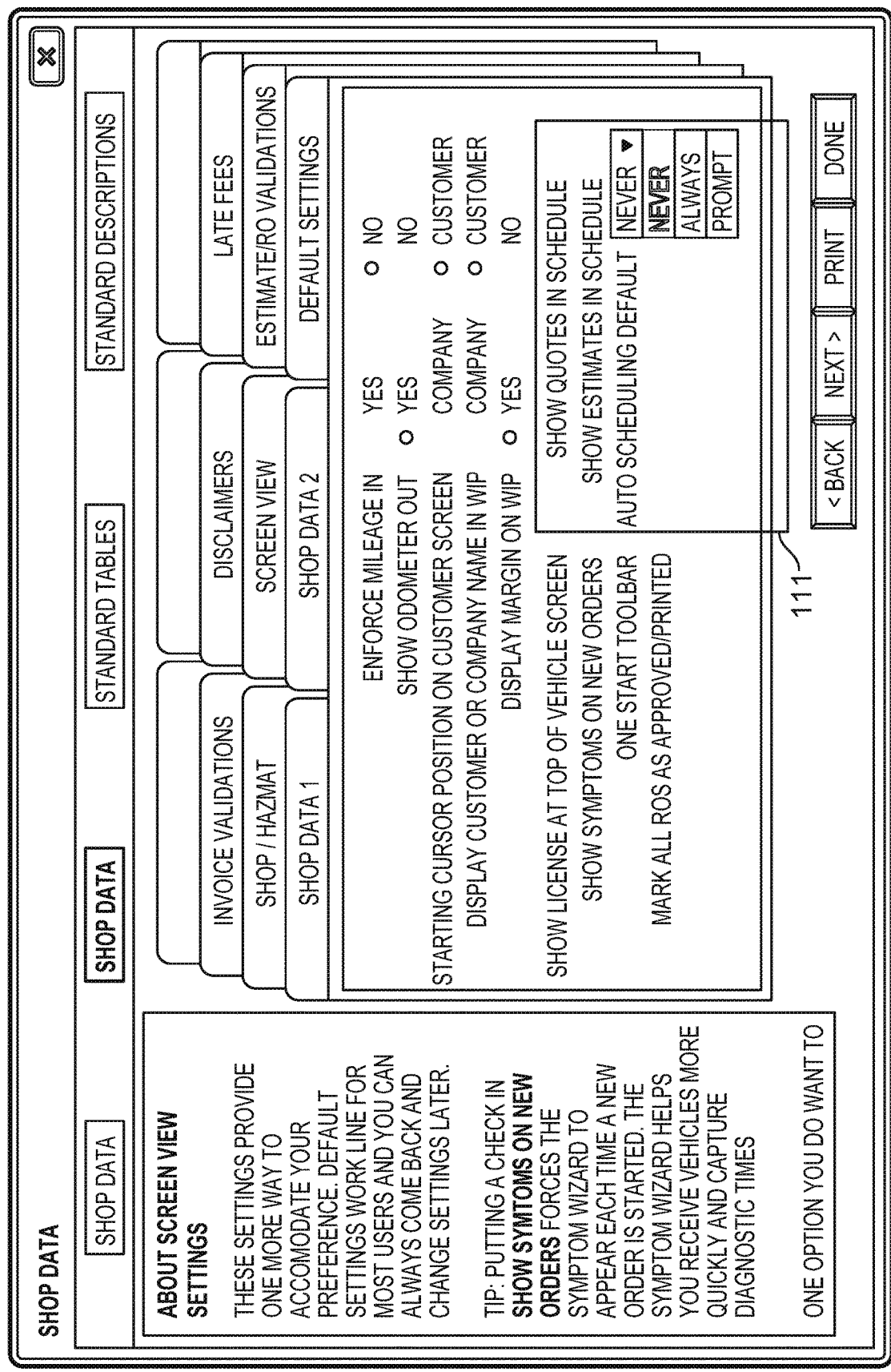

Next, FIG. 9 shows an auto scheduling GUI 110 that the one or more processors of a scheduler may provide to allow a user to select whether service appointment information entered via the scheduler may be populated into other computing applications managed by the one or more processors. The user selection may be entered via the selection window 111. The auto scheduling selections may include a never selection, an always selection, and a prompt selection. Selection of the never selection may result in the scheduler never prompting the user to create a new appointment when posting an invoice. Selection of the always selection may result in the scheduler automatically starting a scheduler editor when posting an invoice. Selection of the prompt selection may result in the scheduler asking a user to start the scheduler editor when posting an invoice. The user may select yes to start the scheduler editor or no to dismiss opening the scheduler editor.

The selection window 111 includes options for selecting whether to auto-include quotes in a schedule and whether to auto-include estimates in the schedule. The quotes and estimates may pertain to each service appointment.

Figure 10:
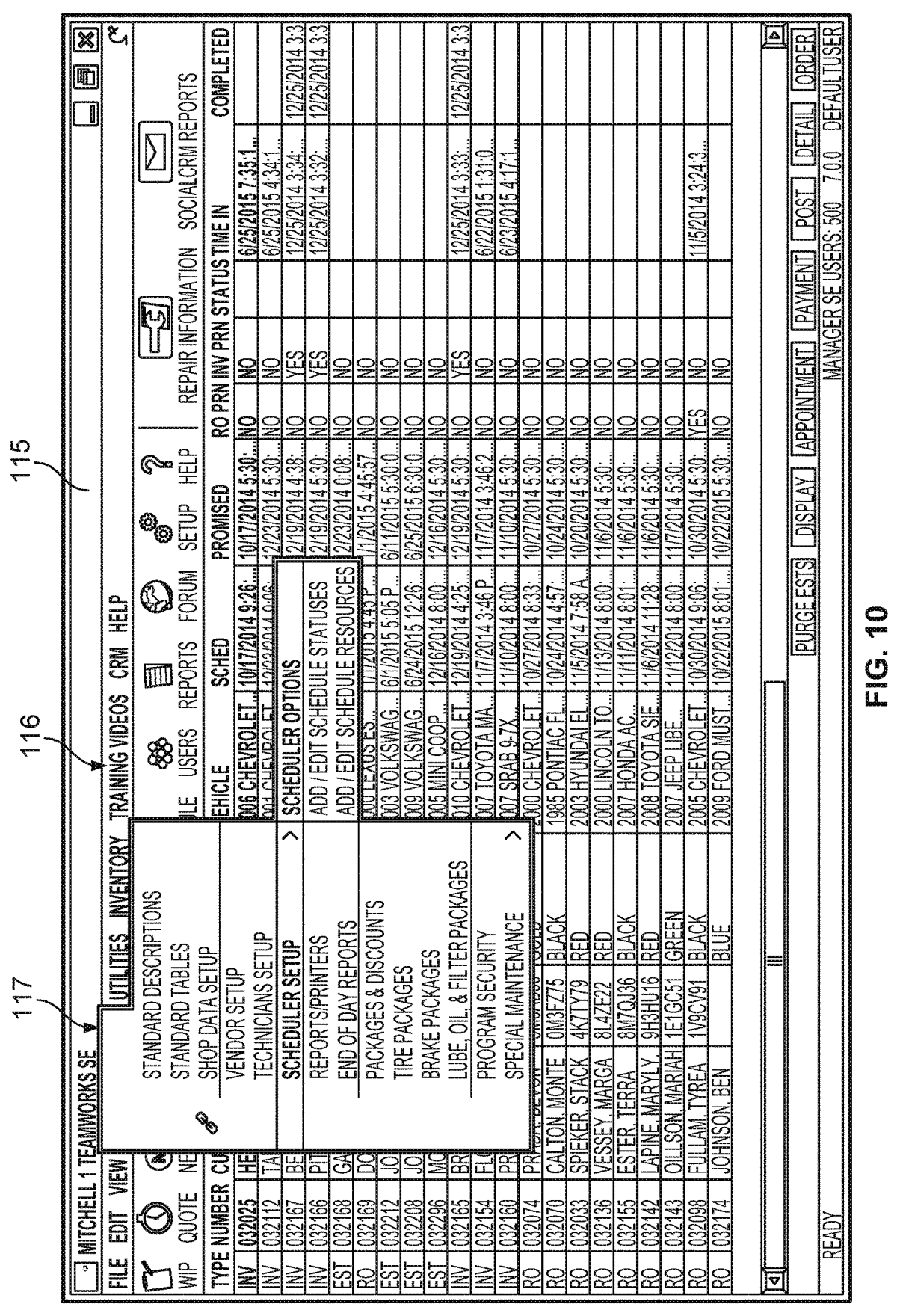

Next, FIG. 10 shows a GUI 115 from which a configuration option of one or more the applications provided by the example system may be selected. For example, the GUI 115 includes a menu 116 and within the menu 116 a configurations selector 117. The configurations selector 117 includes a scheduler setup selection from which a scheduler options, schedule statuses, or scheduler resources may be selected to configure various features of the scheduler.

Next, FIG. 11 shows the GUI 120. The GUI 120 may be displayed in response to the one or more processors of the scheduler receiving a selection of the scheduler options from the configuration selector 117 shown in FIG. 10. The GUI 120 displays a GUI 140 for entering schedule options similar to the GUI 10 shown in FIG. 1.

Figure 13:
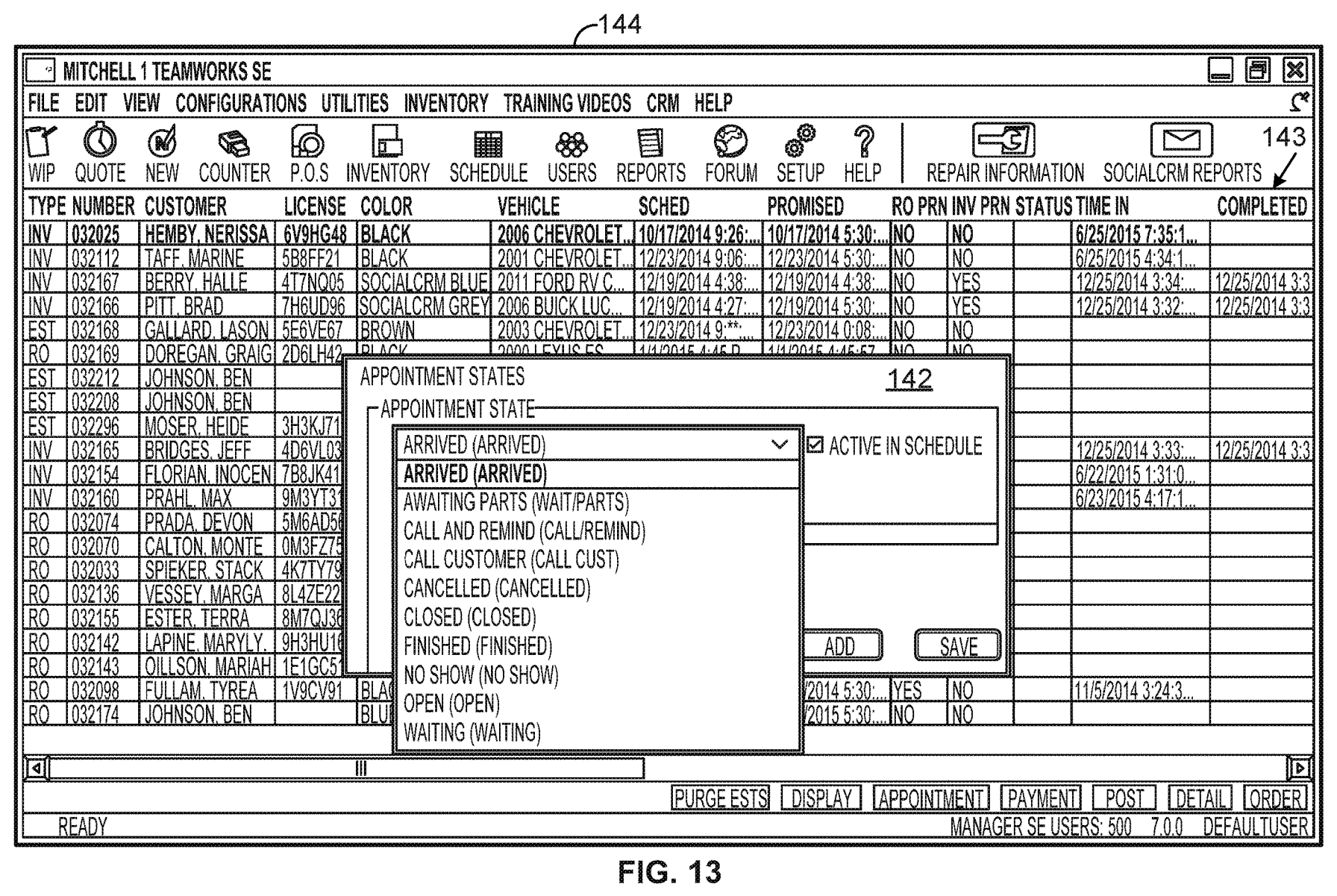

Next, FIG. 13 shows a GUI 142 that may be displayed in response to the one or more processors of the scheduler receiving a selection of the schedule statuses from the configuration selector shown in FIG. 10. FIG. 13 shows the GUI 142 overlaid upon a vehicle shop schedule 143 displayed in a GUI 144. The vehicle shop schedule 143 includes customer information vehicle information, schedule times, promised time, and status information, among other data. The processor of the scheduler device can cause the GUI 142 to be displayed with other schedules for selecting and/or changing a status of an appointment. An appointment status selector can be configured like the GUI 142 or in another manner to allow inputting an appointment status selection to a processor of the scheduler device.

Any data entered into any example field shown within any of FIG. 1 to FIG. 26 and FIG. 35 may be stored within a CRM as the data the one or more processors of a scheduler use to provide a service schedule. The data entered into any displayed field may be deleted from a scheduler record by hitting a delete key on a keyboard when the field or the data within the field is selected.

Figure 18:
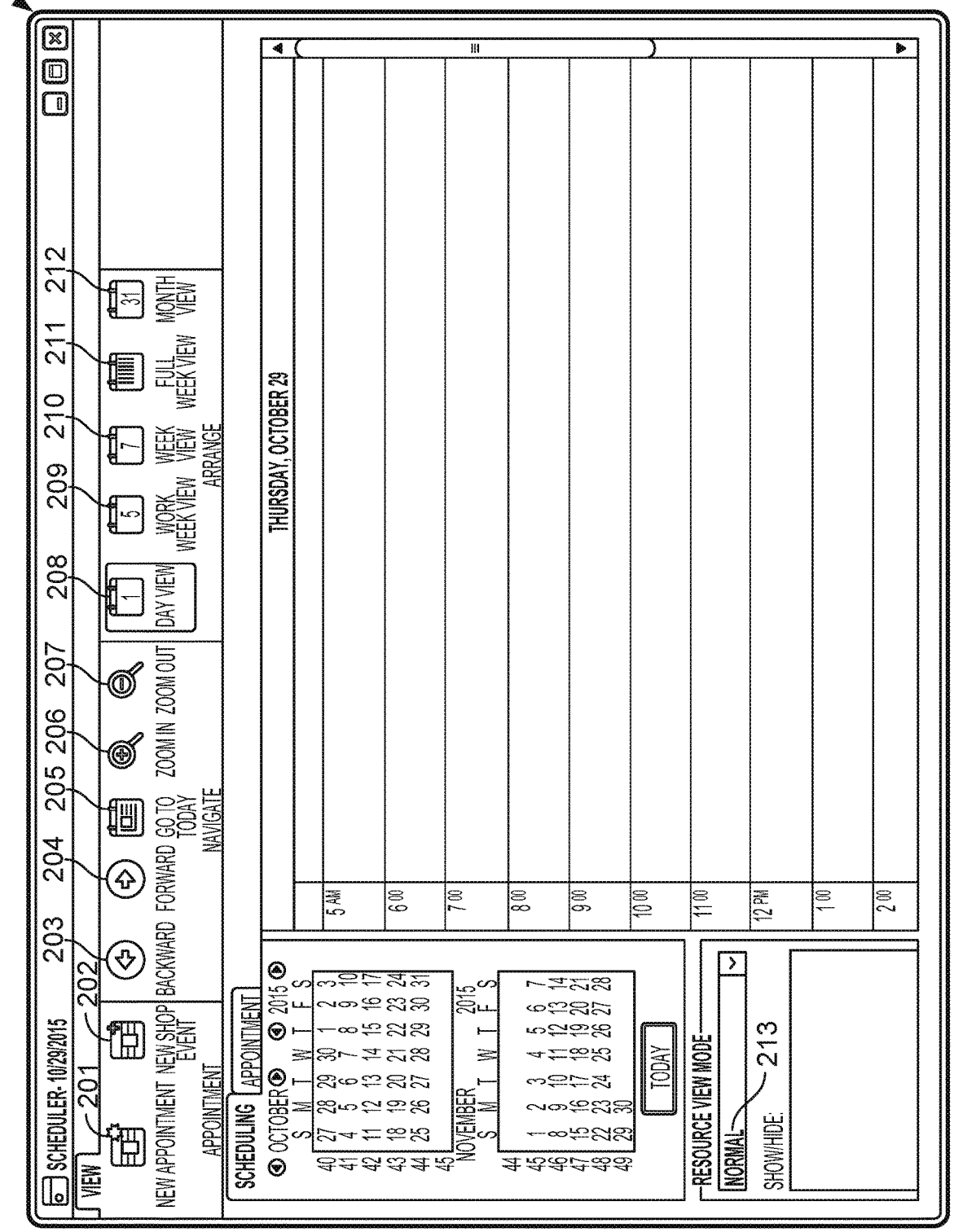

Next, FIG. 18 shows an example GUI 200 that may be displayed while the one or more processors of a scheduler are executing program instructions to provide a schedule. The GUI 200 shows new appointment selector 201 selectable to transition to a GUI for entering a new service appointment, a new shop event selector 202 selectable to transition to a GUI for entering a new shop event, a backward selector 203 to move backward in time relative to a current view displayed by scheduler, a forward selector 204 to move forward in time relative to the current view displayed by the scheduler, a go-to-today selector 205 to cause the scheduler to display the schedule for the date on which the go-to-today selector 205 is selected, a zoom-in selector 206 to display less of the schedule currently being displayed, a zoom-out selector 207 to display more of the schedule currently being displayed, a day view selector 208 to cause the scheduler to display a single day of the schedule, a work week view selector 209 to cause the scheduler to display a single work week of the schedule, a week view selector 210 to cause the scheduler to display a single week of the schedule, a full week view selector 211 to cause the scheduler to display a single full week of the schedule, and a month view selector 212 to cause the scheduler to display a single month of the schedule.

The GUI 200 includes a resource view mode selector 213 from which a user may select from one or more view modes a view mode to be displayed by the scheduler. As an example, the one or more view modes may include a normal view mode to display service appointments within the calendar, a technician view mode to display a schedule for one or more employees associated with an active employee data record, and a shop resource view to display a schedule for one or more shop resources associated with an active shop resource record.

Figure 34:
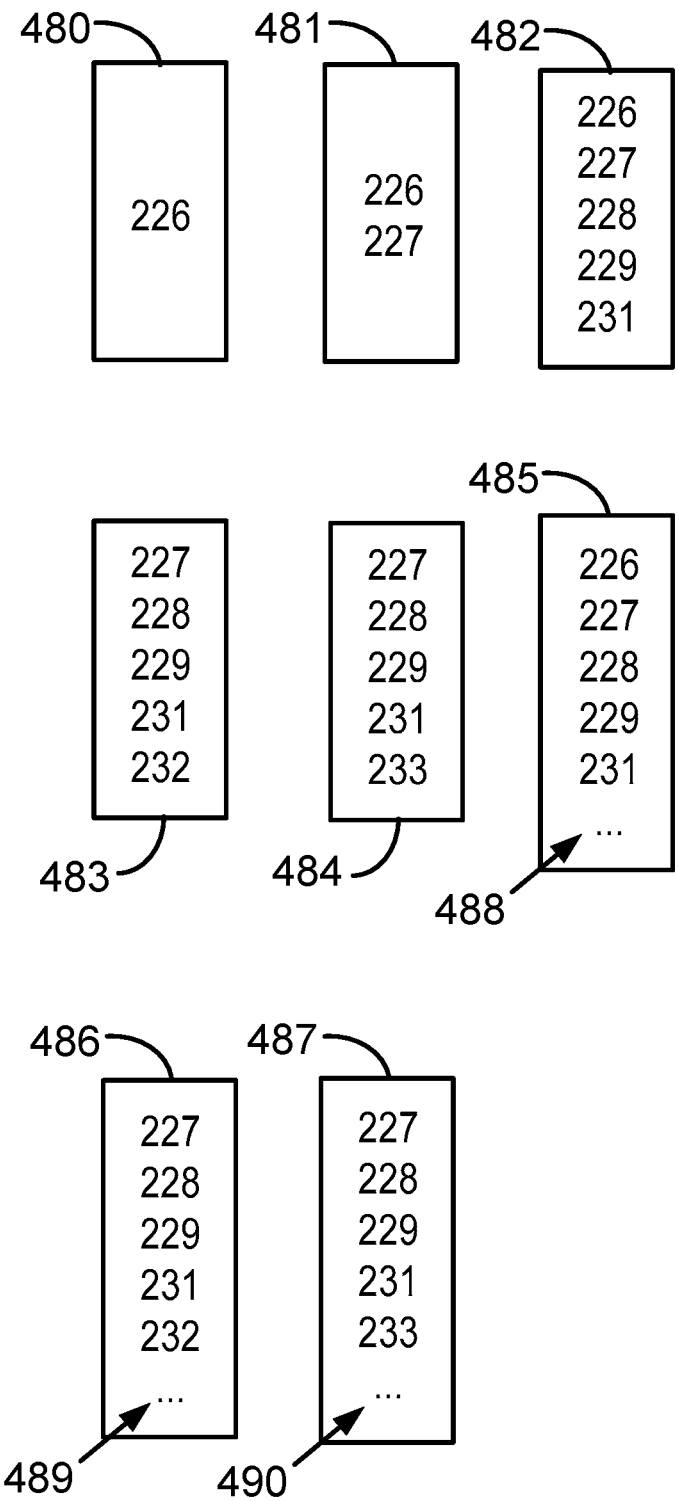
FIG. 34 shows examples sets of appointments.

Next, FIG. 34 shows examples sets of appointments (SOA) 480, SOA 481, SOA 482, SOA 483, SOA 484, SOA 485, SOA 486, and SOA 487. SOA 480 includes appointment 226. SOA 481 includes appointments 226 and 227. SOA 482 includes appointments 226, 227, 228, 229, and 231. SOA 483 includes appointments 227, 228, 229, 231, and 232. SOA 483 can be generated in response to modifying appointment 226 as discussed with respect to FIG. 22 and FIG. 23. SOA 484 includes appointments 227, 228, 229, 231, and 233. SOA 485 includes appointments 226, 227, 228, 229, 231, and 488. SOA 486 includes appointments 227, 228, 229, 231, 232, and 489. SOA 487 includes appointments 227, 228, 229, 231, 233, and 490. Appointments 488, 489, and 490 are one or more other appointments.

Figure 19:
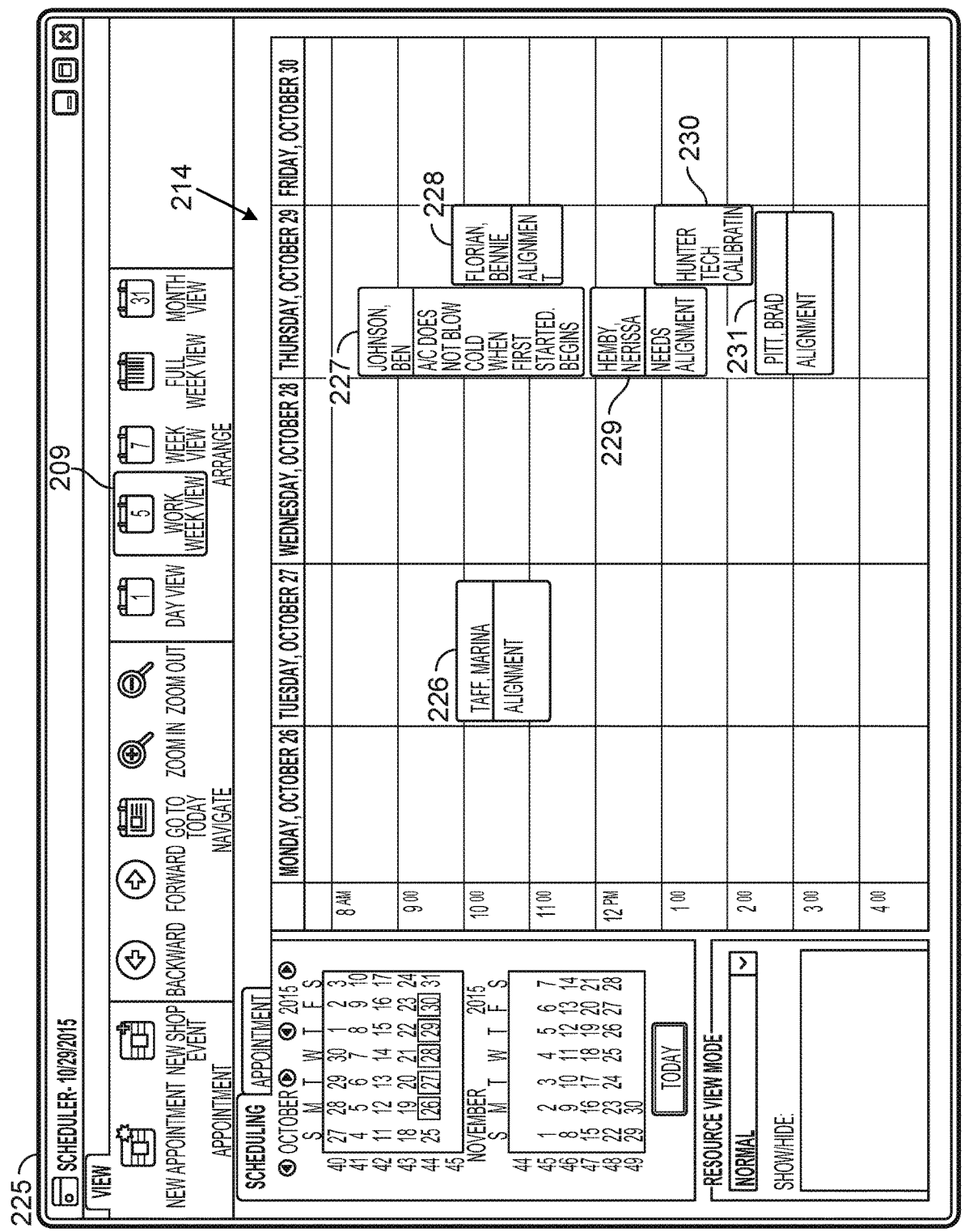

Next, FIG. 19 shows a GUI 225 to display a vehicle shop schedule 214 in a work week view. The vehicle shop schedule 214 can be displayed in response to a processor receiving an input indicating selection of the work week view selector 209 has occurred. The vehicle shop schedule 214, similar to other vehicle shop schedules shown in the figures, comprises a schedule matrix with multiple columns and multiple rows. The schedule matrix (or more simply, "matrix") comprises multiple columns, each column representing a different date, and multiple rows, each row representing a different time. In an alternative arrangement, the columns can represent the times and the rows can represent the dates.

The vehicle shop schedule 214 comprises a service appointment 226 scheduled for October 27, service appointments (or more simply, "appointments") 227, 228, 229, and 231 scheduled for October 29, and a shop event 230 scheduled for October 29. The service appointments 226, 227, 228, 229 and 231 shown on the GUI 225 indicate a type of service to be performed and a customer name (e.g., a vehicle owner name, or a fleet owner name). The day on which the GUI 225 is being displayed may be highlighted to indicate the current date. In FIG. 19, the column for October 29 can be highlighted to gray or another color to indicate the current date. If a user of the scheduler desires to see more information about an appointment shown on the displayed vehicle shop schedule 214, the user may move a computer pointing device to hover (e.g., be positioned) above or in proximity to the service appointment.

Figure 20:
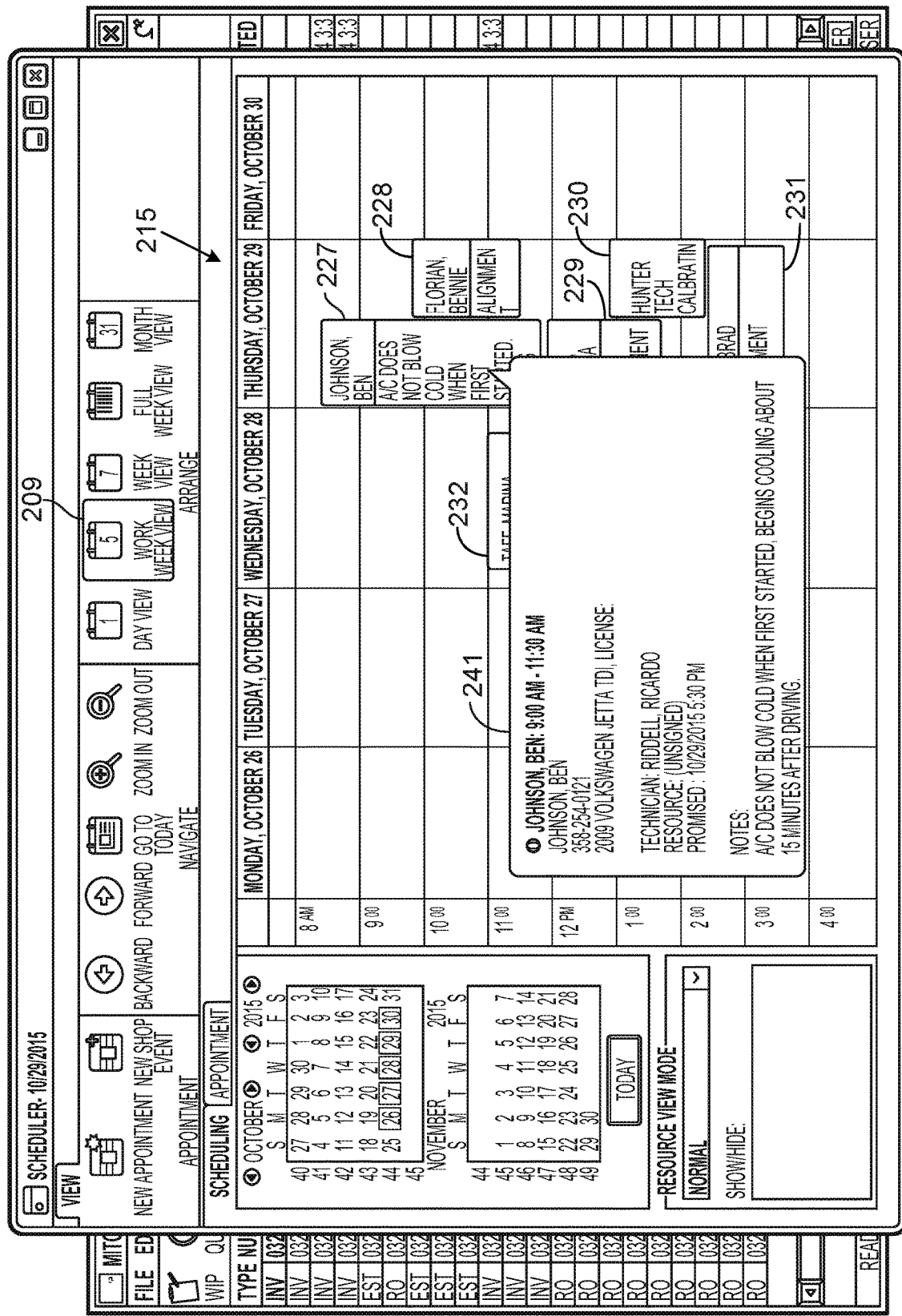

Next, FIG. 20 shows an example GUI 240 in which a computer pointing device is hovering above or in proximity to the service appointment 227 such that a GUI 241 is displayed upon the GUI 240. The GUI 241 includes additional information pertaining to the service appointment 227. Movement of the computer pointing device away from the service appointment 227 and the other displayed appointments may cause the scheduler to revert to displaying the GUI 249 shown in FIG. 23. The GUI 240 is displaying the vehicle shop schedule 215.

Figure 21:
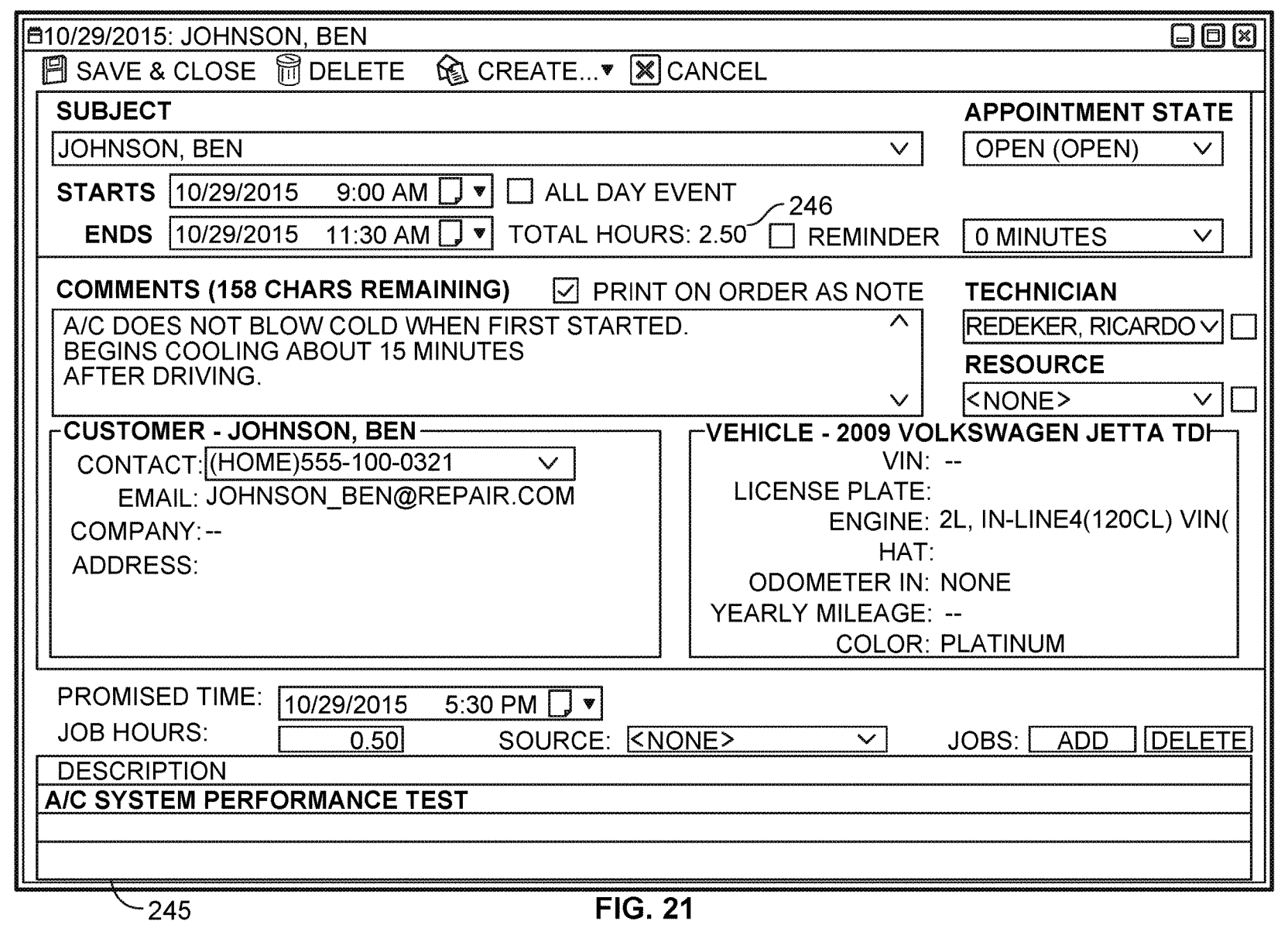

Next, FIG. 21 shows an example GUI 245 that the one or more processors of the scheduler may display in response to selecting the service appointment 227. The GUI 245 includes various fields pertaining to the service appointment 227. The data within the fields may be edited or deleted. New data may be entered into any field without any data. The GUI 245 includes a time 246 for the service appointment. In one respect, the time 246 may be selected by a user based on prior experience of how long it took to perform a service operation similar to the service operation to be performed or expected to be performed during the service appointment. In this example, the service appointment is for servicing the air conditioning system of a 2009 Volkswagen Jetta. In another respect, the time 246 may be determined by the one or more processors of the scheduler referring to a labor time guide listing expected times for servicing the air conditioning system of a 2009 Volkswagen Jetta. In yet another respect, the time 246 may represent an expected arrival time (e.g., 9:00 AM) of the customer's vehicle and a promised completion time (e.g., 11:30 AM) at which point the customer may pick up the vehicle.

Figure 22:
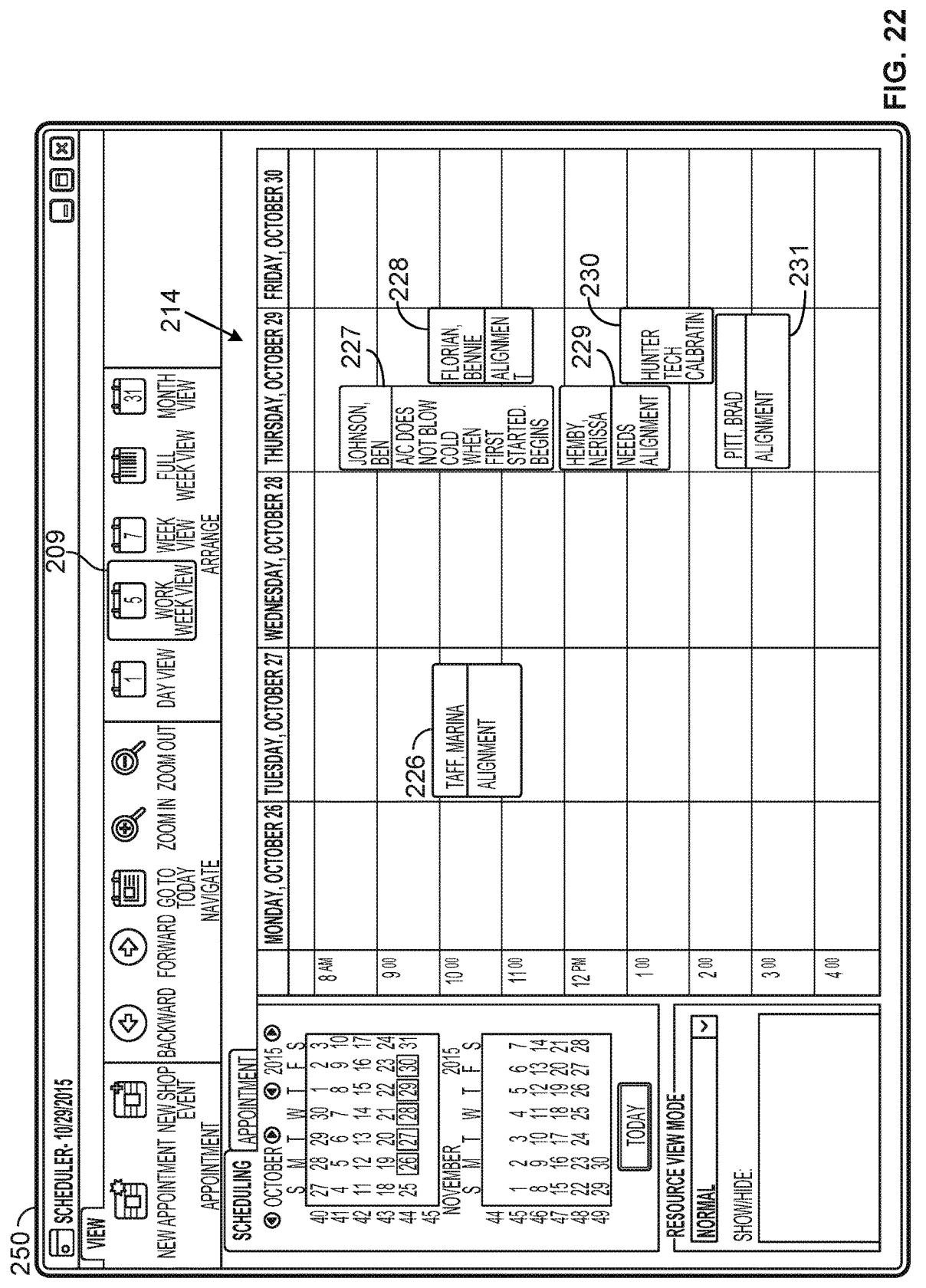
Figure 23:
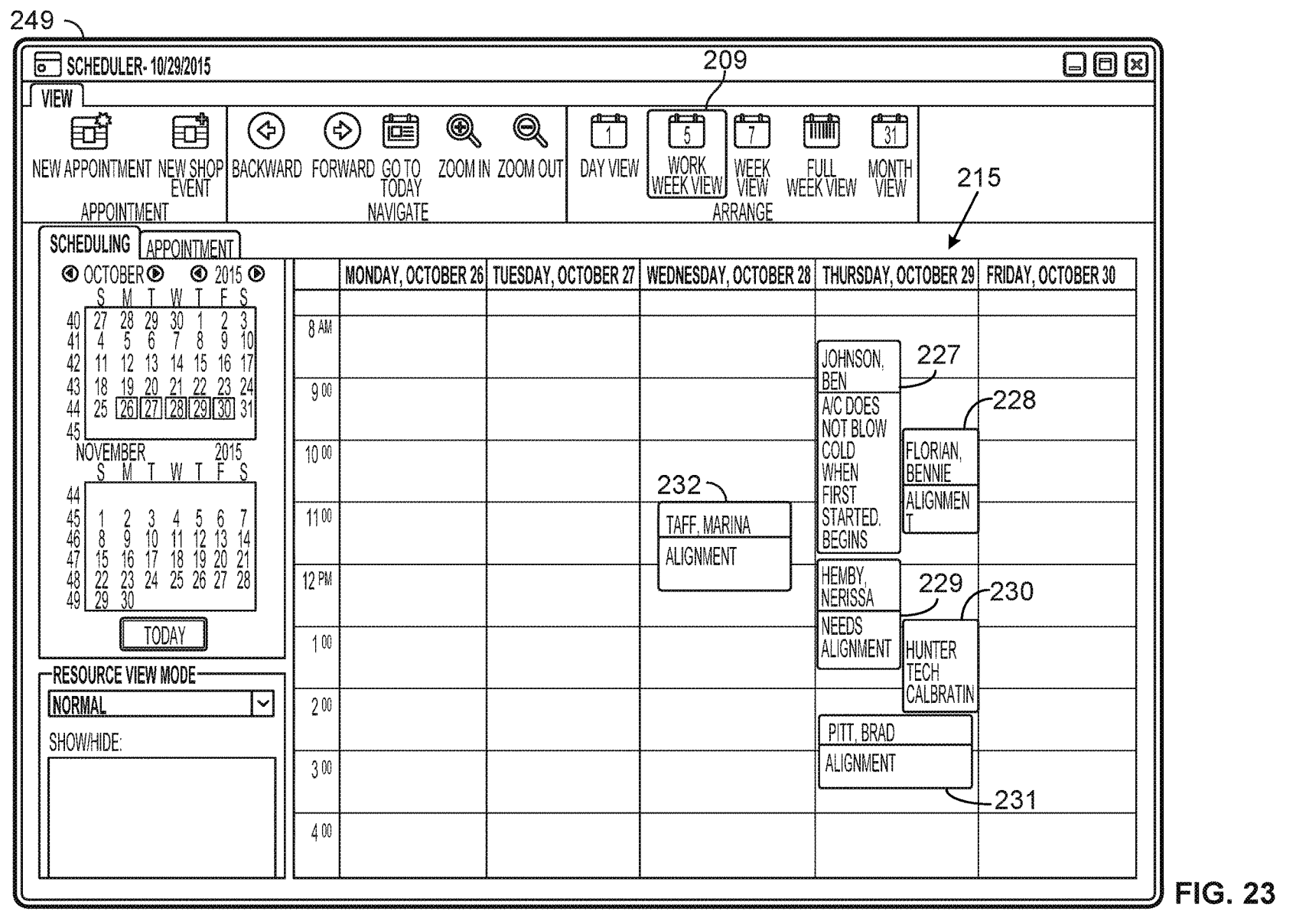

Next, FIG. 22 shows an example GUI 250 including the vehicle shop schedule 214 with the service appointment 226 pertaining to performing a vehicle alignment for a customer named Marina Taff. The GUI 250 shows the service appointment 226 is scheduled for October 27 from 9:50 AM to 11:15 AM. For any of a number of reasons, the service appointment 226 may need to be changed to October 28 to a different time period, and/or for a different length of time. The scheduler system allows for moving the service appointment 226 by selecting the service appointment 226 with a computer pointing device while the service appointment 226 is shown scheduled for October 27 and dragging the selected service appointment to the desired time and date (e.g., 11:00 to 12:30 on October 28). FIG. 23 shows an example GUI 249 that shows a vehicle shop schedule 215 resulting from selecting and dragging the service appointment 226 to the desired time and date. Modifying the time, date, and or time period for the service appointment 226 results in a modified service appointment 232 being generated and displayed on the GUI 249.

Figure 24:
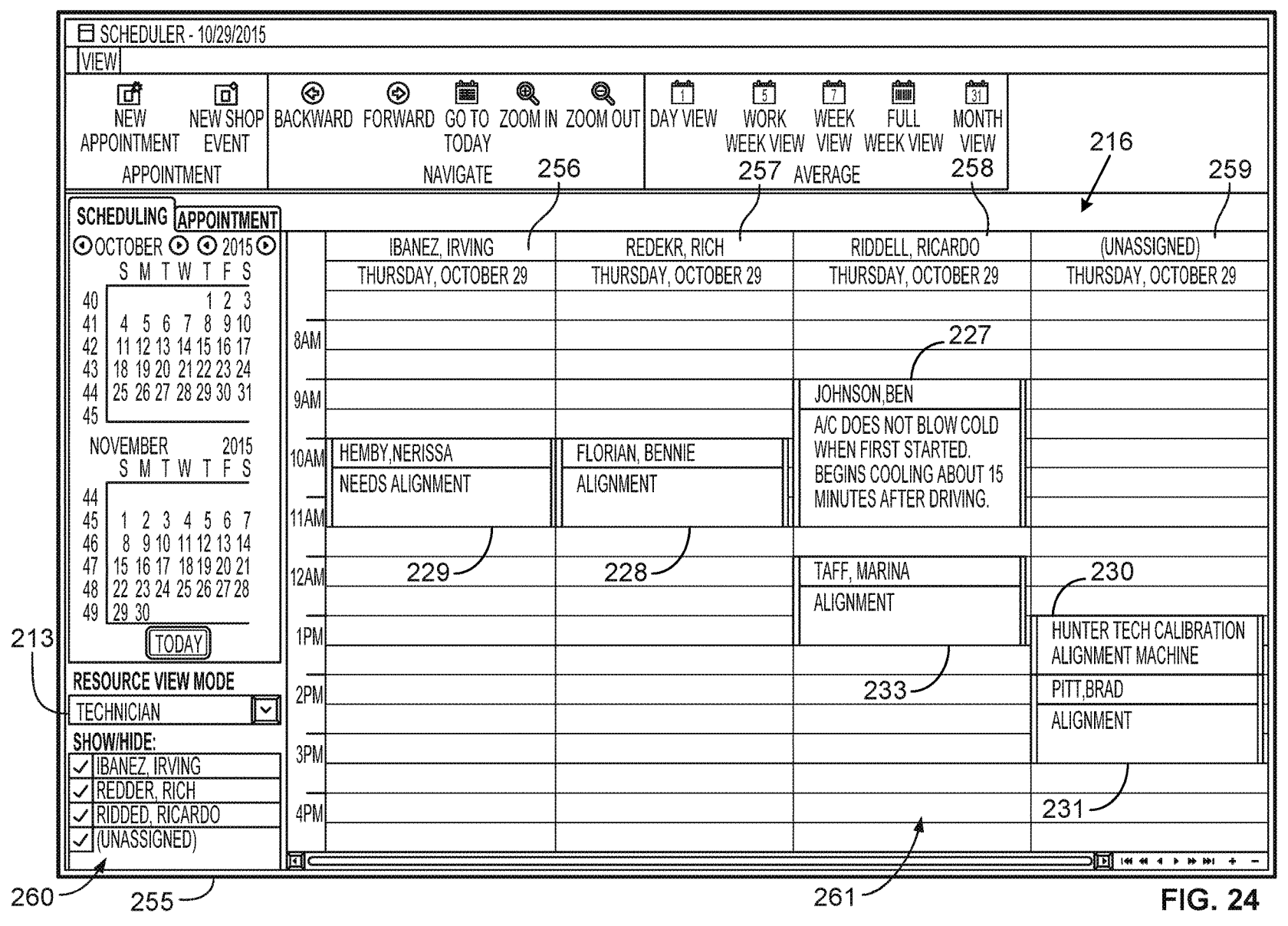

Next, FIG. 24 shows an example GUI 255 that the one or more processors of the scheduler may display in response to selecting the technician view from the resource view mode selector 213. The GUI 255 includes a vehicle shop schedule 216. The vehicle shop schedule 216 comprises a schedule matrix with multiple columns, each column representing a different technician, and multiple rows, each row representing a different time. In an alternative arrangement, the columns can represent the times and the rows can represent the technicians.

Upon selecting the technician view, names of technicians associated with active employee records may appear in a list of technicians 260. The list of technicians 260 may include selectors to select a technician if the technician's schedule is presently hidden from the calendar view 261 or to hide a technician's schedule from the calendar view 261 if the technician's schedule is presently displayed in the calendar view 261.

The calendar view 261 shows schedule 256 for technician Irving Ibanez, schedule 257 for technician Rich Redeker, schedule 258 for technician Ricardo Riddell, and a schedule 259 for presently unassigned appointments. The schedules 256, 257, 258, and 259 with the GUI 255 can be displayed using different colors. A service appointment from one of the displayed schedules 256, 257, 258, and 259 may be dragged and dropped from a first of those schedules to a second of those schedules so as to assign, reassign, or cancel assignment of a service appointment presently shown on the GUI 255. The schedules 256, 257, and 258 show a technician's workload relative to committed time.

Next, FIG. 25 shows an example GUI 260 that the one or more processors of the scheduler may display to notify a user of a conflict. The conflict may arise if the user attempts to assign a service appointment to a technician that is not available or currently scheduled to perform another service appointment at the same time. For example, the technician named Rich Redeker may be unavailable to handle another service appointment scheduled to arrive at 9:00 AM on October 29$^{th}$ and completed by 11:30 AM on the same date. The GUI 260 shows a message 261 indicating the technician is unavailable during the appointment time. Other messages regarding conflicts may be displayed when a conflict exists for a shop resource or if the user is attempting to schedule the service appointment at a time the shop is closed. The one or more processors of the scheduler may determine the conflict.

Figure 26:
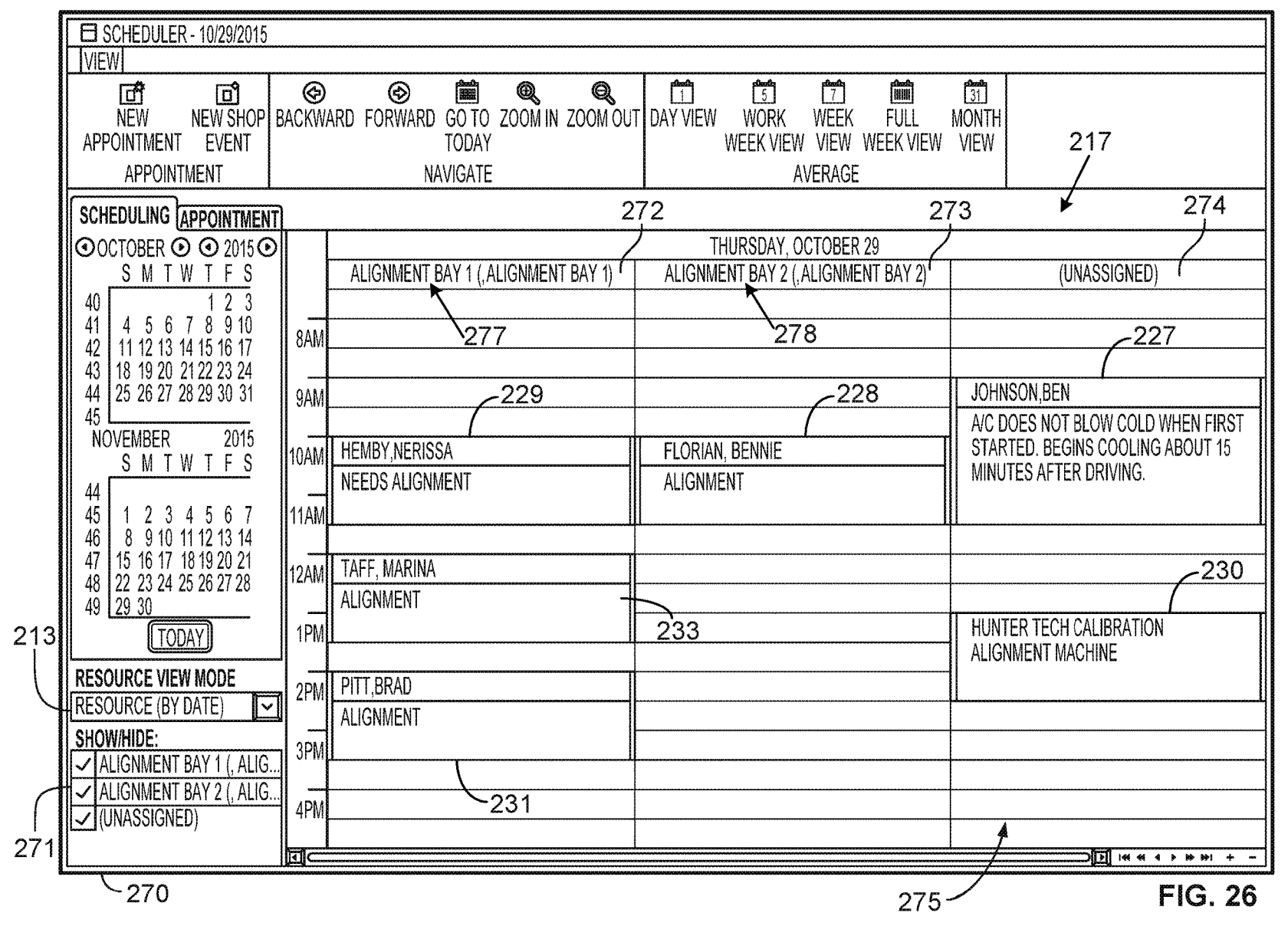

Next, FIG. 26 shows an example GUI 270 that the one or more processors of the scheduler may display in response to selecting the resource view from the resource view mode selector 213. The GUI 270 includes a vehicle shop schedule 217. The vehicle shop schedule 217 comprises a schedule matrix with multiple columns, each column representing a different shop resource, and multiple rows, each row representing a different time. In an alternative arrangement, the columns can represent the times and the rows can represent the shop resources.

Upon selecting the resource view, names of resources associated with active resource records may appear in a list of shop resources 271. The list of shop resources 271 may include selectors to select a shop resource if the shop resource's schedule is currently hidden from the calendar view 275 or to hide a shop resource's schedule from the calendar view 275 if the shop resource's schedule is presently displayed in the calendar view 275.

The calendar view 275 shows schedule 272 for a shop resource referred to as alignment bay 1 by a vehicle bay identifier 277, schedule 273 for a shop resource referred to as alignment bay 2 by a vehicle bay identifier 278, and a schedule 274 for service appointment presently not assigned to any shop resources. The schedules 272, 273, and 274 in the GUI 270 can be displayed using different colors. A service appointment from one of the displayed schedules 272, 273, and 274 may be dragged and dropped from a first of those schedules to a second of those schedules so as to assign, reassign, or cancel assignment of a service appointment presently shown on the GUI 270. The schedules 272, 273, and 274 show commitment of a shop resource relative to available time for the shop resource.

The at least one processor of the scheduler can modify the appointment 227 to be associated with a shop resource such that the appointment 227 is moved from the unassigned schedule 274 to a schedule for the shop resource associated with the appointment 227. As an example, the processor can associate an air conditioning recovery and recharge (ACRR) station with the appointment 227. The processor(s) can determine that there is no conflict with scheduling the appointment 227 from 9:00 to 11:00 AM on Oct. 29, 2015 before modifying the appointment 227 to be associated with the ACRR station. Modifying the appointment 227 can include reconfiguring the GUI 270 such that the appointment 227 is not shown in the schedule 274 and reconfiguring the GUI 270 to include a column showing a schedule for use of the ACRR station. The schedule for use of the ACRR station can include an identifier of the ACRR station the appointment 227.

The at least one processor of the scheduler can modify the shop appointment 230 to be associated with a shop resource such that the appointment 227 moved from the unassigned schedule 274 to a schedule for the shop resource associated with the shop appointment 230. As an example, the at least one processor can associate the alignment bay 2 with the shop appointment 230. The processor(s) can determine that there is no conflict with scheduling the appointment 230 from 1:00 PM to 2:30 PM on Oct. 29, 2015 before modifying the appointment 230 to be associated with the alignment bay 2.

Figure 35:
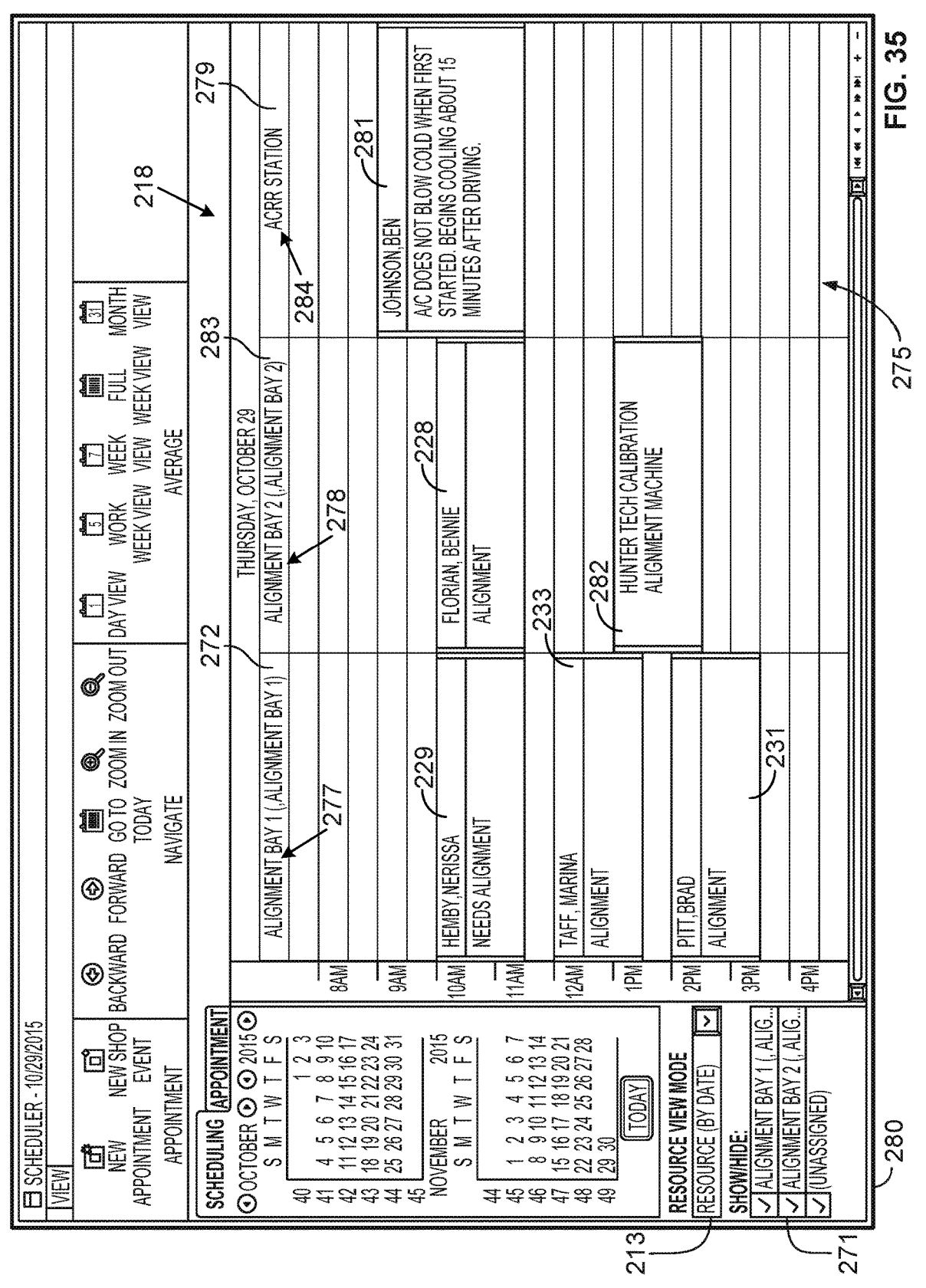

Modifying the appointments 227 and 230 can include reconfiguring the display 353 to display a GUI 280 (as shown in FIG. 35) such that the appointments 227 and 230 are not shown in the schedule 274, reconfiguring the display 353 to display a schedule 279 pertaining to use of the ACRR station including the appointment 281 (which results from associating the appointment 227 with the ACRR station), and reconfiguring the display 353 to display a schedule 283 for the alignment bay 2 including the appointment 228 and the shop appointment 282 (which results from associating the shop appointment 230 with the alignment bay 2). The schedule for use of the ACRR station can include an identifier of the ACRR station the appointment 227. The GUI 280 includes a shop tool identifier 284 for the ACRR station of the schedule 279. The GUI 280 includes a vehicle shop schedule 218. The vehicle shop schedule 218 comprises a schedule matrix with multiple columns each column representing a different shop resource, and multiple rows, each row representing a different time. In an alternative arrangement, the columns can represent the times and the rows can represent the shop resources.

III. Example Systems and Devices

Figure 27:
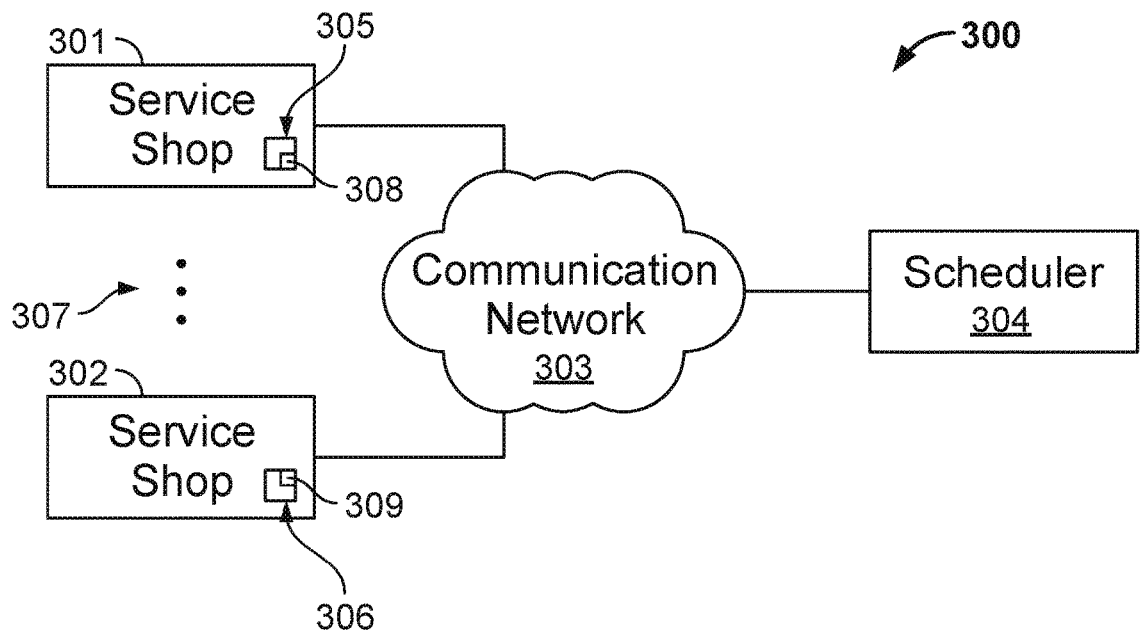
FIGS. 27 and 28 are block diagrams of example systems including a scheduler.

FIG. 27 is a block diagram 300 showing components and locations of a system in accordance with an example embodiment. The components and locations shown in FIG. 27 include a service shop 301, a service shop 302, a communication network 303, and a scheduler 304. FIG. 27 shows an ellipse 307 between service shops 301 and 302 to represent that the system 300 may include one or more other service shops. As an example, the service shops 301 and 302 may include a vehicle transmission repair shop, a manufacturer's dealer repair shop, an independent repair shop, a vehicle oil change service shop, or some other type of service shop at which a vehicle may be taken for servicing.

A vehicle is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed or skied. As yet another example, any vehicle described herein may include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

The service shop 301 includes at least one schedule display device 305 having at least one display 308 to display the GUI that the scheduler 304 (e.g., the one or more processors of the scheduler 304) may provide to the service shop 301 over the communication network 303. Similarly, the service shop 302 includes at least one schedule display device 306 having at least one display 309 to display the GUI that the scheduler 304 (e.g., the one or more processors of the scheduler 304) may provide to the service shop 302 over the communication network 303. Each of the one or more other service shops represented by the ellipse 307 may each include one or more schedule display devices.

Figure 28:
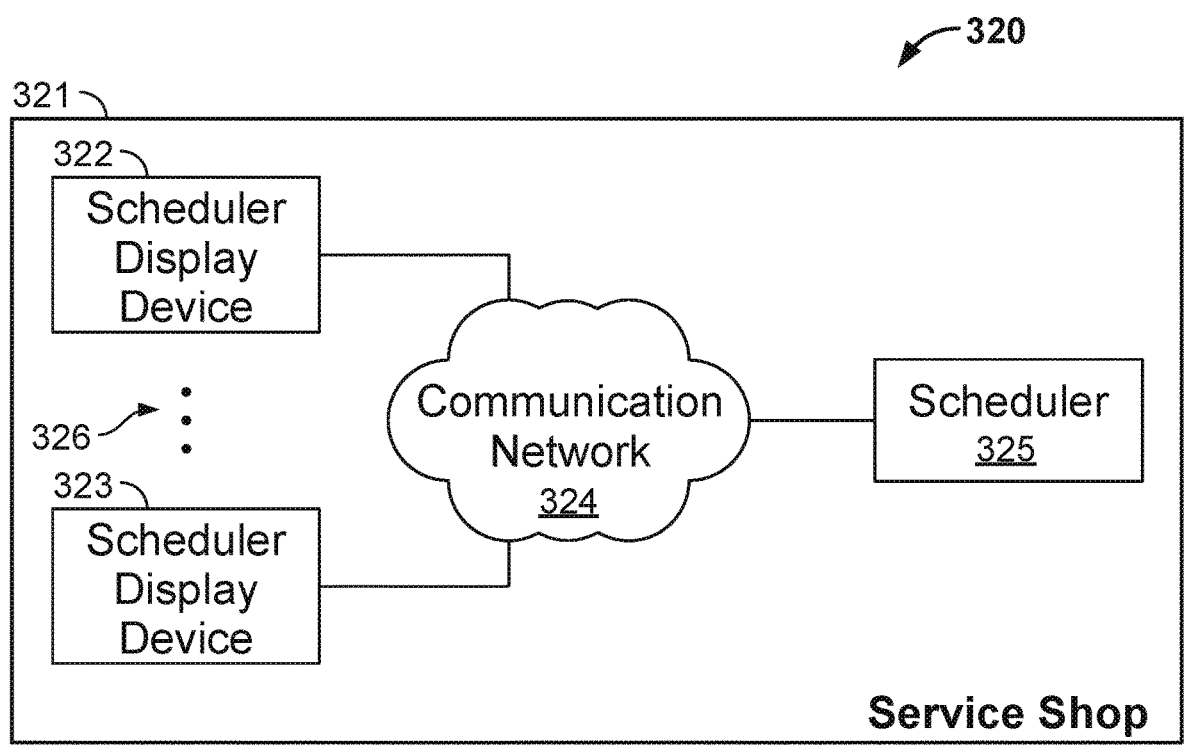

FIG. 28 is a block diagram 320 showing components and locations of a system in accordance with an example embodiment. The components and locations shown in FIG. 28 include a service shop 321, and the following components within the service shop 321: a schedule display device 322, a schedule display device 323, a communication network 324, and a scheduler 325. FIG. 28 shows an ellipse 326 between schedule display devices 322 and 323 to represent that the service shop 321 may include one or more other schedule display devices. As an example, the service shop 321 may include a vehicle transmission repair shop, a manufacturer's dealer repair shop, an independent repair shop, a vehicle oil change service shop, or some other type of service shop at which a vehicle may be taken for servicing.

A communication network, such as communication network 303 or 324, may include a computing device that connects components of the communication network to another computing device, such as a schedule display device or a scheduler. As an example, a communication network may include a router, a modem, a communication link, an access point, a wiring hub, an Ethernet switch to allow devices at various locations of the communication network to connect to one another. A communication network may include a wireless communication link, such as a Wi-Fi® communication link, or a wired communication link, such as an Integrated Service Digital Network, a Digital Subscriber Link, a coaxial cable, or a fiber optic cable. A communication network may include a local area network (LAN), a metropolitan area network (MAN), or a wide area network (WAN). A communication network may include the Internet or a portion thereof.

Figure 29:
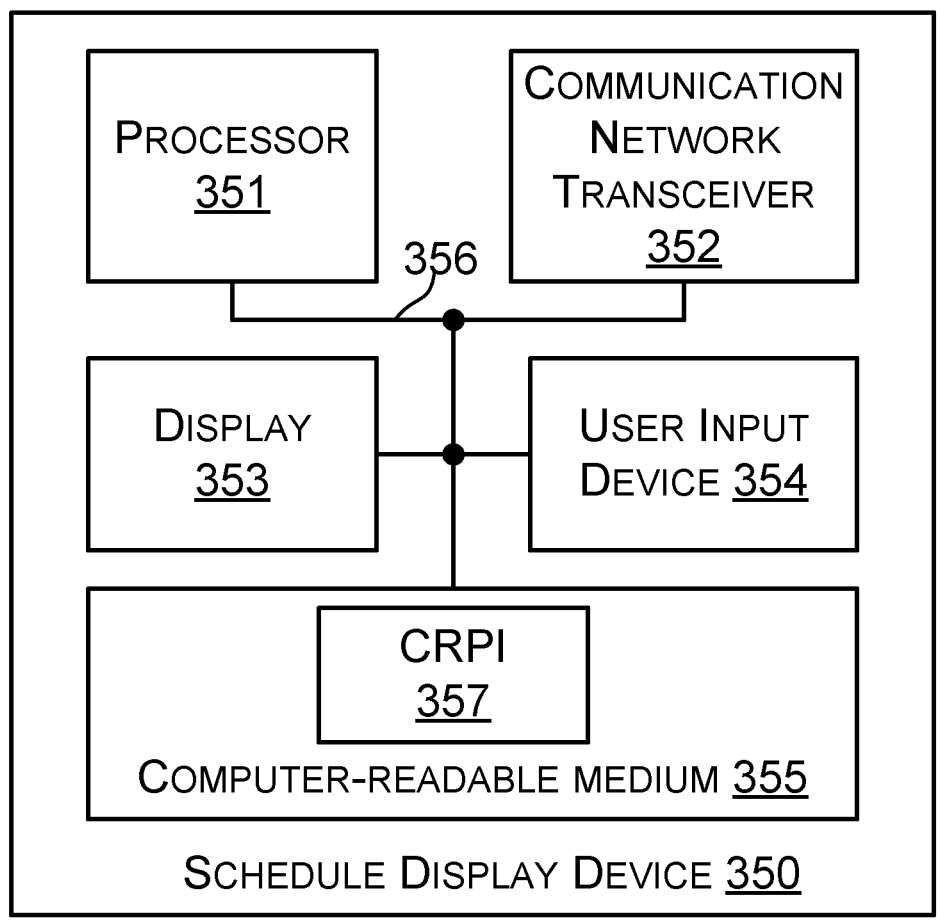
FIG. 29 is a block diagram of an example schedule display device.

Next, FIG. 29 is a block diagram of a schedule display device 350. A schedule display device may include all of the components shown in FIG. 29 or any proper subset of the components shown within the schedule display device 350. For example, the schedule display device 350 may include a processor 351, a communication network transceiver 352, a display 353, a user input device 354, and a computer-readable medium 355. Two or more of the aforementioned components shown in FIG. 29 may be communicatively coupled or linked together via a system bus, network, or other connection mechanism 356. A schedule display device (e.g., schedule display device 301, 302, 322, or 323) shown in FIG. 27 and FIG. 28 may include, or may be configured as, the schedule display device 350. The schedule display devices shown in FIG. 27 and FIG. 28 may include all or any proper subset of the components of the schedule display device 350. Two or more of the components shown within the schedule display device 350 may be located within a single housing. Two or more of the components shown within the schedule display device 350 may be located remotely from each other in different housings or otherwise.

A processor, such as the processor 351 or any other processor discussed in this description or included within a device or system described in this description may include one or more processors, such as one or more general purpose processors (e.g., INTEL® single core microprocessors or INTEL® multicore microprocessors) or one or more special purpose processors (e.g., digital signal processors or graphics processors). A graphics processor may be configured to access and use the CRM 357 for creating, or retrieving GUI to display on the display 353. Additionally or alternatively, a processor may include an application specific integrated circuit (ASIC). A processor may be configured to execute computer-readable program instructions (CRPI), such as CRPI 357 stored in the CRM 355. A processor may be configured to execute hard-coded functionality in addition to or as an alternative to software-coded functionality (e.g., via CRPI).

A computer-readable medium, such as the CRM 355 or any other CRM discussed in this description or included within a device or system described in this description, may include a non-transitory CRM, a transitory CRM, or both a non-transitory CRM and a transitory CRM. In one respect, a non-transitory CRM may be integrated in whole or in part with a processor. In another respect, a non-transitory CRM, or a portion thereof, may be separate and distinct from a processor.

A non-transitory CRM may include, for example, a volatile or non-volatile storage component, such as an optical, magnetic, organic or other memory or disc storage. Additionally or alternatively, a non-transitory CRM may include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

A transitory CRM may include, for example, CRPI provided over a communication link, such as a communication link which is connected to or is part of the communication network. The communication link may include a digital or analog communication link. The communication link may include a wired communication link or a wireless communication link.

A CRM may be referred to by other terms such as a "computer-readable storage medium," a "data storage device," a "memory device," a "memory," or a "computer-readable database." Any of those alternative terms may be preceded with the prefix "transitory" or "non-transitory."

The communication network transceiver 352 may include one or more components for communicatively coupling the schedule display device 350 to a communication network, such as the communication network 303 or 324. The communication network transceiver 352 may include component(s) for wireless or wired communications via the communication network. The communication network transceiver 352 may include a modem or a network interface card.

Figure 32:
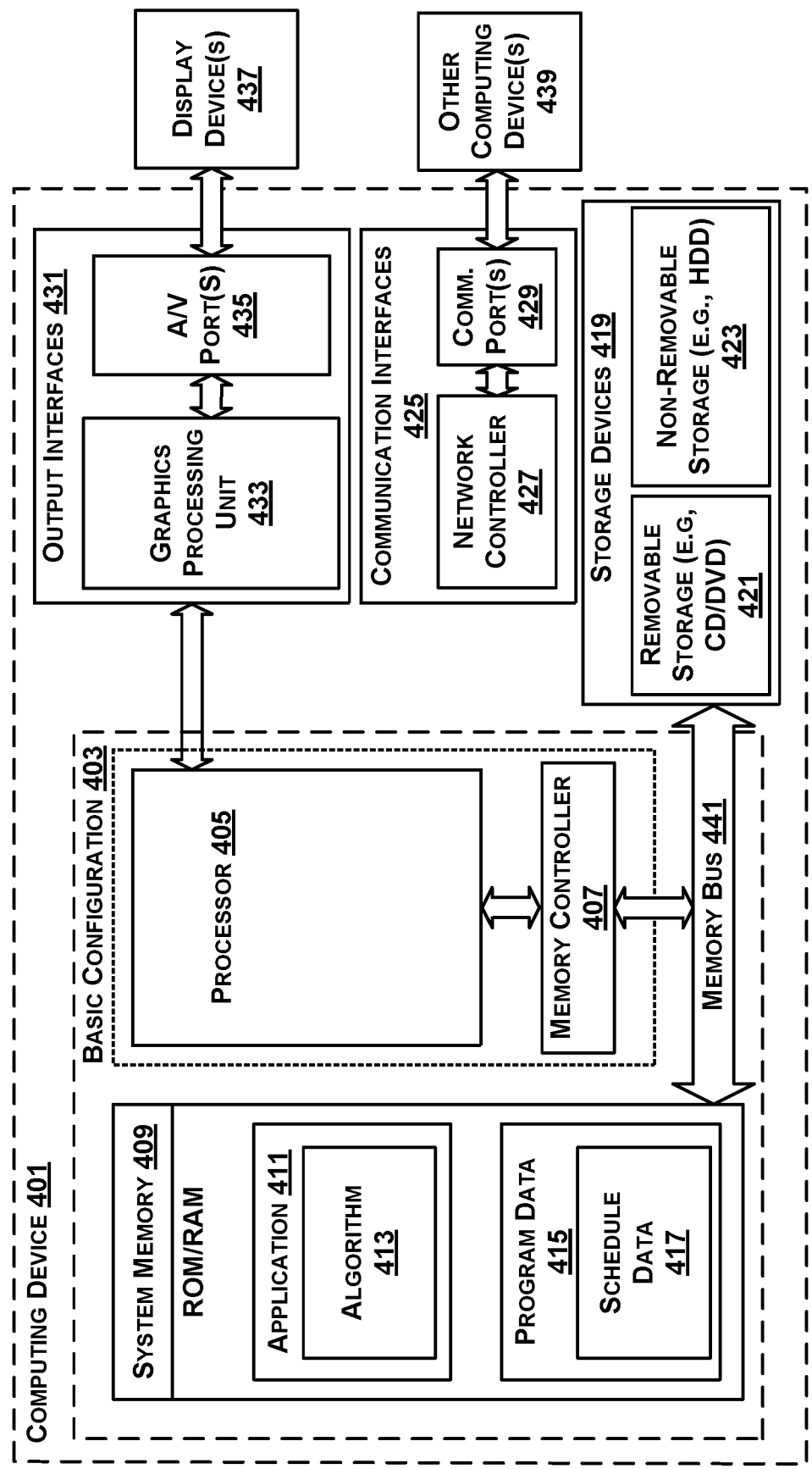
FIG. 32 is a functional block diagram illustrating an example computing device usable in a system that is arranged according to at least some of the example embodiment(s).

The communication network transceiver 352 may include the communication interfaces 425 shown in FIG. 32 or some portion thereof. The communication network transceiver 352 may include one or more transmitters and one or more receivers.

The communication network transceiver 352 may transmit various messages over the communication network. As an example, a message transmitted by the communication network transceiver 352 may include a message comprising data input by the user input device 354, such as any of the data input via the GUI shown in FIG. 1 to FIG. 26 and FIG. 35.

The communication network transceiver 352 may receive various messages transmitted over a communication network. As an example, the communication network transceiver 352 may receive a message that includes data for displaying a GUI, such as any GUI shown in FIG. 1 to FIG. 26 and FIG. 35. As another example, the communication network transceiver may receive a message indicating a scheduler conflict exists.

The display 353 may display a GUI or any aspect of a GUI described herein. The display 353 may be configured like display 371, 373, 375, or 377 (shown in FIG. 30) or any other example display described herein. The display 353 may display any visually-presentable data provided by the processor 351 or the CRM 357. The display 353 may display a GUI, such as GUI or a portion of any GUI described herein. The display 353 may be configured for a user to input schedule data and employee background details, as well as other data described herein as being input via a GUI.

The user input device 354 may include user-input elements configured so that a user of schedule display device 350 may input data for use by the processor 351 or by another element of the schedule display device 350. As an example, the user-input elements may include a connection to the display 353 in an embodiment in which the display 353 includes a touch display. As another example, the user-input elements may include a user input section having one or more input keys. As another example, the user-input elements may include a pointing device such as a computing device mouse, a keyboard (e.g., a QWERTY keyboard), a joystick, a display pointer (e.g. the pointing device 381 shown in FIG. 30), or a microphone for receiving spoken inputs.

In general, CRPI, such as the CRPI 357 or any other CRPI described herein, include program instructions executable by a processor. Further, and in general, CRPI may include various structures, modules, routines, or some other computer-readable logic. Further, and in general, CRPI may be written using a computer-programming language such as C++ or some other programming language.

In particular, the CRPI 357 may include program instructions executable by the processor 351 to carry out any one or more functions described herein or represented by the figures as being performed, at least in part, by the schedule display device 350 or a component of the schedule display device 350, or any other schedule display device described herein.

As an example, the CRPI 357 may include program instructions executable to cause the display 353 to display a GUI, such as any GUI shown in FIG. 1 to FIG. 26 and FIG. 35 or a GUI showing any portion of a GUI shown in FIG. 1 to FIG. 26 and FIG. 35.

As another example, the CRPI 357 may include program instructions that cause the processor 351 to detect data input using the user input device 354 and to cause the input data to be provided to the communication network transceiver 352 for transmission to a scheduler.

The schedule display device 350 may operate within the system 300 or 320 in place of one of the schedule display device 301, 302, 322 and 323, or in addition to any or each of the schedule display devices 301, 302, 322 or 323. One or more of the schedule display devices 301, 302, 322 and 323 shown in FIG. 27 and FIG. 28 may include or be arranged like the schedule display device 350 or may include all or any proper subset of the components of the schedule display device 350. One or more of the components of the schedule display device 350 may be arranged as a device or a system. A device or system may include one or more of the components of the schedule display device 350.

The schedule display devices 301, 302, 322, 323, and 350 are computing devices and may be arranged as or comprise the computing device 401 shown in FIG. 32 or any portion thereof. The CRPI 357 may be included as part of the program instructions 455 within a computer program product, such as the computer program product shown in FIG. 33.

Figure 30:
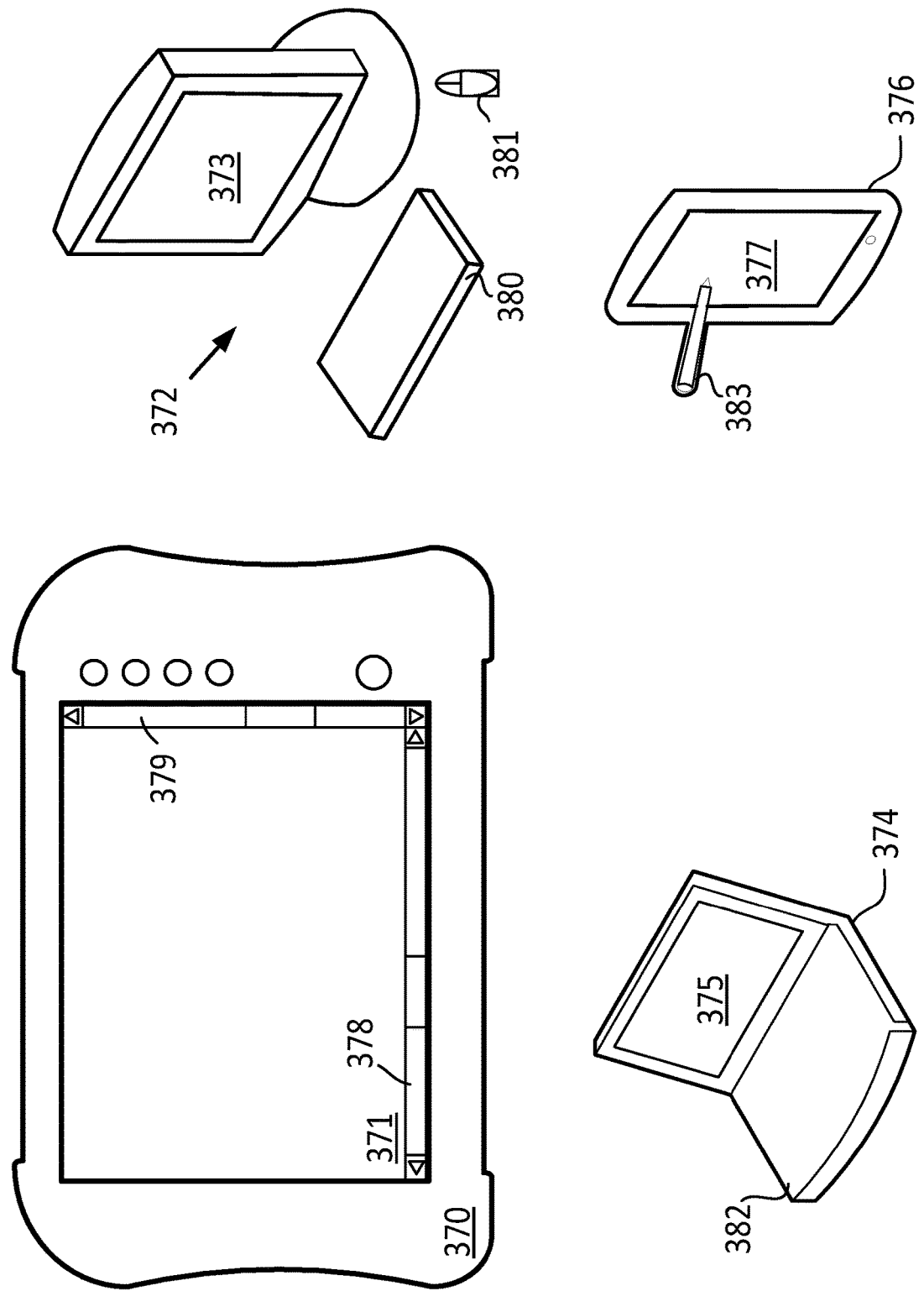
FIG. 30 shows example schedule display devices.

Next, FIG. 30 shows a plurality of example schedule display devices having a display screen. A first example schedule display device shown in FIG. 30 is a schedule display device 370 that includes a display 371. The schedule display device 370 may include, or may be configured to operate as a vehicle diagnostic device. A vehicle diagnostic device may connect to a vehicle by a communication link. As an example, the schedule display device 370 may include, or may be configured as, a hand-held vehicle diagnostic device, such as a MODIS™ ultra integrated diagnostic system (reference number EEMS328 W) available from Snap-on Incorporated of Kenosha, Wis.

Another example schedule display device shown in FIG. 30 is a schedule display device 372. The schedule display device 372 may include a display 373, and may include one or more of a keyboard 380 and a pointing device 381. The schedule display device 372 may include, or may be configured as, a desktop computing system, such as an Opti-Plex® 9020 Mini Tower desktop computing system available from Dell Computer Corporation, Austin, Tex., or some other desktop computing system. The keyboard 380 may include, or may be configured as, a wired or wireless QWERTY keyboard or some other keyboard for entering data or selections into the schedule display device 372. The pointing device 381 may include, or may be configured as, a wired or wireless computer mouse.

Another example schedule display device shown in FIG. 30 is a display device 374. The schedule display device 374 may include a display 375 and may include a keyboard 382. The schedule display device 374 may include, or may be configured as, a laptop computing system, such as the Dell Chromebook 11 desktop computing system available from Dell Computer Corporation, or some other laptop computing system.

Another example schedule display device shown in FIG. 30 is a display device 376 having a display 377. The schedule display device 376 may include, or may be configured as, a smartphone (such as an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea). Alternatively, the schedule display device 376 may include, or may be configured as, a tablet device (such as an IPAD® tablet device from Apple Inc., or a SAMSUNG GALAXY TAB tablet device from Samsung Electronics Co., Ltd.). Data or selections may be entered at the schedule display device 376 by way of a stylus 383 in contact with the display 377. Data or selections may be entered at the schedule display device 376 in other ways as well.

The display screens 371, 373, 375, and 377 may include, or may be configured as, any example display described herein or some other type of display configured for displaying the displayable aspects described herein, such as the GUIs. A first example display includes or is configured as a capacitive touch display. A second example display includes or is configured as a resistive touch display. A third example display includes or is configured as a plasma display. A fourth example display includes or is configured as a light emitting diode (LED) display. A fifth example display includes or is configured as a cathode ray tube display. A sixth example display includes or is configured as an organic light-emitting diode (OLED) display, such as an active-matrix OLED or a passive-matrix OLED. A seventh example display includes or is configured as a touch-display such as a color touch used on a MODIS™ ultra integrated diagnostic system. An eighth example display includes or is configured as a backlit color liquid crystal display (LCD) having a resistive touch or panel.

As shown in FIG. 30, the display 371 may display a horizontal scroll bar 378 and a vertical scroll bar 379. The horizontal scroll bar 378 may be used to cause the schedule display device 370 to display an unseen portion of a GUI at the display 371 instead of another portion of the GUI currently displayed at the display 371. The vertical scroll bar 379 may be used to cause the schedule display device 370 to display another unseen portion of the GUI at the display 371 instead of the portion of the GUI currently displayed at the display 371. Any other display described herein may include a horizontal scroll bar configured to operate like the horizontal scroll bar 378. Any other display described herein may include a vertical scroll bar configured to operate like the vertical scroll bar 379.

Figure 31:
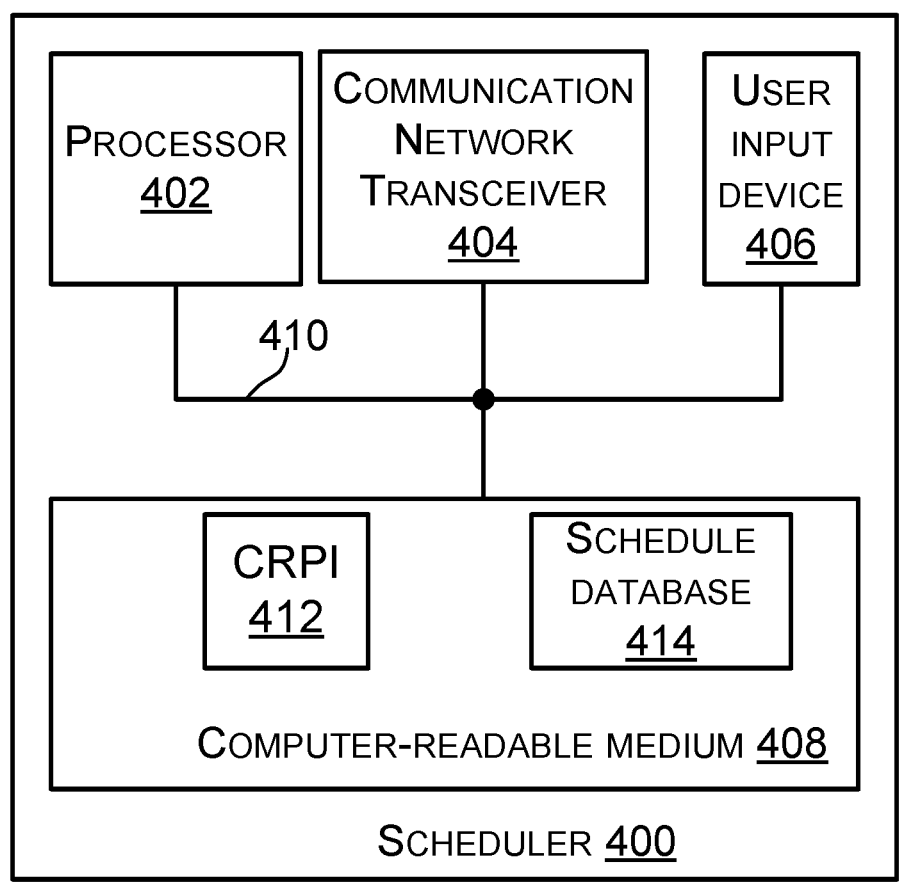
FIG. 31 is a block diagram of an example scheduler.

Next, FIG. 31 is a block diagram of a scheduler 400. A scheduler of the example embodiments may include all of the components shown in FIG. 31 or any proper subset of the components shown within the scheduler 400. For example, a scheduler may include a processor 402, a communication network transceiver 404, a user input device 406, and a CRM 408. Two or more of the aforementioned components shown in FIG. 31 may be communicatively coupled or linked together via a system bus, network, or other connection mechanism 410. The scheduler 304 shown in FIG. 27 and the scheduler 325 shown in FIG. 28 may include, or may be configured as, the scheduler 400. The scheduler 304 and the scheduler 325 may include all or any proper subset of the components of the scheduler 400. Two or more of the components shown within the scheduler 400 may be located within a single housing. Two or more of the components shown within the scheduler 400 may be located remotely from each other in different housings or otherwise.

The scheduler 400 may take the place of the scheduler 304 shown in FIG. 27 or the scheduler 325 shown in FIG. 28. The CRM 408 may include CRPI 412 and a schedule database 414.

The communication network transceiver 404 may include one or more components for communicatively coupling the scheduler 400 to a communication network, such as the communication network 303 or 324. The communication network transceiver 404 may include component(s) for wireless or wired communications via the communication network. The communication network transceiver 404 may include a modem or a network interface card. The communication network transceiver 404 may include a receiver to receive the various data described as being transmitted over the network to a scheduler or described as being received by a scheduler or the communication network transceiver 404. The communication network transceiver 404 may include a transmitter to transmit the various data described as being transmitted by the communication network transceiver 404, the processor 402, the scheduler 400 or the various data described as being received by a schedule display device 301, 302, 322, 324, or 350 or the communication network transceiver 352. The communication network transceiver 404 may include the communication interfaces 425 shown in FIG. 32 or some portion thereof.

The user input device 406 may include one or more components for entering (e.g., inputting) data into the scheduler 400 or modifying data stored in the CRM 408, such as data within the schedule database 414. As an example, the components of the user input device 406 may include a display screen, a user input section having one or more input keys, a pointing device such as a computing device mouse, a keyboard (e.g., a QWERTY keyboard), a display pointer (e.g. the pointing device 381 shown in FIG. 30), or a microphone for receiving spoken inputs.

As an example, the CRPI 412 may include program instructions to provide a GUI to a schedule display device and to provide a schedule display device with data to display in a GUI. As another example, the CRPI 412 may include program instructions to search the schedule database 414 for data to update a GUI being displayed on a display of a schedule display device.

The schedulers 304, 325, and 400 are computing devices and may be arranged as or comprise the computing device 401 shown in FIG. 32 or any portion thereof. The CRPI 412 may be included as part of the program instructions 455 within a computer program product, such as the computer program product shown in FIG. 33.

IV. Example Computing Devices

FIG. 32 is a functional block diagram illustrating an example computing device 401 used in a computing system that is arranged in accordance with at least some embodiments described herein. The computing device 401 can be implemented to output GUI as shown in FIG. 1 to FIG. 26 and FIG. 35. In a basic configuration 403, computing device 401 can typically include one or more processors 405 and system memory 409. A memory bus 441 can be used for communicating between the processor 405 and the system memory 409. Depending on the desired configuration, processor 405 can be any type of processor including but not limited to a microprocessor (µP), a microcontroller (µC), a digital signal processor (DSP), or any combination thereof. A memory controller 407 can also be used with the processor 405, or in some implementations, the memory controller 407 can be an internal part of the processor 405.

Depending on the desired configuration, the system memory 409 can be any type of computer-readable memory including but not limited to volatile memory (such as RAM), non-volatile memory (such as ROM, flash memory, etc.) or any combination thereof. System memory 409 can include one or more applications 411, and program data 415. Application 411 can include an algorithm 413 that is arranged to receive data described with respect to FIG. 1 to FIG. 26 and FIG. 35 and provide a schedule in accordance with the present disclosure. Program data 415 can include schedule data used to generate the schedule. In some example embodiments, application 411 can be arranged to operate with program data 415 on an operating system.

Computing device 401 can have additional features or functionality, and additional interfaces to facilitate communications between the basic configuration 403 and any devices and interfaces. For example, data storage devices 419 can be provided including removable storage devices 421, non-removable storage devices 423, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 409 and storage devices 419 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 401. Any such computer storage media can be part of device 401.

Computing device 401 can also include output interfaces 431 that can include a graphics processing unit 433, which can be configured to communicate to various external devices such as display devices 437 or speakers via one or more AN ports 435 or a communication interface 425. The communication interface 425 can include a network controller 427, which can be arranged to facilitate communications with one or more other computing devices 439 over a network (such as the communication network 303 or 324) via one or more communication ports 429. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 401 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 401 can also be implemented as a personal computer, including both laptop computer and non-laptop computer configurations, or a server.

Figure 33:
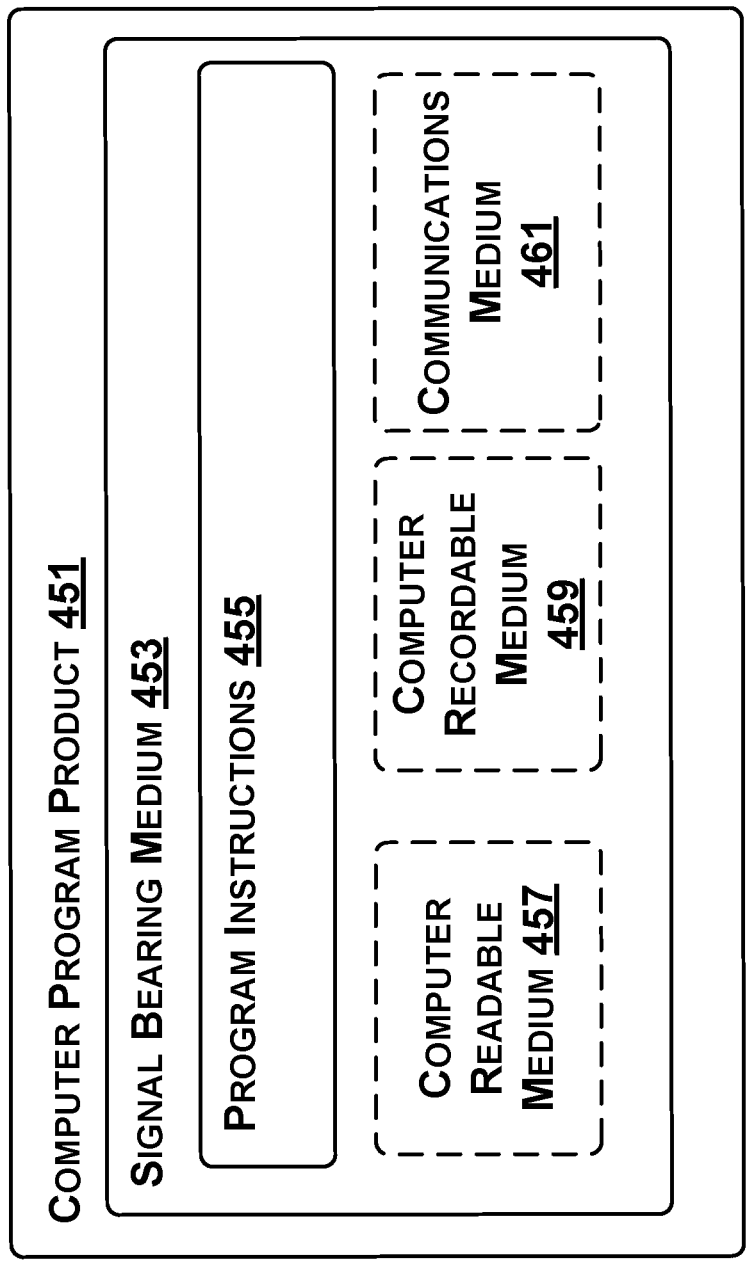
FIG. 33 is a schematic illustrating a conceptual view of an example computer program product that includes a computer program for executing a computer process on a computing device, arranged according to at least some of the example embodiment(s).

In some embodiments, the disclosed methods can be implemented as computer program instructions encoded on a non-transitory computer-readable storage media in a machine-readable format, or on other non-transitory media or articles of manufacture. FIG. 33 is a schematic illustrating a conceptual partial view of an example computer program product 451 that includes a computer program for executing a computer process on a computing device, arranged according to at least some embodiments presented herein.

In one embodiment, the example computer program product 451 is provided using a signal bearing medium 453. The signal bearing medium 453 can include one or more programming instructions 455 that, when executed by one or more processors can provide functionality or portions of the functionality described above with respect to FIG. 1 to FIG. 26 and FIG. 35. In some examples, the signal bearing medium 453 can encompass a CRM 457, such as, but not limited to, a hard disk drive, a Compact Disc (CD), a Digital Video Disk (DVD), a digital tape, memory, etc. In some implementations, the signal bearing medium 453 can encompass a computer recordable medium 459, such as, but not limited to, memory, read/write (R/W) CDs, R/W DVDs, etc. In some implementations, the signal bearing medium 453 can encompass a communications medium 461, such as, but not limited to, a digital and/or an analog communication medium (e.g., a fiber optic cable, a waveguide, a wired communications link, a wireless communication link, etc.). Thus, for example, the signal bearing medium 453 can be conveyed by a wireless form of the communications medium 461 (e.g., a wireless communications medium conforming to the IEEE 802.11 standard or other transmission protocol).

The one or more programming instructions 455 can be, for example, computer executable and/or logic implemented instructions. In some examples, a computing device such as the computing device 401 of FIG. 32 can be configured to provide various operations, functions, or actions in response to the programming instructions 455 conveyed to the computing device 401 by one or more of the CRM 457, the computer recordable medium 459, and/or the communications medium 461.

V. Example Operation

Figure 36:
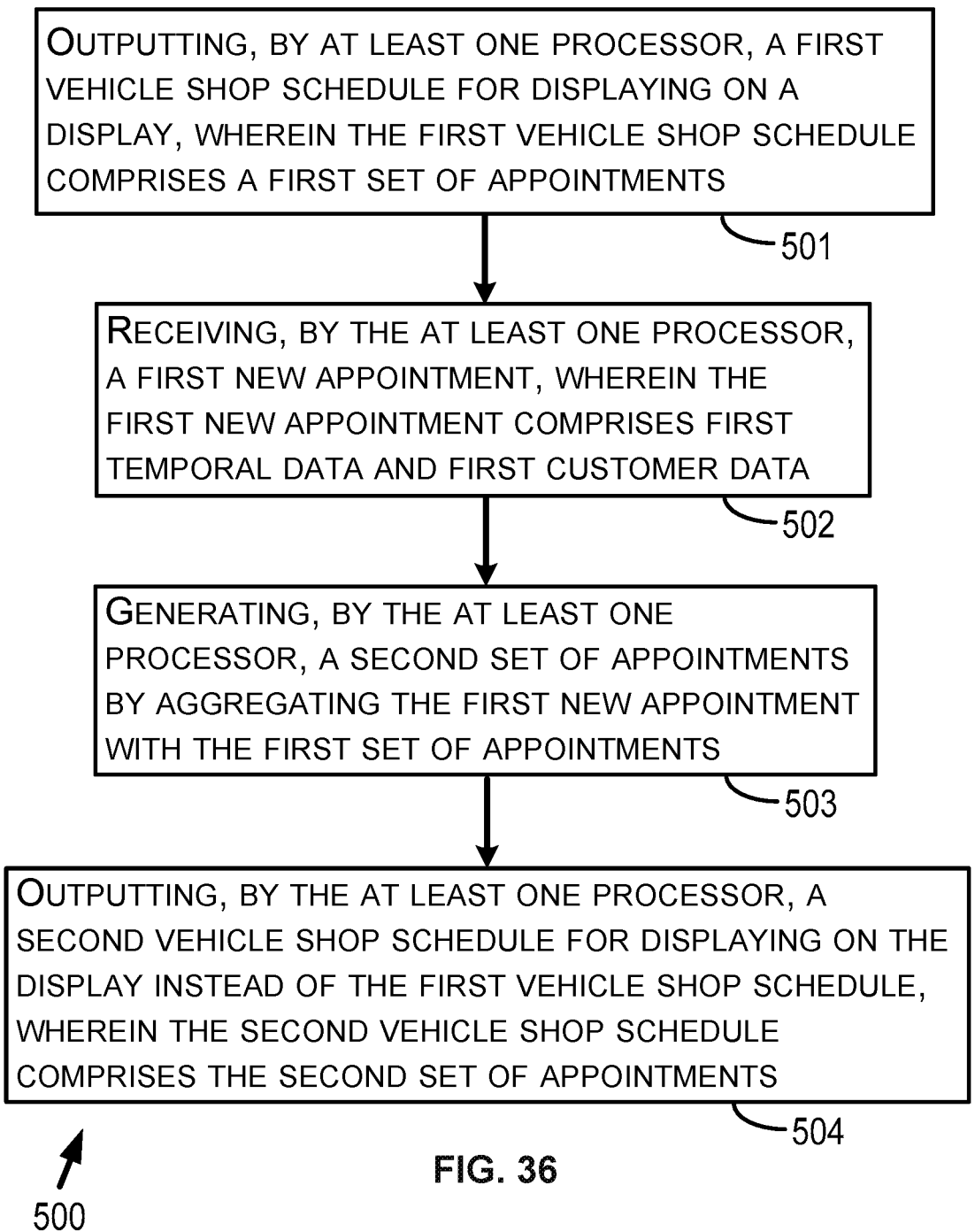

Next, FIG. 36 shows a flowchart depicting a set of functions 500 (or more simply "the set 500") that can be carried out in accordance with the example embodiments described in this description. The set 500 includes the functions shown in blocks labeled with whole numbers 501 through 504 inclusive. The following description of the set 500 includes references to elements shown in other figures described in this description, but the functions of the set 500 are not limited to being carried out only by the referenced elements. A variety of methods can be performed using all of the functions shown in the set 500 or any proper subset of the functions shown in the set 500. Any of those methods can be performed with other functions such as one or more of the other functions described in this description.

Block 501 includes outputting, by at least one processor, a first vehicle shop schedule for displaying on a display, wherein the first vehicle shop schedule comprises a first set of appointments. The first set of appointments can comprise one or more appointments, such as the one or more appointments of SOA 480, SOA 481, SOA 482, SOA 483, SOA 484, SOA 485, SOA 486, or SOA 487. The first vehicle shop schedule can comprise none or one or more shop events, such as shop event 230. The first vehicle shop schedule can comprise none or one or more schedule setup parameters. The display can comprise the display 353, 371, 373, 375, 377, and/or some other display configured for displaying the first vehicle shop schedule. The at least one processor can comprise the processor 351, 402, 405 and/or some other processor configured outputting the first vehicle shop schedule.

Outputting the first vehicle shop schedule can include a processor (e.g., the processor 402) outputting the first vehicle shop schedule to the communication network transceiver 404 for transmission of the first vehicle shop schedule to a schedule display device (e.g., the schedule display device 305, 322, or 350). Outputting the first vehicle shop schedule can include a processor (e.g., the processor 351) outputting the first vehicle shop schedule to the display 353 via the connection mechanism 356. Outputting the first vehicle shop schedule can comprise reconfiguring the display 353 to display the first vehicle shop schedule in place of another vehicle shop schedule being displayed when the schedule display device receives the first vehicle shop schedule output by the at least one processor.

Next, block 502 includes receiving, by the at least one processor, a first new appointment, wherein the first new appointment comprises first temporal data and first customer data. The first temporal data can comprise at least one time identifier and a date identifier. For example, if the first new appointment is appointment 226, the first temporal data can comprise a start time identifier (or more simply "start time") of 9:50 AM and the date Oct. 27, 2015. The first temporal data can comprise an end time identifier (or more simply "end time") of 11:15 AM. As an example, the at least one processor can receive the end time as a result of a user entering the end time via a user input device (e.g., user input device 354 or 406). As another example, the at least one processor can determine the end time based on the start time and an amount of time associated with one or more service procedures associated with the first new appointment. For the appointment 226, the amount of time associated with the wheel alignment procedure can be eighty-five minutes. The amount of time associated with a service procedure may be based on a variety of factors, such as the technician performing the service procedure and/or the type of vehicle to which the service procedure will be performed.

Next, block 503 includes generating, by the at least one processor, a second set of appointments by aggregating the first new appointment with the first set of appointments. As an example, if the first set of appointments comprises SOA 480 and appointment 227 is the first new appointment, the at least one processor can aggregate the appointment 227 with the SOA 480 to generate the SOA 481. As another example, if the first set of appointments is the SOA 482 and the appointment 488 is the first new appointment, the at least one processor can aggregate the appointment 488 with the SOA 482 to generate the SOA 485. The second set of appointments can be stored in the CRM 355 and/or the CRM 408. In particular, the second set of appointments can be stored in the schedule database 414.

Next, block 504 includes outputting, by the at least one processor, a second vehicle shop schedule for displaying on the display instead of the first vehicle shop schedule, wherein the second vehicle shop schedule comprises the second set of appointments. The second set of appointments can comprise one or more appointments, such as the one or more appointments of SOA 480, SOA 481, SOA 482, SOA 483, SOA 484, SOA 485, SOA 486, or SOA 487. The second vehicle shop schedule can comprise none or one or more shop events, such as shop event 230. The second vehicle shop schedule can comprise none or one or more schedule setup parameters.

Outputting the second vehicle shop schedule can include a processor (e.g., the processor 402) outputting the second vehicle shop schedule to the communication network transceiver 404 for transmission of the second vehicle shop schedule to a schedule display device (e.g., the schedule display device 305, 322, or 350). Outputting the second vehicle shop schedule can include a processor (e.g., the processor 351) outputting the second vehicle shop schedule to the display 353 via the connection mechanism 356. Outputting the second vehicle shop schedule can comprise reconfiguring the display 353 to display the second vehicle shop schedule in place of another vehicle shop schedule (e.g., the first vehicle shop schedule) being displayed when the schedule display device receives the second vehicle shop schedule output by the at least one processor.

Figure 37:
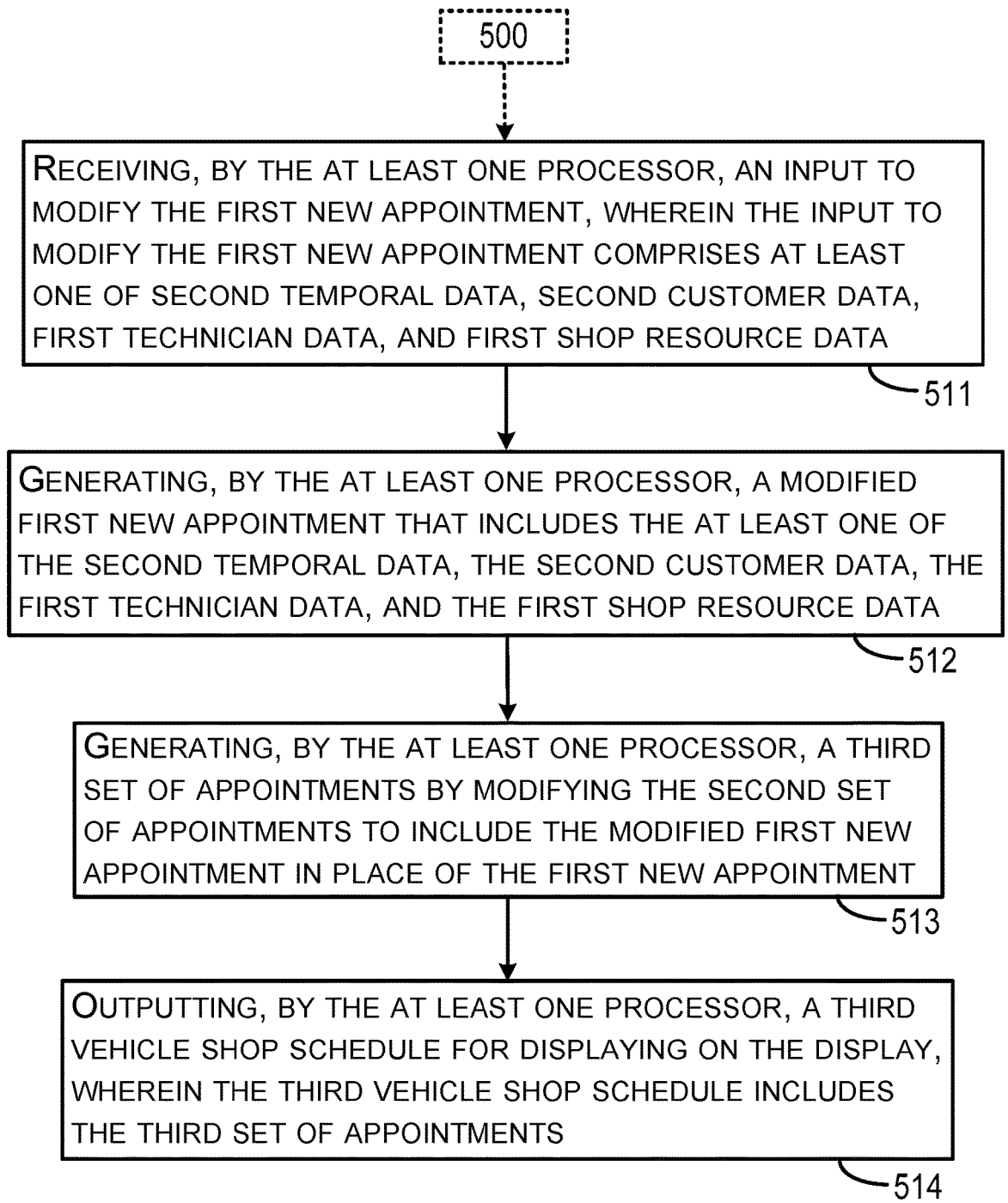

Next, FIG. 37 shows a flowchart depicting a set of functions 510 (or more simply "the set 510") that can be carried out in accordance with the example embodiments described in this description. The set 510 includes the functions shown in blocks labeled with whole numbers 511 through 514 inclusive. The set 510 can further include or not include the set 500. The following description of the set 510 includes references to elements shown in other figures described in this description, but the functions of the set 510 are not limited to being carried out only by the referenced elements. A variety of methods can be performed using all of the functions shown in the set 510 or any proper subset of the functions shown in the set 510. Any of those methods can be performed with other functions such as one or more of the other functions described in this description.

Block 511 includes receiving, by the at least one processor, an input to modify the first new appointment, wherein the input to modify the first new appointment comprises at least one of second temporal data, second customer data, first technician data, and first shop resource data. Table 1 shows the possible types of data that may be included within the input to modify the first new appointment. Each row represents a different example input. The letter(s) "X" in each row represents that the input includes that type of data. "None" in each row represents that the input does not include that type of data. Each example input represented by a row in Table 1 can include additional appointment data or no additional appointment data.

TABLE 1

| Second Temporal Data | Second Customer Data | First Technician Data | First Shop Resource Data | Row ID |
|---|---|---|---|---|
| X | None | None | None | A |
| None | X | None | None | B |
| None | None | X | None | C |
| None | None | None | X | D |
| X | X | None | None | E |
| X | None | X | None | F |
| X | None | None | X | G |
| None | X | X | None | H |
| None | X | None | X | I |
| None | None | X | X | J |
| X | X | X | None | K |
| X | X | None | X | L |
| X | None | X | X | M |
| None | X | X | X | N |
| X | X | X | X | O |

As shown in rows C, F, H, J, K, M, N and O in Table 1, the input to modify the first new appointment comprises at least the first technician data. The first technician data can comprise at least a first technician identifier to use in the modified first new appointment. The first technician identifier can comprise, for example, a technician name and/or a technician employee number. In the embodiments in which the input to modify the first new appointment comprises at least the first technician data, generating the modified first new appointment can comprise aggregating the first new appointment with the first technician data. Additionally or alternatively, in the embodiments in which the input to modify the first new appointment comprises at least the first technician data, generating the modified first new appointment can comprise replacing a second technician identifier with the first technician identifier if the first new appointment comprises second technician data comprising at least the second technician identifier.

As shown in rows D, G, I, J, L, M, N, and O in Table 1, the input to modify the first new appointment comprises at least the first shop resource data. As an example, the first shop resource data can comprise a vehicle bay identifier (e.g., vehicle bay identifier 277 or 278) and/or a shop tool identifier (e.g., the shop tool identifier 284). In the embodiments in which the input to modify the first new appointment comprises at least the first shop resource data, generating the modified first new appointment can comprise aggregating the first new appointment with the first shop resource data. Additionally or alternatively, in the embodiments in which the input to modify the first new appointment comprises at least the first shop resource data, generating the modified first new appointment can comprise replacing second shop resource data with the first shop resource data if the first new appointment comprises the second shop resource data.

As shown in rows A, E, F, G, K, L, M, and O in Table 1, the input to modify the first new appointment comprises at least the second temporal data. The first temporal data can comprise a first start time, a first end time, and a first calendar date. In accordance with an example in which the appointment 226 is the first new appointment, the first start time is 9:50 AM, the first end time is 11:15 AM, and the first calendar date is Oct. 27, 2015. The second temporal data can comprise a second start time, a second end time, and/or a second calendar date. Generating the modified first new appointment can comprise replacing the first start time with the second start time if the second temporal data comprises the second start time, replacing the first end time with the second end time if the second temporal data comprises the second end time, and/or replacing the first calendar date with the second calendar date if the second temporal data comprises the second calendar date. In modifying the first new appointment 226 to the modified first new appointment 232, the second temporal data comprises the second start time of 11:00 AM, the second end time of 12:30 PM, and the second calendar date of Oct. 28, 2016.

As shown in rows B, E, H, I, K, L, N, and O in Table 1, the input to modify the first new appointment comprises at least the second customer data. The second customer data can comprise a customer identifier (such as customer name "Mariana Taff" and/or an alpha-numeric identifier associated with a customer, or a vehicle identifier (e.g., a vehicle identification number)). In the embodiments in which the input to modify the first new appointment comprises at least the second customer data, generating the modified first new appointment can comprise replacing the first customer data with the second customer data or adding the second customer data to the first customer data.

Next, block 512 includes generating, by the at least one processor, a modified first new appointment that includes the at least one of the second temporal data, the second customer data, the first technician data, and the first shop resource data. The modified first new appointment can be stored in the CRM 355 and/or the CRM 408. In particular, the modified first new appointment can be stored in the schedule database 414.

Next, block 513 includes generating, by the at least one processor, a third set of appointments by modifying the second set of appointments to include the modified first new appointment in place of the first new appointment. The third set of appointments can be stored in the CRM 355 and/or the CRM 408. In particular, the third set of appointments can be stored in the schedule database 414.

Next, block 514 includes outputting, by the at least one processor, a third vehicle shop schedule for displaying on the display, wherein the third vehicle shop schedule includes the third set of appointments. Outputting the third vehicle shop schedule can include a processor (e.g., the processor 402) outputting the third vehicle shop schedule to the communication network transceiver 404 for transmission of the third vehicle shop schedule to a schedule display device (e.g., the schedule display device 305, 322, or 350). Outputting the third vehicle shop schedule can include a processor (e.g., the processor 351) outputting the third vehicle shop schedule to the display 353 via the connection mechanism 356. Outputting the third vehicle shop schedule can comprise reconfiguring the display 353 to display the third vehicle shop schedule in place of another vehicle shop schedule (e.g., the second vehicle shop schedule) being displayed when the schedule display device receives the third vehicle shop schedule output by the at least one processor.

Figure 38:
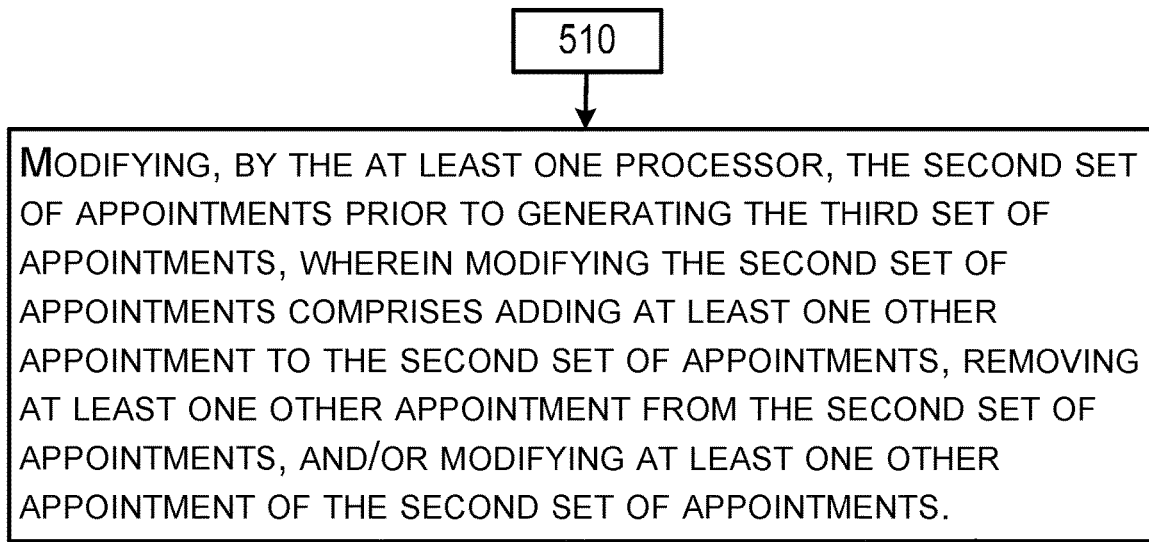

Next, FIG. 38 shows a flowchart depicting a set of functions 520 (or more simply "the set 520") that can be carried out in accordance with the example embodiments described in this description. The set 520 includes the functions shown in block labeled with the whole number 521 and the set 510. The following description of the set 520 includes references to elements shown in other figures described in this description, but the functions of the set 520 are not limited to being carried out only by the referenced elements. A variety of methods can be performed using all of the functions shown in the set 520 or any proper subset of the functions shown in the set 520. Any of those methods can be performed with other functions such as one or more of the other functions described in this description.

Block 521 includes modifying, by the at least one processor, the second set of appointments prior to generating the third set of appointments, wherein modifying the second set of appointments comprises adding at least one other appointment to the second set of appointments, removing at least one other appointment from the second set of appointments, and/or modifying at least one other appointment of the second set of appointments.

Figure 39:
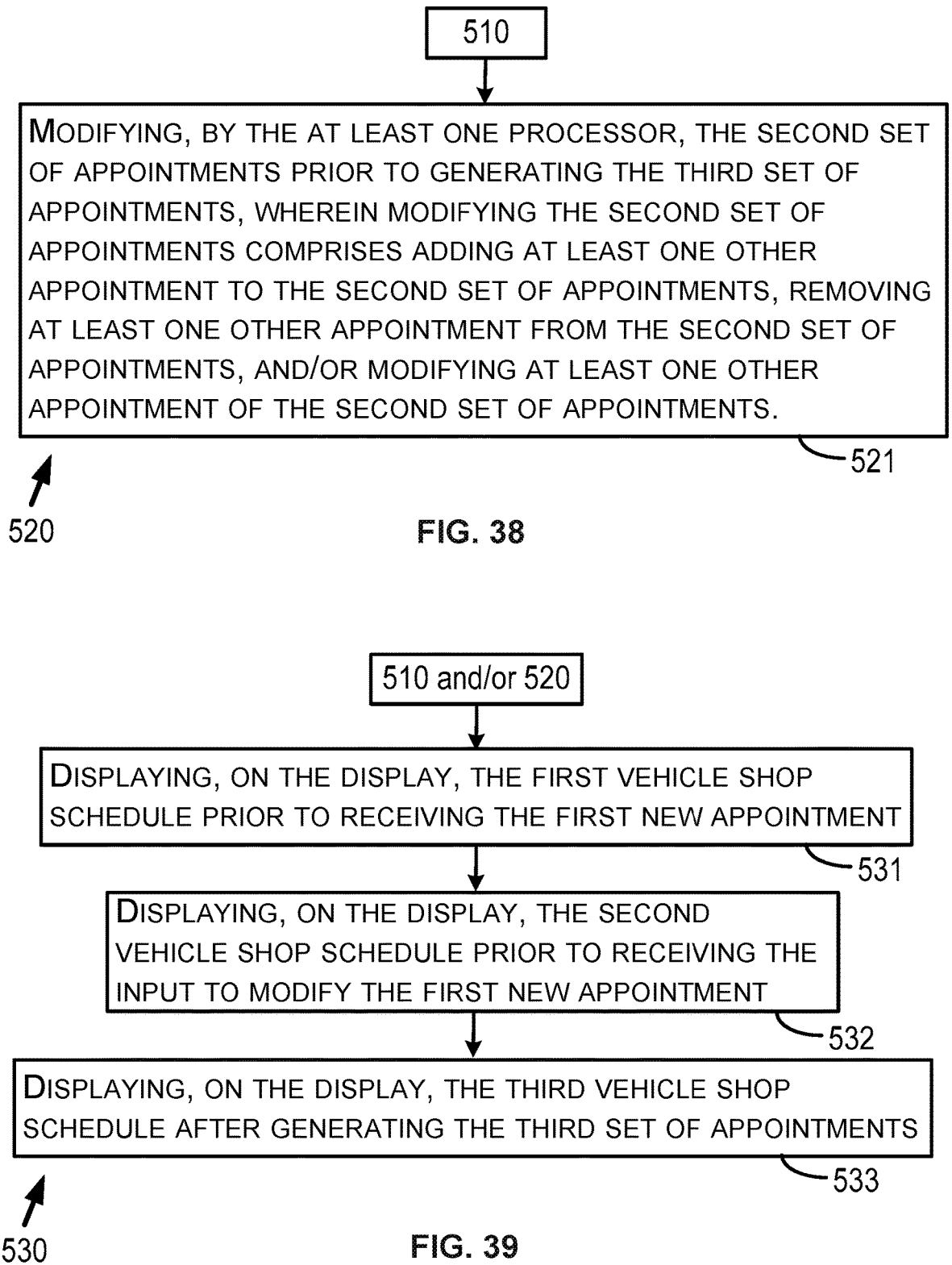

Next, FIG. 39 shows a flowchart depicting a set of functions 530 (or more simply "the set 530") that can be carried out in accordance with the example embodiments described in this description. The set 530 includes the functions shown in blocks labeled with whole numbers 531 through 533 and the set 510 and/or the set 520. The following description of the set 530 includes references to elements shown in other figures described in this description, but the functions of the set 530 are not limited to being carried out only by the referenced elements. A variety of methods can be performed using all of the functions shown in the set 530 or any proper subset of the functions shown in the set 530. Any of those methods can be performed with other functions such as one or more of the other functions described in this description.

Block 531 includes displaying, on the display 353, the first vehicle shop schedule prior to receiving the first new appointment. As an example, the first vehicle shop schedule can comprise appointments 227, 228, 229, 230 and 231. The first new appointment can comprise appointment 226.

Next, block 532 includes displaying, on the display 353, the second vehicle shop schedule prior to receiving the input to modify the first new appointment. As an example, the second vehicle shop schedule can comprise the vehicle shop schedule 214 shown in FIG. 19, and the input to modify the first new appointment can comprise the inputs to modify the appointment 226 in order to generate the appointment 232.

Next, block 533 includes displaying, on the display 353, the third vehicle shop schedule after generating the third set of appointments. As an example, the third vehicle shop schedule can comprise the vehicle shop schedule 215 shown in FIG. 20.

Figure 40:
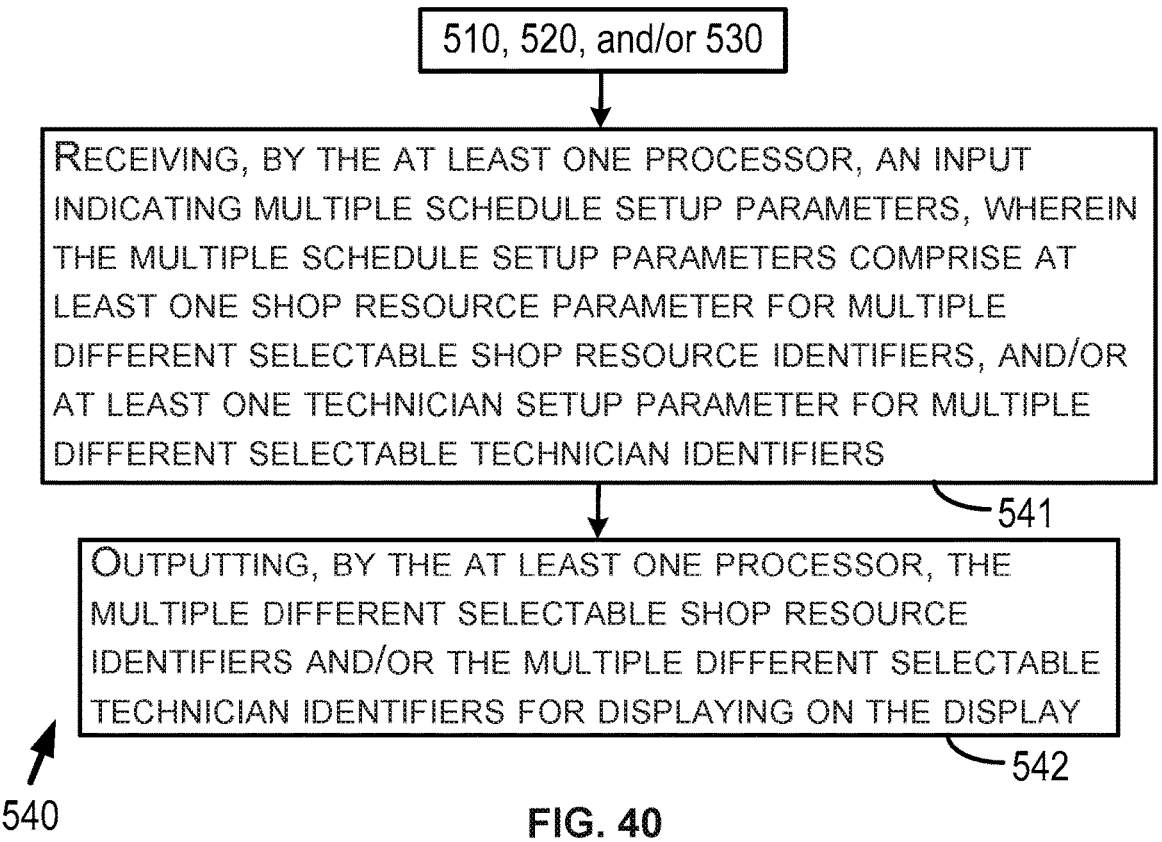

Next, FIG. 40 shows a flowchart depicting a set of functions 540 (or more simply "the set 540") that can be carried out in accordance with the example embodiments described in this description. The set 540 includes the functions shown in blocks labeled with whole numbers 541 through 542 and the set 510, the set 520, and/or the set 530. The following description of the set 540 includes references to elements shown in other figures described in this description, but the functions of the set 540 are not limited to being carried out only by the referenced elements. A variety of methods can be performed using all of the functions shown in the set 540 or any proper subset of the functions shown in the set 540. Any of those methods can be performed with other functions such as one or more of the other functions described in this description.

Block 541 includes receiving, by the at least one processor, an input indicating multiple schedule setup parameters, wherein the multiple schedule setup parameters comprise at least one shop resource parameter for multiple different selectable shop resource identifiers and/or at least one technician setup parameter for multiple different selectable technician identifiers.

The input to modify the first new appointment comprises at least the first technician data or the first shop resource data. FIG. 6 shows example technician data for an employee named Irving Ibanez. The input can comprise an identifier of the first technician data, such as "Irving Ibanez." FIG. 4 shows example shop resource data for an alignment bay assigned a bay number 5. The input can comprise an identifier of the shop resource data, such as "Alignment Bay 5." The input can comprise other data regarding technician and the shop resource.

If the input to modify the first new appointment comprises the first technician data, then receiving the input to modify the first new appointment comprises receiving a selection from multiple different selectable technician identifiers while displayed on the display. If the input to modify the first new appointment comprises the first shop resource data, then receiving the input to modify the first new appointment comprises receiving a selection from multiple different selectable technician identifiers while displayed on the display.

Next, block 542 includes outputting, by the at least one processor, the multiple different selectable shop resource identifiers and/or the multiple different selectable technician identifiers for displaying on the display.

Outputting the multiple different selectable shop resource identifiers and/or the multiple different selectable technician identifiers can include a processor (e.g., the processor 351) outputting the multiple different selectable shop resource identifiers and/or the multiple different selectable technician identifiers to the display 353 via the connection mechanism 356. Outputting the multiple different selectable shop resource identifiers and/or the multiple different selectable technician identifiers can comprise reconfiguring the display 353 to display the multiple different selectable shop resource identifiers and/or the multiple different selectable technician identifiers.

The multiple schedule setup parameters can also include at least one regular business hours parameter, at least one visible hours parameter, and/or at least one appointment state parameter. Furthermore, the multiple schedule setup parameters can include at least one holiday setup parameter for generating the first vehicle shop schedule and/or the second vehicle shop schedule based on a change to the regular business hours parameter based on the at least one holiday setup parameter.

Figure 41:
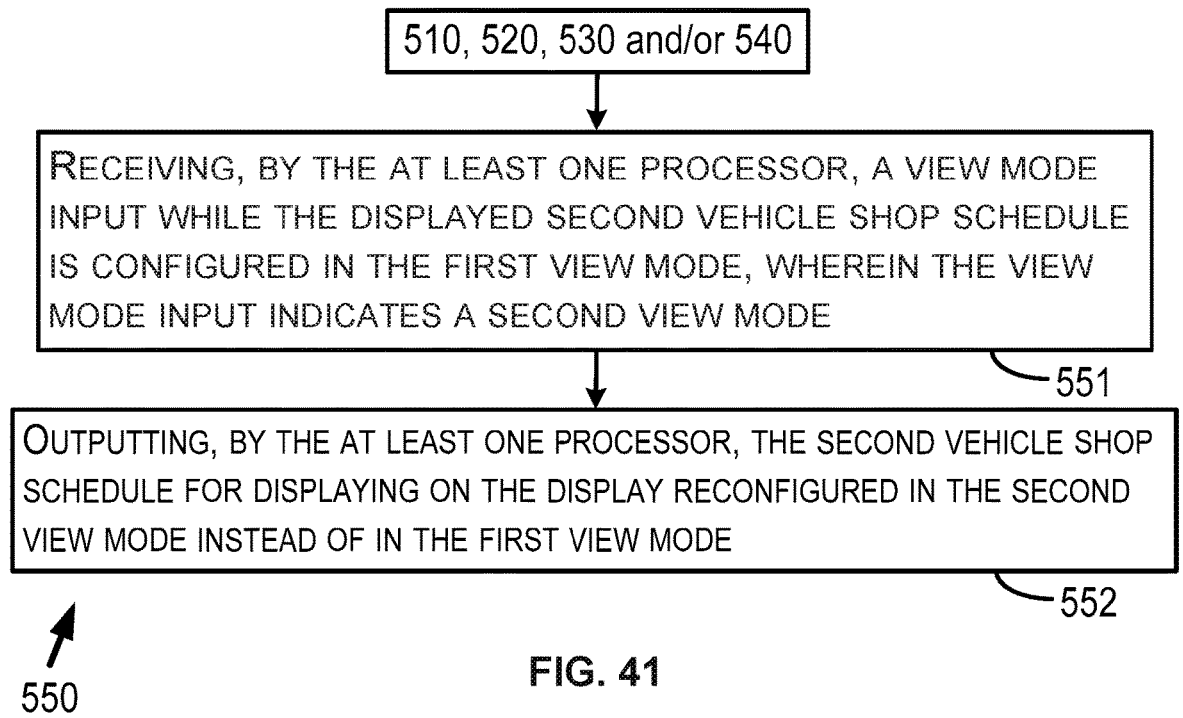

Next, FIG. 41 shows a flowchart depicting a set of functions 550 (or more simply "the set 550") that can be carried out in accordance with the example embodiments described in this description. The set 550 includes the functions shown in blocks labeled with whole numbers 551 and 552 and the set 510, the set 520, the set 530, and/or the set 540. The following description of the set 550 includes references to elements shown in other figures described in this description, but the functions of the set 550 are not limited to being carried out only by the referenced elements. A variety of methods can be performed using all of the functions shown in the set 550 or any proper subset of the functions shown in the set 550. Any of those methods can be performed with other functions such as one or more of the other functions described in this description.

Block 551 includes receiving, by the at least one processor, a view mode input while the displayed second vehicle shop schedule is configured in the first view mode, wherein the view mode input indicates a second view mode. The at least one processor can receive the input via use of the resource view mode selector 213. The first view mode can comprise a calendar view mode (which can be referred to as a normal view mode), a technician view mode, or a resource view mode. The second view mode can be a different view among the calendar view mode, the technician view mode, and the resource view mode.

Block 552 includes outputting, by the at least one processor, the second vehicle shop schedule for displaying on the display reconfigured in the second view mode instead of in the first view mode. Outputting the second vehicle shop schedule in the second view mode can include a processor (e.g., the processor 402) outputting the second vehicle shop schedule in the second view mode to the communication network transceiver 404 for transmission of the second vehicle shop schedule in the second view mode to a schedule display device (e.g., the schedule display device 305, 322, or 350). Outputting the second vehicle shop schedule in the second view mode can include a processor (e.g., the processor 351) outputting the second vehicle shop schedule in the second view mode to the display 353 via the connection mechanism 356. Outputting the second vehicle shop schedule in the second view mode can comprise reconfiguring the display 353 to display the second vehicle shop schedule in the second view mode in place of another vehicle shop schedule (e.g., the second vehicle shop schedule in the first view mode) being displayed when the schedule display device receives the second vehicle shop schedule in the second view mode output by the at least one processor.

Next, FIG. 42 shows a flowchart depicting a set of functions 560 (or more simply "the set 560") that can be carried out in accordance with the example embodiments described in this description. The set 560 includes the functions shown in blocks labeled with whole number 561 and the set 510, the set 520, the set 530, the set 540, and/or the set 550. The following description of the set 560 includes references to elements shown in other figures described in this description, but the functions of the set 560 are not limited to being carried out only by the referenced elements. A variety of methods can be performed using all of the functions shown in the set 560 or any proper subset of the functions shown in the set 560. Any of those methods can be performed with other functions such as one or more of the other functions described in this description.

Block 561 includes confirming, by the at least one processor, the first new appointment does not conflict with any other appointment in the first set of appointments. If the at least one processor determines a conflict exists, the at least one processor can output a message (e.g., the message 261) to indicate the conflict exists. The display 353, 371, 373, 375, and/or 377 can display the message. After changing the conflicting part of the first new appointment, the at least one processor can determine the first new appointment does not conflict with the other appointments of the first set of appointments. Alternatively, the at least one processor can determine initially that the first new appointment does not conflict with the other appointments of the first set of appointments.

Next, FIG. 43 shows a flowchart depicting a set of functions 570 (or more simply "the set 570") that can be carried out in accordance with the example embodiments described in this description. The set 570 includes the functions shown in blocks labeled with whole numbers 571 and 572 and the set 510, the set 520, the set 530, the set 540, the set 550, and/or the set 560. The following description of the set 570 includes references to elements shown in other figures described in this description, but the functions of the set 570 are not limited to being carried out only by the referenced elements. A variety of methods can be performed using all of the functions shown in the set 570 or any proper subset of the functions shown in the set 540. Any of those methods can be performed with other functions such as one or more of the other functions described in this description.

Block 571 includes adding, by the at least one processor, at least one shop event into the first vehicle shop schedule. As an example, the at least one shop event can comprise the shop event 230 or 282.

Next, block 572 includes confirming, by the at least one processor, the first new appointment does not conflict with the at least one shop event. If the at least one processor determines a conflict exists, the at least one processor can output a message to indicate the conflict exists. The display 353, 371, 373, 375, and/or 377 can display the message. After changing the conflicting part of the first new appointment or changing the shop event, the at least one processor can determine the first new appointment does not conflict with the at least one shop event. Alternatively, the at least one processor can determine initially that the first new appointment does not conflict with the at least one shop event.

Figure 44:
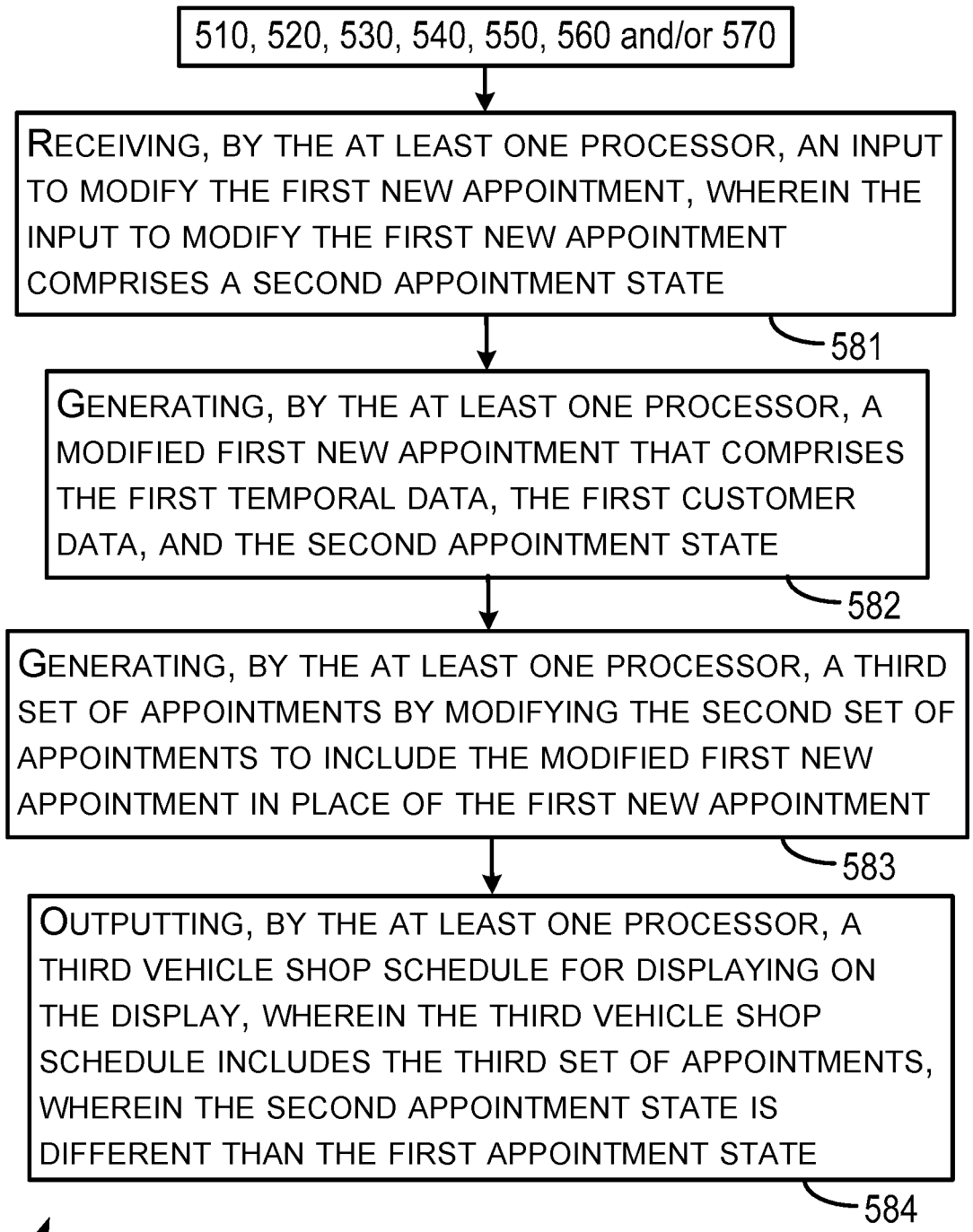

Next, FIG. 44 shows a flowchart depicting a set of functions 580 (or more simply "the set 580") that can be carried out in accordance with the example embodiments described in this description. The set 580 includes the functions shown in blocks labeled with whole numbers 581 through 584 and the set 510, the set 520, the set 530, the set 540, the set 550, the set 560, and/or the set 570. The following description of the set 580 includes references to elements shown in other figures described in this description, but the functions of the set 580 are not limited to being carried out only by the referenced elements. A variety of methods can be performed using all of the functions shown in the set 580 or any proper subset of the functions shown in the set 580. Any of those methods can be performed with other functions such as one or more of the other functions described in this description.

Block 581 includes receiving, by the at least one processor, an input to modify the first new appointment, wherein the input to modify the first new appointment comprises a second appointment state. The at least one processor can receive the input via use an appointment status selector, such as the GUI 142. The second appointment state can comprise any of the appointment states shown in the GUI 142 in FIG. 13 or another appointment state that can be defined.

Next, block 582 includes generating, by the at least one processor, a modified first new appointment that comprises the first temporal data, the first customer data, and the second appointment state. The modified first new appointment can be stored in the CRM 355 and/or the CRM 408. In particular, the modified first new appointment can be stored in the schedule database 414.

Next, block 583 includes generating, by the at least one processor, a third set of appointments by modifying the second set of appointments to include the modified first new appointment in place of the first new appointment. The third set of appointments can be stored in the CRM 355 and/or the CRM 408. In particular, the third set of appointments can be stored in the schedule database 414.

Next, block 584 includes outputting, by the at least one processor, a third vehicle shop schedule for displaying on the display, wherein the third vehicle shop schedule includes the third set of appointments, wherein the second appointment state is different than the first appointment state. Outputting the third vehicle shop schedule can include a processor (e.g., the processor 402) outputting the third vehicle shop schedule to the communication network transceiver 404 for transmission of the third vehicle shop schedule to a schedule display device (e.g., the schedule display device 305, 322, or 350). Outputting the third vehicle shop schedule can include a processor (e.g., the processor 351) outputting the third vehicle shop schedule to the display 353 via the connection mechanism 356. Outputting the third vehicle shop schedule can comprise reconfiguring the display 353 to display the third vehicle shop schedule in place of another vehicle shop schedule (e.g., the second vehicle shop schedule) being displayed when the schedule display device receives the third vehicle shop schedule output by the at least one processor.

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some CRM to perform some function can include executing all of the program instructions of those CRPI or only a portion of those CRPI.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising "A, B, and/or C," or "at least one of A, B, and C," or "one or more of A, B, and C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise.

Embodiments of the present disclosure may thus relate to one of the enumerated example embodiment (EEEs) listed below.

EEE 1 is a method comprising: (i) outputting, by at least one processor, a first vehicle shop schedule for displaying on a display, wherein the first vehicle shop schedule comprises a first set of appointments, (ii) receiving, by the at least one processor, a first new appointment, wherein the first new appointment comprises first temporal data and first customer data, (iii) generating, by the at least one processor, a second set of appointments by aggregating the first new appointment with the first set of appointments, and (iv) outputting, by the at least one processor, a second vehicle shop schedule for displaying on the display instead of displaying the first vehicle shop schedule, wherein the second vehicle shop schedule comprises the second set of appointments.

EEE 2 is the method of EEE 1, further comprising: (i) receiving, by the at least one processor, an input to modify the first new appointment, wherein the input to modify the first new appointment comprises at least one of second temporal data, second customer data, first technician data, and first shop resource data, (ii) generating, by the at least one processor, a modified first new appointment that includes the at least one of the second temporal data, the second customer data, the first technician data, and the first shop resource data, (iii) generating, by the at least one processor, a third set of appointments by modifying the second set of appointments to include the modified first new appointment in place of the first new appointment, and (iv) outputting, by the at least one processor, a third vehicle shop schedule for displaying on the display, wherein the third vehicle shop schedule includes the third set of appointments.

EEE 3 is the method of EEE 2, further comprising: modifying, by the at least one processor, the second set of appointments prior to generating the third set of appointments, wherein modifying the second set of appointments comprises adding at least one other appointment to the second set of appointments, removing at least one other appointment from the second set of appointments, and/or modifying at least one other appointment of the second set of appointments.

EEE 4 is the method of any one of EEEs 2 and 3, wherein the input to modify the first new appointment comprises at least the first technician data, wherein the first technician data comprises at least a first technician identifier to use in the modified first new appointment, and wherein generating the modified first new appointment comprises (i) aggregating the first new appointment with the first technician data, or (ii) replacing a second technician identifier with the first technician identifier if the first new appointment further comprises second technician data comprising at least the second technician identifier.

EEE 5 is the method of any one of EEEs 2 to 4, wherein the input to modify the first new appointment comprises at least the first shop resource data, and wherein generating the modified first new appointment comprises (i) aggregating the first new appointment with the first shop resource data, or (ii) replacing second shop resource data with the first shop resource data if the first new appointment further comprises the second shop resource data.

EEE 6 is the method of EEE 5, wherein the first shop resource comprises a vehicle bay identifier and/or a shop tool identifier.

EEE 7 is the method of any one of EEEs 2 to 6, wherein the first temporal data comprises a first start time, a first end time and a first calendar date, wherein the input to modify the first new appointment comprises at least the second temporal data, wherein the second temporal data comprises a second start time, a second end time, and/or a second calendar data, and wherein generating the modified first new appointment comprises replacing the first start time with the second start time if the second temporal data comprises the second start time, replacing the first end time with the second end time if the second temporal data comprises the second end time, and/or replacing the first calendar date with the second calendar date if the second temporal data comprises the second calendar date.

EEE 8 is the method of any one of EEEs 2 to 7, wherein the input to modify the first new appointment comprises at least the second customer data, and wherein generating the modified first new appointment comprises replacing the first customer data with the second customer data or adding the second customer data to the first customer data.

EEE 9 is the method of any one of EEEs 2 to 8, wherein the first vehicle shop schedule comprises a schedule matrix, wherein receiving the input to modify the first new appointment comprise receiving, by the at least one processor, an input indicating the first new appointment was dragged from a first location in the schedule matrix to a second location in the schedule matrix, wherein the first location in the schedule matrix pertains to a time and date indicated by the first new appointment, and wherein the second location in the schedule matrix pertains to a time and date indicated by the modified first new appointment.

EEE 10 is the method of any one of EEEs 2 to 9, further comprising: displaying, on the display, the first vehicle shop schedule prior to receiving the first new appointment; displaying, on the display, the second vehicle shop schedule prior to receiving the input to modify the first new appointment; and displaying, on the display, the third vehicle shop schedule after generating the third set of appointments.

EEE 11 is the method of any one of EEEs 2 to 10, further comprising: (i) receiving, by the at least one processor, an input indicating multiple schedule setup parameters, wherein the multiple schedule setup parameters comprise at least one shop resource parameter for multiple different selectable shop resource identifiers and/or at least one technician setup parameter for multiple different selectable technician identifiers, and (ii) outputting, by the at least one processor, the multiple different selectable shop resource identifiers and/or the multiple different selectable technician identifiers for displaying on the display, wherein the input to modify the first new appointment comprises at least the first technician data or the first shop resource data, wherein, if the input to modify the first new appointment comprises the first technician data, then receiving the input to modify the first new appointment comprises receiving a selection from multiple different selectable technician identifiers while displayed on the display, and wherein, if the input to modify the first new appointment comprises the first shop resource data, then receiving the input to modify the first new appointment comprises receiving a selection from multiple different selectable technician identifiers while displayed on the display.

EEE 12 is the method of EEE 11, wherein the multiple schedule setup parameters further comprise at least one regular business hours parameter, at least one visible hours parameter, and/or at least one appointment state parameter.

EEE 13 is the method of EEE 12, wherein the multiple schedule setup parameters further comprises at least one holiday setup parameter for generating the first vehicle shop schedule and/or the second vehicle shop schedule based on a change to the regular business hours parameter based on the at least one holiday setup parameter.

EEE 14 is the method of any one of EEEs 1 to 13, wherein the first temporal data comprises a first start time and a first end time, and wherein the first end time is based on the first start time and an amount of time associated with one or more service procedures associated with the first new appointment.

EEE 15 is the method of any one of EEEs 1 to 14, wherein outputting the second vehicle shop schedule for displaying on the display comprises outputting, by the at least one processor, the second vehicle shop schedule for displaying on the display configured in a first view mode, the method further comprising: receiving, by the at least one processor, a view mode input while the displayed second vehicle shop schedule is configured in the first view mode, wherein the view mode input indicates a second view mode; and outputting, by the at least one processor, the second vehicle shop schedule for displaying on the display reconfigured in the second view mode instead of in the first view mode, and (i) wherein the first view mode comprises one of a multi-date view mode, a technician view mode, and a resource view mode, (ii) wherein the second view mode comprises another of the multi-date view mode, the technician view mode, and the resource view mode, (iii) wherein the multi-date view mode comprises a matrix of multiple columns and multiple rows, (iv) wherein each column represents one of a different date and a different time, and each row represents another of the different date and the different time, (v) wherein the technician view mode comprises a matrix of multiple columns and multiple rows, (vi) wherein each column represents one of a different technician identifier and the different time, and each row represents another of the different technician identifier and the different time, and (vii) wherein the resource view mode comprises a matrix of multiple columns and multiple rows, wherein each column represents one of a different shop resource and the different time, and each row represents another of the different shop resource and the different time.

EEE 16 is the method of any one of EEEs 1 to 15, further comprising: confirming, by the at least one processor, the first new appointment does not conflict with any other appointment in the first set of appointments.

EEE 17 is the method of any one of EEEs 1 to 16, further comprising: (i) adding, by the at least one processor, at least one shop event into the first vehicle shop schedule; and (ii) confirming, by the at least one processor, the first new appointment does not conflict with the at least one shop event.

EEE 18 is the method of any one of EEEs 1 to 17, wherein the first new appointment further comprises a first appointment state, the method further comprising: (i) receiving, by the at least one processor, an input to modify the first new appointment, wherein the input to modify the first new appointment comprises a second appointment state; (ii) generating, by the at least one processor, a modified first new appointment that comprises the first temporal data, the first customer data, and the second appointment state; (iii) generating, by the at least one processor, a third second set of appointments by modifying the second set of appointments to include the modified first new appointment in place of the first new appointment; and (iv) outputting, by the at least one processor, a third vehicle shop schedule for displaying on the display, wherein the third vehicle shop schedule includes the third set of appointments, and wherein the second appointment state is different than the first appointment state.

EEE 19 is a computing system comprising: a computer-readable medium having stored thereon a first vehicle shop schedule; and at least one processor coupled to the computer-readable medium and programmed to: (i) output a first vehicle shop schedule for displaying on a display, wherein the first vehicle shop schedule comprises a first set of appointments, (ii) receive a first new appointment, wherein the first new appointment comprises first temporal data and first customer data, (iii) generate a second set of appointments by aggregating the first new appointment with the first set of appointments, and (iv) output a second vehicle shop schedule for displaying on the display instead of displaying the first vehicle shop schedule, wherein the second vehicle shop schedule comprises the second set of appointments.

EEE 20 is the computing system of EEE 19, wherein the at least one processor is further programmed to: (i) receive an input to modify the first new appointment, wherein the input to modify the first new appointment comprises at least one of second temporal data, second customer data, first technician data, and first shop resource data, (ii) generate a modified first new appointment that includes the at least one of the second temporal data, the second customer data, the first technician data, and the first shop resource data, (iii) generate a third set of appointments by modifying the second set of appointments to include the modified first new appointment in place of the first new appointment, and (iv) output a third vehicle shop schedule for displaying on the display, wherein the third vehicle shop schedule includes the third set of appointments.

EEE 21 is the computing system of EEE 20, wherein the at least one processor is further programmed to: (i) modify the second set of appointments prior to generating the third set of appointments, wherein modifying the second set of appointments comprises adding at least one other appointment to the second set of appointments, (ii) remove at least one other appointment from the second set of appointments, and/or (iii) modify at least one other appointment of the second set of appointments.

EEE 22 is the computing system of any one of EEEs 20 and 21, wherein the input to modify the first new appointment comprises at least the first technician data, wherein the first technician data comprises at least a first technician identifier to use in the modified first new appointment, and wherein the at least one processor being programmed to generate the modified first new appointment comprises the at least one processor being programmed to (i) aggregate the first new appointment with the first technician data, or (ii) replace a second technician identifier with the first technician identifier if the first new appointment further comprises second technician data comprising at least the second technician identifier.

EEE 23 is the computing system of any one of EEEs 20 to 22, wherein the input to modify the first new appointment comprises at least the first shop resource data, and wherein the at least one processor being programmed to generate the modified first new appointment comprises the at least one processor being programmed to: (i) aggregate the first new appointment with the first shop resource data, or (ii) replace second shop resource data with the first shop resource data if the first new appointment further comprises the second shop resource data.

EEE 24 is the computing system of EEE 23, wherein the first shop resource comprises a vehicle bay identifier and/or a shop tool identifier.

EEE 25 is the computing system of any one of EEEs 20 to 24, wherein the first temporal data comprises a first start time, a first end time and a first calendar date, wherein the input to modify the first new appointment comprises at least the second temporal data, wherein the second temporal data comprises a second start time, a second end time, and/or a second calendar data, and wherein the at least one processor being programmed to generate the modified first new appointment comprises the at least one processor being programmed to (i) replace the first start time with the second start time if the second temporal data comprises the second start time, (ii) replace the first end time with the second end time if the second temporal data comprises the second end time, and/or (iii) replace the first calendar date with the second calendar date if the second temporal data comprises the second calendar date.

EEE 26 is the computing system of any one of EEEs 20 to 25, wherein the input to modify the first new appointment comprises at least the second customer data, wherein the at least one processor being programmed to generate the modified first new appointment comprises the at least one processor being programmed to replace the first customer data with the second customer data or add the second customer data to the first customer data.

EEE 27 is the computing system of any one of EEEs 20 to 26, wherein the first vehicle shop schedule comprises a schedule matrix, wherein the at least one processor being programmed to receive the input to modify the first new appointment comprise the at least one processor being programmed to receive, by the at least one processor, an input indicating the first new appointment was dragged from a first location in the schedule matrix to a second location in the schedule matrix, wherein the first location in the schedule matrix pertains to a time and date indicated by the first new appointment, and wherein the second location in the schedule matrix pertains to a time and date indicated by the modified first new appointment.

EEE 28 is the computing system of any one of EEEs 20 to 27, wherein the at least one processor being programmed to display, on the display, the first vehicle shop schedule prior to the at least one processor receiving the first new appointment; display, on the display, the second vehicle shop schedule prior to the at least one processor receiving the input to modify the first new appointment; and displaying, on the display, the third vehicle shop schedule after the at least one processor generates the third set of appointments.

EEE 29 is the computing system of any one of EEEs 20 to 28, wherein the at least one processor is further programmed to: (i) receive an input indicating multiple schedule setup parameters, wherein the multiple schedule setup parameters comprise at least one shop resource parameter for multiple different selectable shop resource identifiers and/or at least one technician setup parameter for multiple different selectable technician identifiers, and (ii) output the multiple different selectable shop resource identifiers and/or the multiple different selectable technician identifiers for displaying on the display, and (i) wherein the input to modify the first new appointment comprises at least the first technician data or the first shop resource data, (ii) wherein, if the input to modify the first new appointment comprises the first technician data, then receiving the input to modify the first new appointment comprises receiving a selection from multiple different selectable technician identifiers while displayed on the display, and (iii) wherein, if the input to modify the first new appointment comprises the first shop resource data, then receiving the input to modify the first new appointment comprises receiving a selection from multiple different selectable technician identifiers while displayed on the display.

EEE 30 is the computing system of EEE 29, wherein the multiple schedule setup parameters further comprise at least one regular business hours parameter, at least one visible hours parameter, and/or at least one appointment state parameter.

EEE 31 is the computing system of EEE 30, wherein the multiple schedule setup parameters further comprises at least one holiday setup parameter for generating the first vehicle shop schedule and/or the second vehicle shop schedule based on a change to the regular business hours parameter based on the at least one holiday setup parameter.

EEE 32 is the computing system of any one of EEEs 20 to 31, wherein the first temporal data comprises a first start time and a first end time, and wherein the first end time is based on the first start time and an amount of time associated with one or more service procedures associated with the first new appointment.

EEE 33 is the computing system of any one of EEEs 20 to 32, wherein the at least one processor being programmed to output the second vehicle shop schedule for displaying on the display comprises the at least one processor being programmed to output the second vehicle shop schedule for displaying on the display configured in a first view mode, wherein the at least one processor is further programmed to (a) receive a view mode input while the displayed second vehicle shop schedule is configured in the first view mode, wherein the view mode input indicates a second view mode; and (b) output the second vehicle shop schedule for displaying on the display reconfigured in the second view mode instead of in the first view mode, and (i) wherein the first view mode comprises one of a multi-date view mode, a technician view mode, and a resource view mode, (ii) wherein the second view mode comprises another of the multi-date view mode, the technician view mode, and the resource view mode, (iii) wherein the multi-date view mode comprises a matrix of multiple columns and multiple rows, (iv) wherein each column represents one of a different date and a different time, and each row represents another of the different date and the different time, (v) wherein the technician view mode comprises a matrix of multiple columns and multiple rows, (vi) wherein each column represents one of a different technician identifier and the different time, and each row represents another of the different technician identifier and the different time, and (vii) wherein the resource view mode comprises a matrix of multiple columns and multiple rows, wherein each column represents one of a different shop resource and the different time, and each row represents another of the different shop resource and the different time.

EEE 34 is the computing system of any one of EEEs 20 to 33, wherein the at least one processor being programmed to confirm the first new appointment does not conflict with any other appointment in the first set of appointments.

EEE 35 is the computing system of any one of EEEs 20 to 34, wherein the at least one processor being programmed to: (i) add at least one shop event into the first vehicle shop schedule; and (ii) confirm the first new appointment does not conflict with the at least one shop event.

EEE 36 is the computing system of any one of EEEs 20 to 35, wherein the first new appointment further comprises a first appointment state, wherein the at least one processor is further programmed to: (i) receive an input to modify the first new appointment, wherein the input to modify the first new appointment comprises a second appointment state; (ii) generate a modified first new appointment that comprises the first temporal data, the first customer data, and the second appointment state; (iii) generate a third second set of appointments by modifying the second set of appointments to include the modified first new appointment in place of the first new appointment; and (iv) output a third vehicle shop schedule for displaying on the display, wherein the third vehicle shop schedule includes the third set of appointments, and wherein the second appointment state is different than the first appointment state.

EEE 37 is a computer readable medium having stored thereon instructions executable by at least one processor to cause a computing system to perform functions comprising: (i) outputting, by at least one processor, a first vehicle shop schedule for displaying on a display, wherein the first vehicle shop schedule comprises a first set of appointments; (ii) receiving, by the at least one processor, a first new appointment, wherein the first new appointment comprises first temporal data and first customer data, (iii) generating, by the at least one processor, a second set of appointments by aggregating the first new appointment with the first set of appointments, and (iv) outputting, by the at least one processor, a second vehicle shop schedule for displaying on the display instead of displaying the first vehicle shop schedule, wherein the second vehicle shop schedule comprises the second set of appointments.

EEE 38 is the computer readable medium of EEE 37, wherein the functions further comprise: (i) receiving, by the at least one processor, an input to modify the first new appointment, wherein the input to modify the first new appointment comprises at least one of second temporal data, second customer data, first technician data, and first shop resource data, (ii) generating, by the at least one processor, a modified first new appointment that includes the at least one of the second temporal data, the second customer data, the first technician data, and the first shop resource data, (iii) generating, by the at least one processor, a third set of appointments by modifying the second set of appointments to include the modified first new appointment in place of the first new appointment, and (iv) outputting, by the at least one processor, a third vehicle shop schedule for displaying on the display, wherein the third vehicle shop schedule includes the third set of appointments.

EEE 39 is the computer readable medium of EEE 38, wherein the functions further comprise: modifying, by the at least one processor, the second set of appointments prior to generating the third set of appointments, wherein modifying the second set of appointments comprises adding at least one other appointment to the second set of appointments, removing at least one other appointment from the second set of appointments, and/or modifying at least one other appointment of the second set of appointments.

EEE 40 is the computer readable medium of any one of EEEs 38 and 39, wherein the input to modify the first new appointment comprises at least the first technician data, wherein the first technician data comprises at least a first technician identifier to use in the modified first new appointment, and wherein generating the modified first new appointment comprises (i) aggregating the first new appointment with the first technician data, or (ii) replacing a second technician identifier with the first technician identifier if the first new appointment further comprises second technician data comprising at least the second technician identifier.

EEE 41 is the computer readable medium of any one of EEEs 38 to 40, wherein the input to modify the first new appointment comprises at least the first shop resource data, and wherein generating the modified first new appointment comprises (i) aggregating the first new appointment with the first shop resource data, or (ii) replacing second shop resource data with the first shop resource data if the first new appointment further comprises the second shop resource data.

EEE 42 is the computer readable medium of EEE 41, wherein the first shop resource comprises a vehicle bay identifier and/or a shop tool identifier.

EEE 43 is the computer readable medium of any one of EEEs 38 to 42, wherein the first temporal data comprises a first start time, a first end time and a first calendar date, wherein the input to modify the first new appointment comprises at least the second temporal data, wherein the second temporal data comprises a second start time, a second end time, and/or a second calendar data, and wherein generating the modified first new appointment comprises replacing the first start time with the second start time if the second temporal data comprises the second start time, replacing the first end time with the second end time if the second temporal data comprises the second end time, and/or replacing the first calendar date with the second calendar date if the second temporal data comprises the second calendar date.

EEE 44 is the computer readable medium of any one of EEEs 38 to 43, wherein the input to modify the first new appointment comprises at least the second customer data, and wherein generating the modified first new appointment comprises replacing the first customer data with the second customer data or adding the second customer data to the first customer data.

EEE 45 is the computer readable medium of any one of EEEs 38 to 44, wherein the first vehicle shop schedule comprises a schedule matrix, wherein receiving the input to modify the first new appointment comprise receiving, by the at least one processor, an input indicating the first new appointment was dragged from a first location in the schedule matrix to a second location in the schedule matrix, wherein the first location in the schedule matrix pertains to a time and date indicated by the first new appointment, and wherein the second location in the schedule matrix pertains to a time and date indicated by the modified first new appointment.

EEE 46 is the computer readable medium of any one of EEEs 38 to 45, wherein the functions further comprise: displaying, on the display, the first vehicle shop schedule prior to receiving the first new appointment; displaying, on the display, the second vehicle shop schedule prior to receiving the input to modify the first new appointment; and displaying, on the display, the third vehicle shop schedule after generating the third set of appointments.

EEE 47 is the computer readable medium of any one of EEEs 38 to 46, wherein the functions further comprise: (i) receiving, by the at least one processor, an input indicating multiple schedule setup parameters, wherein the multiple schedule setup parameters comprise at least one shop resource parameter for multiple different selectable shop resource identifiers and/or at least one technician setup parameter for multiple different selectable technician identifiers, and (ii) outputting, by the at least one processor, the multiple different selectable shop resource identifiers and/or the multiple different selectable technician identifiers for displaying on the display, wherein the input to modify the first new appointment comprises at least the first technician data or the first shop resource data, wherein, if the input to modify the first new appointment comprises the first technician data, then receiving the input to modify the first new appointment comprises receiving a selection from multiple different selectable technician identifiers while displayed on the display, and wherein, if the input to modify the first new appointment comprises the first shop resource data, then receiving the input to modify the first new appointment comprises receiving a selection from multiple different selectable technician identifiers while displayed on the display.

EEE 48 is the computer readable medium of EEE 47, wherein the multiple schedule setup parameters further comprise at least one regular business hours parameter, at least one visible hours parameter, and/or at least one appointment state parameter.

EEE 49 is the computer readable medium of EEE 48, wherein the multiple schedule setup parameters further comprises at least one holiday setup parameter for generating the first vehicle shop schedule and/or the second vehicle shop schedule based on a change to the regular business hours parameter based on the at least one holiday setup parameter.

EEE 50 is the computer readable medium of any one of EEEs 37 to 49, wherein the first temporal data comprises a first start time and a first end time, and wherein the first end time is based on the first start time and an amount of time associated with one or more service procedures associated with the first new appointment.

EEE 51 is the computer readable medium of any one of EEEs 37 to 50, wherein outputting the second vehicle shop schedule for displaying on the display comprises outputting, by the at least one processor, the second vehicle shop schedule for displaying on the display configured in a first view mode, wherein the functions further comprise: receiving, by the at least one processor, a view mode input while the displayed second vehicle shop schedule is configured in the first view mode, wherein the view mode input indicates a second view mode; and outputting, by the at least one processor, the second vehicle shop schedule for displaying on the display reconfigured in the second view mode instead of in the first view mode, and (i) wherein the first view mode comprises one of a multi-date view mode, a technician view mode, and a resource view mode, (ii) wherein the second view mode comprises another of the multi-date view mode, the technician view mode, and the resource view mode, (iii) wherein the multi-date view mode comprises a matrix of multiple columns and multiple rows, (iv) wherein each column represents one of a different date and a different time, and each row represents another of the different date and the different time, (v) wherein the technician view mode comprises a matrix of multiple columns and multiple rows, (vi) wherein each column represents one of a different technician identifier and the different time, and each row represents another of the different technician identifier and the different time, and (vii) wherein the resource view mode comprises a matrix of multiple columns and multiple rows, wherein each column represents one of a different shop resource and the different time, and each row represents another of the different shop resource and the different time.

EEE 52 is the computer readable medium of any one of EEEs 37 to 51, wherein the functions further comprise: confirming, by the at least one processor, the first new appointment does not conflict with any other appointment in the first set of appointments.

EEE 53 is the computer readable medium of any one of EEEs 37 to 52, wherein the functions further comprise: (i) adding, by the at least one processor, at least one shop event into the first vehicle shop schedule; and (ii) confirming, by the at least one processor, the first new appointment does not conflict with the at least one shop event.

EEE 54 is the computer readable medium of any one of EEEs 37 to 53, wherein the first new appointment further comprises a first appointment state, wherein the functions further comprise: (i) receiving, by the at least one processor, an input to modify the first new appointment, wherein the input to modify the first new appointment comprises a second appointment state; (ii) generating, by the at least one processor, a modified first new appointment that comprises the first temporal data, the first customer data, and the second appointment state; (iii) generating, by the at least one processor, a third second set of appointments by modifying the second set of appointments to include the modified first new appointment in place of the first new appointment; and (iv) outputting, by the at least one processor, a third vehicle shop schedule for displaying on the display, wherein the third vehicle shop schedule includes the third set of appointments, and wherein the second appointment state is different than the first appointment state.

We claim:

1. A method comprising:
adding, by one or more processors, into a first vehicle shop schedule for a particular repair shop, an identifier of a particular shop resource usable to perform a specific job on a vehicle at the particular repair shop, wherein the particular shop resource includes a piece of equipment and/or a service shop bay at the particular repair shop, and wherein the first vehicle shop schedule comprises a first set of appointments;

displaying, on a display, at least a portion of the first vehicle shop schedule in a graphical user interface configured in a first view mode, wherein:
the graphical user interface configured in the first view mode includes a first schedule matrix having multiple first elements and multiple second elements,
each first element of the first schedule matrix is a respective column or row of the first schedule matrix and each second element of the first schedule matrix is a respective row of the first schedule matrix if each first element of the first schedule matrix is a respective column or each second element of the first schedule matrix is a respective column if each first element of the first schedule matrix is a respective row,
each first element of the first schedule matrix represents a different date, and
each second element of the first schedule matrix represents a different time;

receiving, by the one or more processors, a first new appointment, wherein the first new appointment comprises first temporal data and first customer data;

generating, by the one or more processors, a second set of appointments and a second vehicle shop schedule by aggregating the first new appointment into the first set of appointments within the first vehicle shop schedule;

displaying, on the display, at least a portion of the second vehicle shop schedule in the graphical user interface on the display configured in the first view mode instead of at least a portion of the first vehicle shop schedule, wherein the second vehicle shop schedule includes the second set of appointments;

receiving, by the one or more processors, a view mode input while at least a portion of the second vehicle shop schedule is displayed in the graphical user interface on the display configured in the first view mode, wherein the view mode input indicates a second view mode;

displaying, on the display, at least a portion of the second vehicle shop schedule in the graphical user interface reconfigured to the second view mode, wherein:
the graphical user interface reconfigured to the second view mode includes a second schedule matrix having multiple first elements and multiple second elements,
each first element of the second schedule matrix is a respective column or row of the second schedule matrix and each second element of the second schedule matrix is a respective row of the second schedule matrix if each first element of the second schedule matrix is a respective column or each second element of the second schedule matrix is a respective column if each first element of the second schedule matrix is a respective row,
each first element of the second schedule matrix other than a first particular first element of the second schedule matrix represents a date and a shop resource,
the shop resource for a second particular first element of the second schedule matrix is the particular shop resource,
each second element of the second schedule matrix represents a different time,
the first particular first element of the second schedule matrix includes a respective appointment element for each of one or more unassigned appointments, and the one or more unassigned appointments include the first new appointment;
receiving, by the one or more processors, an input to modify the first new appointment, wherein:
the input to modify the first new appointment results from dragging an appointment element corresponding to the first new appointment from the first particular first element of the second schedule matrix to the second particular first element of the second schedule matrix, and
the input to modify the first new appointment includes first shop resource data associated with the second particular first element of the second schedule matrix;
generating, by the one or more processors in response to receiving the input to modify the first new appointment, a modified first new appointment that includes the first temporal data, the first customer data, and the first shop resource data;
generating, by the one or more processors, a third set of appointments and a third vehicle shop schedule by modifying the second set of appointments to include the modified first new appointment in place of the first new appointment; and
displaying, on the display, at least a portion of the third vehicle shop schedule in the graphical user interface configured in the second view mode, wherein the third vehicle shop schedule includes the third set of appointments.

2. The method of claim 1, further comprising:
modifying, by the one or more processors, the second set of appointments prior to generating the third set of appointments, wherein modifying the second set of appointments comprises adding at least one other appointment to the second set of appointments, removing at least one other appointment from the second set of appointments, and/or modifying at least one other appointment of the second set of appointments.

3. The method of claim 1, further comprising:
receiving, by the one or more processors, an input to modify the first new appointment,
wherein the input to modify the first new appointment comprises at least first technician data,
wherein the first technician data comprises at least a first technician identifier to use in the modified first new appointment, and
wherein generating the modified first new appointment further comprises (i) aggregating the first new appointment with the first technician data, or (ii) replacing a second technician identifier with the first technician identifier if the first new appointment further comprises second technician data comprising at least the second technician identifier.

4. The method of claim 1, wherein the first shop resource data comprises a vehicle bay identifier and/or a shop tool identifier.

5. The method of claim 1,
wherein the first temporal data comprises a first start time, a first end time and a first calendar date,
wherein the input to modify the first new appointment comprises at least second temporal data,
wherein the second temporal data comprises a second start time, a second end time, and/or a second calendar date, and
wherein generating the modified first new appointment comprises replacing the first start time with the second start time if the second temporal data comprises the second start time, replacing the first end time with the second end time if the second temporal data comprises the second end time, and/or replacing the first calendar date with the second calendar date if the second temporal data comprises the second calendar date.

6. The method of claim 1,
wherein the input to modify the first new appointment comprises at least second customer data, and
wherein generating the modified first new appointment comprises replacing the first customer data with the second customer data or adding the second customer data to the first customer data.

7. The method of claim 1, further comprising:
displaying, on the display, the first vehicle shop schedule prior to receiving the first new appointment;
displaying, on the display, the second vehicle shop schedule prior to receiving the input to modify the first new appointment; and
displaying, on the display, the third vehicle shop schedule after generating the third set of appointments.

8. The method of claim 1, further comprising:
receiving, by the one or more processors, an input indicating multiple schedule setup parameters, wherein the multiple schedule setup parameters comprise at least one shop resource parameter for multiple different selectable shop resource identifiers and/or at least one technician setup parameter for multiple different selectable technician identifiers; and
outputting, by the one or more processors, the multiple different selectable shop resource identifiers and/or the multiple different selectable technician identifiers for displaying on the display.

9. The method of claim 8, wherein the multiple schedule setup parameters further comprise at least one regular business hours parameter, at least one visible hours parameter, and/or at least one appointment state parameter.

10. The method of claim 9,
wherein the multiple schedule setup parameters further comprises at least one holiday setup parameter for generating the first vehicle shop schedule and/or the second vehicle shop schedule based on a change to the regular business hours parameter, and
wherein the change to regular business hours parameter is based on the at least one holiday setup parameter.

11. The method of claim 1,
wherein the first temporal data comprises a first start time and a first end time, and
wherein the first end time is based on the first start time and an amount of time associated with one or more service procedures associated with the first new appointment.

12. The method of claim 1, further comprising:
confirming, by the one or more processors, the first new appointment does not conflict with any other appointment in the first set of appointments.

13. The method of claim 1, further comprising:
adding, by the one or more processors, at least one shop event into the first vehicle shop schedule; and
confirming, by the one or more processors, the first new appointment does not conflict with the at least one shop event.

14. A computing system comprising:
a computer-readable medium having stored thereon a first vehicle shop schedule, wherein the first vehicle shop schedule comprises a first set of appointments for a particular repair shop; and one or more processors coupled to the computer-readable medium and programmed to:
add, into the first vehicle shop schedule for the particular repair shop, an identifier of a particular shop resource usable to perform a specific job on a vehicle at the particular repair shop, wherein the particular shop resource includes a piece of equipment and/or a service shop bay at the particular repair shop, and;
displaying display, on a display, at least a portion of the first vehicle shop schedule in a graphical user interface configured in a first view mode, wherein:
the graphical user interface configured in the first view mode includes a first schedule matrix having multiple first elements and multiple second elements,
each first element of the first schedule matrix is a respective column or row of the first schedule matrix and each second element of the first schedule matrix is a respective row of the first schedule matrix if each first element of the first schedule matrix is a respective column or each second element of the first schedule matrix is a respective column if each first element of the first schedule matrix is a respective row,
each first element of the first schedule matrix represents a different date, and
each second element of the first schedule matrix represents a different time;
receive a first new appointment, wherein the first new appointment comprises first temporal data and first customer data;
generate a second set of appointments and a second vehicle shop schedule by aggregating the first new appointment into the first set of appointments within the first vehicle shop schedule;
displaying, on the display, at least a portion of the second vehicle shop schedule in the graphical user interface on the display in the first view mode instead of at least a portion of the first vehicle shop schedule, wherein the second vehicle shop schedule includes the second set of appointments;
receive a view mode input while at least a portion of the second vehicle shop schedule is displayed in the graphical user interface on the display configured in the first view mode, wherein the view mode input indicates a second view model;
displaying, on the display, at least a portion of the second vehicle shop schedule in the graphical user interface reconfigured to the second view mode, wherein:
the graphical user interface reconfigured to the second view mode includes a second schedule matrix having multiple first elements and multiple second elements,
each first element of the second schedule matrix is a respective column or row of the second schedule matrix and each second element of the second schedule matrix is a respective row of the second schedule matrix if each first element of the second schedule matrix is a respective column or each second element of the second schedule matrix is a respective column if each first element of the second schedule matrix is a respective row,
each first element of the second schedule matrix other than a first particular first element of the second schedule matrix represents a date and a shop resource,
the shop resource for a second particular first element of the second schedule matrix is the particular shop resource, each second element of the second schedule matrix represents a different time, and
the first particular first element of the second schedule matrix includes a respective appointment element for each of one or more unassigned appointments, and
the one or more unassigned appointments include the first new appointment; receive an input to modify the first new appointment, wherein:
the input to modify the first new appointment results from dragging an appointment element corresponding to the first new appointment from the first particular first element of the second schedule matrix to the second particular first element of the second schedule matrix, and
the input to modify the first new appointment includes first shop resource data associated with the second particular first element of the second schedule matrix;
generate, in response to receiving the input to modify the first new appointment, a modified first new appointment that includes the first temporal data, the first customer data, and the first shop resource data;
generate a third set of appointments and a third vehicle shop schedule by modifying the second set of appointments to include the modified first new appointment in place of the first new appointment; and
displaying, on the display, at least a portion of the third vehicle shop schedule in the graphical user interface configured in the second view mode, wherein the third vehicle shop schedule includes the third set of appointments.

15. A non-transitory computer readable medium having stored thereon instructions executable by one or more processors to cause a computing system to perform functions comprising:
adding, by the one or more processors, into a first vehicle shop schedule for a particular repair shop, an identifier of a particular shop resource usable to perform a specific job on a vehicle at the particular repair shop, wherein the particular shop resource includes a piece of equipment and/or a service shop bay at the particular repair shop, and wherein the first vehicle shop schedule comprises a first set of appointments;
displaying, on a display, at least a portion of the first vehicle shop schedule in a graphical user interface configured in a first view mode, wherein
the graphical user interface configured in the first view mode includes a first schedule matrix having multiple first elements and multiple second elements,
each first element of the first schedule matrix is a respective column or row of the first schedule matrix and each second element of the first schedule matrix is a respective row of the first schedule matrix if each first element of the first schedule matrix is a respective column or each second element of the first schedule matrix is a respective column if each first element of the first schedule matrix is a respective row,
each first element of the first schedule matrix represents a different date, and
each second element of the first schedule matrix represents a different time;
receiving, by the one or more processors, a first new appointment, wherein the first new appointment comprises first temporal data and first customer data;
generating, by the one or more processors, a second set of appointments and a second vehicle shop schedule by aggregating the first new appointment into the first set of appointments within the first vehicle shop schedule;

displaying, on the display, at least a portion of the second vehicle shop schedule in the graphical user interface on the display configured in the first view mode instead of on the display, at least a portion of the first vehicle shop schedule, wherein the second vehicle shop schedule includes the second set of appointments;

receiving, by the one or more processors, a view mode input while at least a portion of the second vehicle shop schedule is displayed in the graphical user interface on the display configured in the first view mode, wherein the view mode input indicates a second view mode;

displaying, on the display, at least a portion of the second vehicle shop schedule in the graphical user interface reconfigured to the second view mode, wherein:
- the graphical user interface reconfigured to the second view mode includes a second schedule matrix having multiple first elements and multiple second elements,
- each first element of the second schedule matrix is a respective column or row of the second schedule matrix and each second element of the second schedule matrix is a respective row of the second schedule matrix if each first element of the second schedule matrix is a respective column or each second element of the second schedule matrix is a respective column if each first element of the second schedule matrix is a respective row,
- each first element of the second schedule matrix other than a first particular first element of the second schedule matrix represents a date and a shop resource,
- the shop resource for a second particular first element of the second schedule matrix is the particular shop resource,
- each second element of the second schedule matrix represents a different time,
- the first particular first element of the second schedule matrix includes a respective appointment element for each of one or more unassigned appointments, and
- the one or more unassigned appointments include the first new appointment;

receiving, by the one or more processors, an input to modify the first new appointment, wherein:
- the input to modify the first new appointment results from dragging an appointment element corresponding to the first new appointment from the first particular first element of the second schedule matrix to the second particular first element of the second schedule matrix, and
- the input to modify the first new appointment includes first shop resource data associated with the second particular first element of the second schedule matrix;

generating, by the one or more processors in response to receiving the input to modify the first new appointment, a modified first new appointment that includes the first temporal data, the first customer data, and the first shop resource data;

generating, by the one or more processors, a third set of appointments and a third vehicle shop schedule by modifying the second set of appointments to include the modified first new appointment in place of the first new appointment; and displaying, on the display, at least a portion of the third vehicle shop schedule in the graphical user interface configured in the second view mode, wherein the third vehicle shop schedule includes the third set of appointments.

16. The method of claim 1, further comprising:

dragging the first new appointment of the second schedule matrix to a different one of the first elements of the second schedule matrix.

\* \* \* \* \*